(12) United States Patent
Kim et al.

(10) Patent No.: US 12,141,375 B2
(45) Date of Patent: **\*Nov. 12, 2024**

(54) PEN AND TOUCH INPUT SYSTEM OR CONTROLLER

(71) Applicant: HiDeep Inc., Seongnam-si (KR)

(72) Inventors: Seyeob Kim, Seongnam-si (KR); Bonkee Kim, Seongnam-si (KR); Young Ho Cho, Seongnam-si (KR); Hwanhee Lee, Seongnam-si (KR); Giduk Kim, Seongnam-si (KR); Joohyun Go, Seongnam-si (KR); Mun Sub Byun, Seongnam-si (KR); Hyoungwook Woo, Seongnam-si (KR); Kiryoung Jung, Seongnam-si (KR); Ho Jun Moon, Seongnam-si (KR)

(73) Assignee: HIDEEP INC. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,549

(22) Filed: Jun. 7, 2023

(65) Prior Publication Data

US 2023/0393672 A1 Dec. 7, 2023

(30) Foreign Application Priority Data

Jun. 7, 2022 (KR) .................. 10-2022-0069181
Jun. 7, 2022 (KR) .................. 10-2022-0069182

(51) Int. Cl.
| | |
|---|---|
| *G06F 3/045* | (2006.01) |
| *G06F 3/0354* | (2013.01) |
| *G06F 3/041* | (2006.01) |
| *G06F 3/044* | (2006.01) |
| *G06F 3/046* | (2006.01) |

(52) U.S. Cl.
CPC ...... *G06F 3/03545* (2013.01); *G06F 3/04162* (2019.05); *G06F 3/0446* (2019.05); *G06F 3/046* (2013.01); *G06F 2203/04111* (2013.01); *G06F 2203/04112* (2013.01)

(58) Field of Classification Search
CPC .... G06F 3/033; G06F 3/03545; G06F 3/0416; G06F 3/04162; G06F 3/0445; G06F 3/0446; G06F 3/046; G06F 2203/04104; G06F 2203/04111; G06F 2203/04112
See application file for complete search history.

(56) References Cited

U.S. PATENT DOCUMENTS

| | | | | |
|---|---|---|---|---|
| 9,151,586 | B2* | 10/2015 | Fukushima | G06F 1/16 |
| 10,338,747 | B2* | 7/2019 | Kim | G06F 3/0418 |
| 10,691,278 | B1 | 6/2020 | Kay et al. | |
| 11,675,446 | B2* | 6/2023 | Kim | G06F 3/0416 |
| | | | | 345/174 |

(Continued)

FOREIGN PATENT DOCUMENTS

| | | |
|---|---|---|
| AU | 2015307393 A1 | 2/2017 |
| WO | 2021150045 A1 | 7/2021 |

OTHER PUBLICATIONS

European Search Report 23177774, Issued on Jan. 30, 2024.

*Primary Examiner* — Joe H Cheng
(74) *Attorney, Agent, or Firm* — The Belles Group, P.C.

(57) ABSTRACT

A pen and touch input system according to an embodiment of the present invention includes a touch input device including a sensor unit and a control unit for controlling the sensor unit and a stylus pen interacting with the touch input device.

54 Claims, 54 Drawing Sheets

(56) References Cited

U.S. PATENT DOCUMENTS

| | | | |
|---|---|---|---|
| 2013/0257785 A1 | 10/2013 | Brown et al. | |
| 2017/0153748 A1* | 6/2017 | Choi | H03K 17/962 |
| 2020/0264712 A1 | 8/2020 | Kim et al. | |
| 2021/0124449 A1 | 4/2021 | Jang et al. | |
| 2022/0164081 A1 | 5/2022 | Lee et al. | |
| 2023/0418412 A1* | 12/2023 | Kim | G06F 3/0448 |

\* cited by examiner

+driving channel   Position of pen   -driving channel

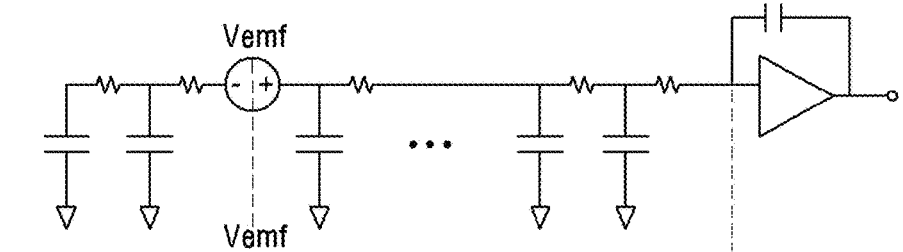
FIG. 21A
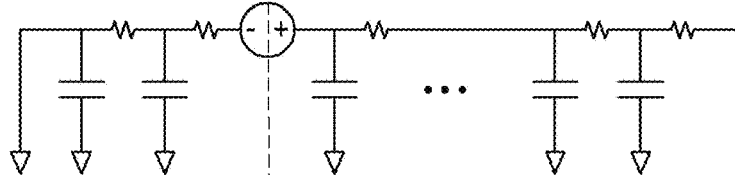
FIG. 21B
FIG. 21C
FIG. 21D
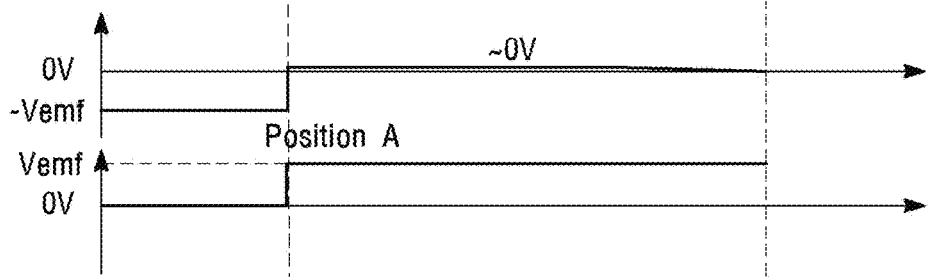
FIG. 21E
FIG. 21F
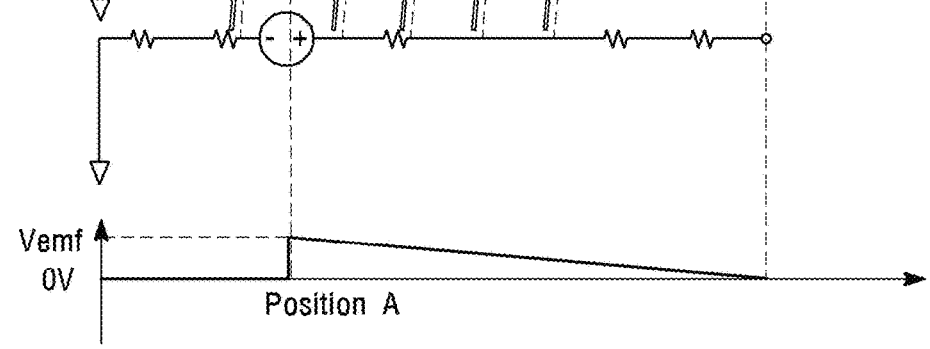

| Pattern | Embodiment 1 | Embodiment 2 | Embodiment 3 |
|---|---|---|---|
| Total Channel | 70~80 | 90~100 | 90~100 |
| 2D TX / RX | TX 20, RX 40 | TX 40, RX 40 | TX 40, RX 40 |
| Stylus | TX 10~20 | TX 10~20 | TX 10~20 |
| Right and left Trace | 20+20(40) | 20+20(40) | 30+30(60) |

FIG. 35

PEN AND TOUCH INPUT SYSTEM OR CONTROLLER

CROSS-REFERENCE TO RELATED APPLICATIONS

This U.S. non-provisional patent application claims priority under 35 U.S.C. § 119 of Korean Patent Application No. 10-2022-0069181, filed on Jun. 7, 2022 and 10-2022-0069182, filed on Jun. 7, 2022, the entire contents of which are hereby incorporated by reference.

BACKGROUND

The present disclosure relates to a pen and a controller, and more particularly, to a touch input system including a sensor unit and interacting with a stylus pen and a controller for controlling a device.

A touch sensor is provided in various touch input devices such as mobile phones, smart phones, laptop computers, digital broadcasting terminals, personal digital assistants (PDA), portable multimedia players (PMP), navigation units, slate PCs, tablet PCs, ultrabooks, and wearable devices.

The touch sensor in the touch input device may be disposed on a display panel that displays an image or a portion of the touch input device. As a user touches a touch sensor to interact with the touch input device, the touch input device may provide an intuitive user interface to the user.

The user may use a stylus pen for a precise touch input. The stylus pen may be classified into an active stylus pen and a passive stylus pen depending on whether a battery and an electronic component are provided therein.

Although the active stylus pen has an excellent basic performance and provides additional functions (pen pressure, hovering, buttons) in comparison with the passive stylus pen, the active stylus pen is expensive and uses a rechargeable battery as power. Thus, not many users substantially use the active stylus pen except for some advanced users.

Although the passive stylus pen is inexpensive and does not require a battery in comparison with the active stylus pen, the passive stylus pen is difficult to recognize a precise touch in comparison with the active stylus pen. In recent years, however, technologies of an electro magnetic resonance (EMR) method that is an inductive resonance method and a capacitive resonance method are proposed to realize a passive stylus pen capable of recognizing a precise touch.

Although the EMR method is excellent in writing and drawing quality that is a key function of the stylus pen, the EMR method has a great thickness and requires more costs because a separate EMR sensor panel and a separate EMR driving IC are necessarily added in addition to a capacitance touch panel.

The capacitive resonance method uses a general capacitance touch sensor and a general touch controller IC to increase a performance of the IC and support a pen touch without additional costs.

In the EMR method or the capacitive resonance method, a resonance signal is required to have a large amplitude to more accurately distinguish a touch caused by the stylus pen. Thus, a driving signal transmitted to the stylus pen needs to have the almost same resonance frequency as that of the resonance circuit contained in the stylus pen. However, according to a typical EMR method or a typical capacitive resonance method, although the resonance frequency is the same as a frequency of the driving signal, signal transmission is difficult because of extremely great attenuation of the signal transmission. As a result, despite attempts of many touch controller IC vendors for a long time, no companies have succeeded in mass production yet because a sufficient output signal is not produced.

Thus, a feature of how to design structures of the internal resonance circuit and the pen is a key factor to manufacture an EMR or capacitive resonance stylus pen capable of producing a maximum output signal.

SUMMARY

The present disclosure provides a pen including a stylus pen producing sufficient output signals, a touch input system interacting with a stylus pen, and a controller for controlling a device.

The present disclosure also provides a pen including a multifunctional touch input device capable of driving a stylus pen and detecting a position of the stylus pen and a controller for controlling a touch input system.

The present disclosure also provides a pen including a touch input device capable of solving a limitation in which an output voltage of a sensing circuit unit is varied depending on positions of a stylus pen and a controller for controlling a touch input system.

The problem to be solved in the present invention is not limited to the above-described problems.

An embodiment of the present invention provides a pen and touch input system including: a touch input device including a sensor unit and a control unit configured to control the sensor unit; and a stylus pen configured to interact with the touch input device. Here, the sensor unit includes: a first pattern extending in a first direction; a second pattern disposed adjacent to the first pattern and extending in the first direction; a third pattern extending in a second direction different from the first direction; and a fourth pattern disposed adjacent to the third pattern and extending in the second direction. Also, a plurality of first patterns and a plurality of second patterns are arranged in the second direction, and a plurality of third patterns and a plurality of fourth patterns are arranged in the first direction, first ends of the plurality of first and third patterns are electrically connected to the control unit, and second ends thereof are electrically opened, and second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit drives the stylus pen by using at least one driving pattern among the plurality of first to fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a first pattern extending in a first direction; a second pattern disposed adjacent to the first pattern and extending in the first direction; a third pattern extending in a second direction different from the first direction; and a fourth pattern disposed adjacent to the third pattern and extending in the second direction. Also, a plurality of first patterns and a plurality of second patterns are arranged in the second direction, and a plurality of third patterns and a plurality of fourth patterns are arranged in the first direction, first ends of the plurality of first and third patterns are electrically connected to the control unit, and second ends thereof are electrically opened, and second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit senses the stylus pen by using at least one sensing pattern among the plurality of first to fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a first pattern including first-a patterns and first-b patterns that are alternately arranged in a first direction; a second pattern disposed adjacent to the first pattern; a third pattern extending in a second direction different from the first direction; and a fourth pattern disposed adjacent to the third pattern and extending in the second direction. Also, the first-a patterns are electrically connected to each other, the first-b patterns are electrically connected to each other, a plurality of first patterns and a plurality of second patterns are arranged in the second direction, a plurality of third patterns and a plurality of fourth patterns are arranged in the first direction, first ends of the plurality of first and third patterns are electrically connected to the control unit, and second ends thereof are electrically opened, second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit drives the stylus pen by using at least one driving pattern among the plurality of first to fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a first pattern including first-a patterns and first-b patterns that are alternately arranged in a first direction; a second pattern disposed adjacent to the first pattern; a third pattern extending in a second direction different from the first direction; and a fourth pattern disposed adjacent to the third pattern and extending in the second direction. Also, the first-a patterns are electrically connected to each other, the first-b patterns are electrically connected to each other, a plurality of first patterns and a plurality of second patterns are arranged in the second direction, a plurality of third patterns and a plurality of fourth patterns are arranged in the first direction, first ends of the plurality of first and third patterns are electrically connected to the control unit, and second ends thereof are electrically opened, second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit drives the stylus pen by using at least one driving pattern among the plurality of first to fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns arranged in a first direction and a second direction different from the first direction and each having an opening; a plurality of second patterns disposed in the openings of the first patterns; a plurality of third patterns disposed on the same layer as the plurality of first patterns and each extending in the second direction and each having an opening; and a plurality of fourth patterns disposed in the openings of the plurality of third patterns, respectively, and each extending in the second direction. Also, the first patterns arranged in the first direction among the plurality of first patterns are electrically connected to each other through a conductive bridge, among the first patterns arranged in the first direction, the first pattern disposed on a first end is connected to the control unit, and the first pattern disposed on a second end is electrically opened, the second patterns arranged in the first direction among the plurality of second patterns are electrically connected to each other through a conductive bridge, the second pattern disposed on a second end among the second patterns arranged in the first direction are electrically connected to other second patterns arranged in the second direction, first ends of the plurality of third patterns are electrically connected to the control unit, and second ends thereof are electrically opened, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit drives the stylus pen by using at least one driving pattern among the plurality of first to fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns arranged in a first direction and a second direction different from the first direction and each having an opening; a plurality of second patterns disposed in the openings of the plurality of first patterns; a plurality of third patterns arranged on the same layer as the plurality of first patterns, each extending in the second direction, and each having an opening; and a plurality of fourth patterns arranged in the openings of the plurality of third patterns, respectively, and each extending in the second direction. Also, the first patterns arranged in the first direction among the plurality of first patterns are electrically connected to each other through a conductive bridge, among the first patterns arranged in the first direction, the first pattern disposed on a first end is connected to the control unit, and the first pattern disposed on a second end is electrically opened, the second pattern arranged in the first direction among the plurality of second patterns are electrically connected through a conductive bridge, among the second patterns arranged in the first direction, the second pattern disposed on a second end is connected to other second patterns arranged in the second direction, first ends of the plurality of third patterns are electrically connected to the control unit, and second ends thereof are electrically opened, and second ends of the plurality of fourth patterns are electrically connected to each other. also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit senses the stylus pen by using at least one sensing pattern among the plurality of first to fourth patterns.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction; and a plurality of second patterns each extending in a second direction different from the first direction. Also, each of the first patterns includes a plurality of first-1 patterns, a plurality of first-2 patterns, and a connection pattern configured to connect at least two first-1 patterns to each other among the plurality of first-1 patterns, and the plurality of first-2 patterns are electrically connected to each other. Also, each of the second patterns includes a plurality of second-1 patterns, a plurality of second-2 patterns, the plurality of second-1 patterns are electrically connected to each other, and the plurality of second-2 patterns are electrically connected to each other. Also, the first-1 patterns disposed on a second end among the plurality of first-1 patterns are electrically opened, and the first-2 patterns disposed on the second end among the plurality of first-2 patterns are electrically connected to each other. Also, the second-1 patterns disposed on the second end among the plurality of second-1 patterns are electrically opened, and the second-2 patterns disposed on the second end among the plurality of second-2 patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit drives the stylus pen by using at least one driving pattern among the first-1 pattern, the first-2 pattern, the second-1 pattern, and the second-2 pattern.

Another embodiment of the present invention provides a pen and touch input system including: a touch input device including a sensor unit and a control unit configured to control the sensor unit; and a stylus pen configured to interact with the touch input device. Here, the sensor unit includes: a plurality of first patterns each extending in a first direction; and a plurality of second patterns each extending in a second direction different from the first direction. Also, each of the first patterns includes a plurality of first-1 patterns, a plurality of first-2 patterns, and a connection pattern configured to connect at least two first-1 patterns to each other among the plurality of first-1 patterns, and the plurality of first-2 patterns are electrically connected to each other. Also, each of the second patterns includes a plurality of second-1 patterns, a plurality of second-2 patterns, the plurality of second-1 patterns are electrically connected to each other, and the plurality of second-2 patterns are electrically connected to each other. Also, the first-1 patterns disposed on a second end among the plurality of first-1 patterns are electrically opened, and the first-2 patterns disposed on the second end among the plurality of first-2 patterns are electrically connected to each other. Also, the second-1 patterns disposed on the second end among the plurality of second-1 patterns are electrically opened, and the second-2 patterns disposed on the second end among the plurality of second-2 patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the control unit senses the stylus pen by using at least one sensing pattern among the first-1 pattern, the first-2 pattern, the second-1 pattern, and the second-2 pattern.

Here, the ferrite core may have a dielectric constant of 1000 or less, the coil may be formed such that adjacent winding layers are alternately wound, and the coil is a wire that surrounds two or more insulating wires.

Here, the coil may be formed such that adjacent winding layers are wound in an inclined zigzag pattern.

Here, the ferrite core may include nickel.

Here, the coil may be a litz wire.

Here, the pen and touch input system may further include a bobbin that surrounds at least a portion of the ferrite core, and the coil may be wound around at least a portion of the bobbin.

Here, the inductor part may be formed such that two or more inductor parts are connected in series.

The pen and touch input system may further include a conductive blocking member disposed on at least a portion of the inductor part.

Here, the blocking member may include one slit configured to block generation of an eddy current, both ends of the blocking member may be spaced apart from each other in the first direction by the one slit, and the first direction may be a direction in which the eddy current is formed.

Here, any one of the first to fourth patterns may include a plurality of diamond patterns and a connection pattern configured to connect two adjacent diamond patterns among the plurality of diamond patterns.

Here, the first-1 pattern may have a diamond shape, and the connection pattern may connect two adjacent first-1 patterns.

Here, the first-1 pattern or the first-2 pattern may have a diamond shape, and the first pattern may further include a connection pattern configured to connect two adjacent first-2 patterns.

Here, the first pattern or the third pattern may have an opening, and the second pattern or the fourth pattern may be disposed in the opening of the first pattern or the third pattern, respectively.

Here, the first-1 pattern or the second-1 pattern may have an opening, and the first-2 pattern or the second-2 pattern may be disposed in the opening of the first-1 pattern or the second-1 pattern, respectively.

Here, the first pattern or the third pattern may surround the second pattern or the fourth pattern, respectively.

Here, the first-1 pattern or the second-1 pattern may surround the first-2 pattern or the second-2 pattern, respectively.

Here, the first pattern and the second may be disposed on the same layer, or the third pattern and the fourth pattern may be disposed on the same layer.

Here, the first pattern and the second pattern may be disposed on the same layer.

Here, at least a portion of the first pattern and at least a portion of the second pattern may be disposed on a first layer, and at least a portion of the second pattern and at least a portion of the fourth pattern may be disposed on a second layer.

Here, at least a portion of the first-1 pattern, at least a portion of the first-2 pattern, and at least a portion of the connection pattern may be disposed on a first layer, and at least a portion of the second-1 pattern and at least a portion of the second-2 pattern may be disposed on a second layer.

Here, the plurality of first-2 pattern, the second-1 pattern, or the plurality of second-2 pattern may be electrically connected to each other by a structure different from that of the connection pattern configured to connect the first-1 patterns to each other.

Here, the plurality of first-2 pattern, the plurality of second-1 pattern, or the plurality of second-2 pattern may be electrically connected to each other through a bridge and a via.

Here, the pen and touch input system may further include a second connection pattern configured to connect at least two adjacent first-2 patterns among the plurality of first-2 patterns, and the second-1 pattern or the plurality of second-2 patterns may be electrically connected to each other by a structure different from that of the connection pattern configured to connect the first-1 patterns to each other.

Here, the plurality of second-1 patterns or the plurality of second-2 patterns may be electrically connected to each other through a bridge and a via.

Here, second ends of the plurality of second and fourth patterns may be electrically connected to each other through a via.

Here, the first-2 patterns disposed on the second end among the plurality of first-2 patterns may be electrically connected through a via.

Here, the second-2 patterns disposed on the second end among the plurality of second-2 patterns may be electrically connected to each other through a via.

Here, the first-1 patterns disposed on the second end among the plurality of first-1 patterns may have a shape opened in the first direction, and the first-2 patterns disposed on the second end among the plurality of first-2 patterns may be electrically connected through the connection pattern.

Here, the second-1 patterns disposed on the second end among the plurality of second-1 patterns may have a shape opened in the second direction, and the second-2 patterns disposed on the second end among the plurality of second-2 patterns may be electrically connected through the connection pattern.

Here, a first end of the first-a patterns may be electrically opened, a second end of the first-a patterns may be electrically connected to the control unit, a first end of the first-b patterns may be electrically connected to the control unit, and a second end of the first-b patterns may be electrically opened.

Here, the control unit may apply a driving signal for touch sensing to at least one first pattern among the plurality of first patterns and receive a sensing signal received from at least one third pattern among the plurality of third patterns.

Here, the control unit may include a recording medium in which a program is recorded for executing: a process of applying a driving signal for touch sensing to at least one first pattern among the plurality of first patterns; and a process of receiving a sensing signal received from at least one third pattern among the plurality of third patterns.

Here, the control unit may: apply a driving signal for touch sensing to at least one first-1 pattern among the plurality of first-1 patterns and receive a sensing signal received from at least one second-1 pattern among the plurality of second-1 patterns; or apply a driving signal for touch sensing to at least one second-1 pattern among the plurality of second-1 patterns and receive a sensing signal received from at least one first-1 pattern among the plurality of first-1 patterns.

Here, the control unit may include a recording medium in which a program is recorded for executing: a process of applying a driving signal for touch sensing to at least one first-1 pattern among the plurality of first-1 patterns and a process of receiving a sensing signal received from at least one second-1 pattern among the plurality of second-1 patterns; or a process of applying a driving signal for touch sensing to at least one second-1 pattern among the plurality of second-1 patterns and a process of receiving a sensing signal received from at least one first-1 pattern among the plurality of first-1 patterns.

Here, the control unit may further include: a plurality of driving circuit units for touch sensing; and a plurality of sensing circuit units for touch sensing, and the control unit may control to: apply a driving signal for touch sensing to at least one driving pattern among the plurality of first or third patterns through the plurality of driving circuit units for touch sensing, and receive a sensing signal for touch sensing received from at least one sensing pattern among the plurality of first or third patterns through the plurality of sensing circuit units for touch sensing.

Here, the control unit may further include: a plurality of driving circuit units for touch sensing; and a plurality of sensing circuit units for touch sensing, and the control unit may control to: apply a driving signal for touch sensing to at least one driving pattern among the plurality of first-1 or second-1 patterns through the plurality of driving circuit units for touch sensing, and receive a sensing signal for touch sensing received from at least one sensing pattern among the plurality of first-1 or second-1 patterns through the plurality of sensing circuit units for touch sensing.

Here, the control unit may allow: a driving signal to be outputted to at least one driving pattern among the plurality of driving patterns, and a driving signal opposite to the above-described driving signal to be outputted to at least another driving pattern among the plurality of driving patterns.

Here, the control unit may include a recording medium in which a program is recorded for executing: a process of outputting a driving signal to at least one driving pattern among the plurality of driving patterns, and a process of outputting a driving signal opposite to the above-described driving signal to at least another driving pattern among the plurality of driving patterns.

Here, the control unit may include a plurality of driving circuit units for pen driving, and the control unit may control to: apply a driving signal to at least one driving pattern through at least one driving circuit unit for pen driving through at least one driving circuit unit for pen driving among the plurality of driving circuit for pen driving; and apply a driving signal opposite to the above-described driving signal to at least another driving pattern through at least another driving circuit unit for pen driving among the plurality of driving circuit units for pen driving.

Here, the control unit may control to sense the pen based on an output value from at least one sensing pattern among the plurality of sensing patterns and an output value from at least one sensing pattern among other sensing patterns different from the plurality of sensing patterns.

Here, the control unit may include a recording medium in which a program is recorded for executing: a process of sensing the pen based on an output value from at least one sensing pattern among the plurality of sensing patterns and an output value from at least one sensing pattern among other sensing patterns different from the plurality of sensing patterns.

Here, the control unit may include a plurality of sensing circuit units for pen sensing, and the control unit may control to sense the pen based on an outer value from at least one sensing pattern among the plurality of sensing patterns, which is sensed through at least one sensing circuit unit for pen sensing among the plurality of sensing circuit units for pen sensing and an output value from at least one sensing pattern among other sensing patterns different from the plurality of sensing patterns which is sensed through at least one sensing circuit unit for pen sensing among the plurality of sensing circuit units for pen sensing.

Here, at least a portion of the sensing circuit unit for pen sensing may be used for touch sensing.

Here, the pen and touch input system may further include a capacitor connected to a pattern of the second end among the plurality of second patterns or the plurality of fourth patterns.

Here, the pen and touch input system may further include a capacitor connected to a pattern of the second end among the plurality of first-2 patterns or the plurality of second-2 patterns.

Here, the second pattern may be a bar pattern disposed in the first pattern and extending in the first direction, and the fourth pattern may be a bar pattern disposed in the third pattern and extending in the second direction. Here, the pen and touch input system may further include: a plurality of fifth patterns disposed between the plurality of first patterns, having a shape corresponding to and overlapping a main pattern part of the third pattern, and electrically connected to the fourth pattern; a capacitor connected to a pattern of the second end among the plurality of fifth patterns; a plurality of sixth patterns disposed between the plurality of third patterns, having a shape corresponding to and overlapping a main pattern part of the first pattern, and electrically connected to the second pattern; and a capacitor connected to the pattern of the second end among the plurality of sixth patterns.

Here, the pen and touch input system may further include at least one trace directly connected to a portion at which the patterns disposed on the second end are electrically connected to each other and disposed outside an active area of the touch input device.

An embodiment of the present invention provides a controller configured to control a touch input device including a sensor unit and interacting with a stylus pen. Here, the sensor unit includes: a first pattern extending in a first direction; a second pattern disposed adjacent to the first pattern and extending in the first direction; a third pattern extending in a second direction different from the first direction; and a fourth pattern disposed adjacent to the third pattern and extending in the second direction. Also, a plurality of first patterns and a plurality of second patterns are arranged in the second direction, and a plurality of third patterns and a plurality of fourth patterns are arranged in the first direction, first ends of the plurality of first and third patterns are electrically connected to the controller, and second ends thereof are electrically opened, and second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller drives the stylus pen by using at least one driving pattern among the plurality of first to fourth patterns.

Another embodiment of the present invention provides a controller configured to control a touch input device including a sensor unit and interacting with a stylus pen. Here, the sensor unit includes: a first pattern extending in a first direction; a second pattern disposed adjacent to the first pattern and extending in the first direction; a third pattern extending in a second direction different from the first direction; and a fourth pattern disposed adjacent to the third pattern and extending in the second direction. Also, a plurality of first patterns and a plurality of second patterns are arranged in the second direction, and a plurality of third patterns and a plurality of fourth patterns are arranged in the first direction, first ends of the plurality of first and third patterns are electrically connected to the controller, and second ends thereof are electrically opened, and second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller senses the stylus pen by using at least one sensing pattern among the plurality of first to fourth patterns.

Another embodiment of the present invention provides a controller configured to control a touch input device including a sensor unit and interacting with a stylus pen. Here, the sensor unit includes: a first pattern including first-a patterns and first-b patterns that are alternately arranged in a first direction; a second pattern disposed adjacent to the first pattern; a third pattern extending in a second direction different from the first direction; and a fourth pattern disposed adjacent to the third pattern and extending in the second direction. Also, the first-a patterns are electrically connected to each other, the first-b patterns are electrically connected to each other, a plurality of first patterns and a plurality of second patterns are arranged in the second direction, a plurality of third patterns and a plurality of fourth patterns are arranged in the first direction, first ends of the plurality of first and third patterns are electrically connected to the controller, and second ends thereof are electrically opened, second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller drives the stylus pen by using at least one driving pattern among the plurality of first to fourth patterns.

Another embodiment of the present invention provides a controller configured to control a touch input device including a sensor unit and interacting with a stylus pen. Here, the sensor unit includes: a first pattern including first-a patterns and first-b patterns that are alternately arranged in a first direction; a second pattern disposed adjacent to the first pattern; a third pattern extending in a second direction different from the first direction; and a fourth pattern disposed adjacent to the third pattern and extending in the second direction. Also, the first-a patterns are electrically connected to each other, the first-b patterns are electrically connected to each other, a plurality of first patterns and a plurality of second patterns are arranged in the second direction, a plurality of third patterns and a plurality of fourth patterns are arranged in the first direction, first ends of the plurality of first and third patterns are electrically connected to the controller, and second ends thereof are electrically opened, second ends of the plurality of second patterns are electrically connected to each other, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller drives the stylus pen by using at least one driving pattern among the plurality of first to fourth patterns.

Another embodiment of the present invention provides a controller configured to control a touch input device including a sensor unit and interacting with a stylus pen. Here, the sensor unit includes: a plurality of first patterns arranged in a first direction and a second direction different from the first direction and each having an opening; a plurality of second patterns disposed in the openings of the first patterns; a plurality of third patterns disposed on the same layer as the plurality of first patterns and each extending in the second direction and each having an opening; and a plurality of fourth patterns disposed in the openings of the plurality of third patterns, respectively, and each extending in the second direction. Also, the first patterns arranged in the first direction among the plurality of first patterns are electrically connected to each other through a conductive bridge, among the first patterns arranged in the first direction, the first pattern disposed on a first end is connected to the controller, and the first pattern disposed on a second end is electrically opened, the second patterns arranged in the first direction among the plurality of second patterns are electrically connected to each other through a conductive bridge, the second pattern disposed on a second end among the second patterns arranged in the first direction are electrically connected to other second patterns arranged in the second direction, first ends of the plurality of third patterns are electrically connected to the controller, and second ends thereof are electrically opened, and second ends of the plurality of fourth patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller drives the stylus pen by using at least one driving pattern among the plurality of first to fourth patterns.

Another embodiment of the present invention provides a controller configured to control a touch input device including a sensor unit and interacting with a stylus pen. Here, the sensor unit includes: a plurality of first patterns arranged in a first direction and a second direction different from the first direction and each having an opening; a plurality of second patterns disposed in the openings of the plurality of first patterns; a plurality of third patterns arranged on the same layer as the plurality of first patterns, each extending in the second direction, and each having an opening; and a plurality of fourth patterns arranged in the openings of the plurality of third patterns, respectively, and each extending in the second direction. Also, the first patterns arranged in the first direction among the plurality of first patterns are electrically connected to each other through a conductive bridge, among the first patterns arranged in the first direction, the first pattern disposed on a first end is connected to the controller, and the first pattern disposed on a second end is electrically opened, the second pattern arranged in the first direction among the plurality of second patterns are electrically connected through a conductive bridge, among the second patterns arranged in the first direction, the second pattern disposed on a second end is connected to other second patterns arranged in the second direction, first ends of the plurality of third patterns are electrically connected to the controller, and second ends thereof are electrically opened, and second ends of the plurality of fourth patterns are electrically connected to each other. also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller senses the stylus pen by using at least one sensing pattern among the plurality of first to fourth patterns.

Another embodiment of the present invention provides a controller configured to control a touch input device including a sensor unit and interacting with a stylus pen. Here, the sensor unit includes: a plurality of first patterns each extending in a first direction; and a plurality of second patterns each extending in a second direction different from the first direction. Also, each of the first patterns includes a plurality of first-1 patterns, a plurality of first-2 patterns, and a connection pattern configured to connect at least two first-1 patterns to each other among the plurality of first-1 patterns, and the plurality of first-2 patterns are electrically connected to each other. Also, each of the second patterns includes a plurality of second-1 patterns, a plurality of second-2 patterns, the plurality of second-1 patterns are electrically connected to each other, and the plurality of second-2 patterns are electrically connected to each other. Also, the first-1 patterns disposed on a second end among the plurality of first-1 patterns are electrically opened, and the first-2 patterns disposed on the second end among the plurality of first-2 patterns are electrically connected to each other. Also, the second-1 patterns disposed on the second end among the plurality of second-1 patterns are electrically opened, and the second-2 patterns disposed on the second end among the plurality of second-2 patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller drives the stylus pen by using at least one driving pattern among the first-1 pattern, the first-2 pattern, the second-1 pattern, and the second-2 pattern.

Another embodiment of the present invention provides a controller configured to control a touch input device including a sensor unit and interacting with a stylus pen. Here, the sensor unit includes: a plurality of first patterns each extending in a first direction; and a plurality of second patterns each extending in a second direction different from the first direction. Also, each of the first patterns includes a plurality of first-1 patterns, a plurality of first-2 patterns, and a connection pattern configured to connect at least two first-1 patterns to each other among the plurality of first-1 patterns, and the plurality of first-2 patterns are electrically connected to each other. Also, each of the second patterns includes a plurality of second-1 patterns, a plurality of second-2 patterns, the plurality of second-1 patterns are electrically connected to each other, and the plurality of second-2 patterns are electrically connected to each other. Also, the first-1 patterns disposed on a second end among the plurality of first-1 patterns are electrically opened, and the first-2 patterns disposed on the second end among the plurality of first-2 patterns are electrically connected to each other. Also, the second-1 patterns disposed on the second end among the plurality of second-1 patterns are electrically opened, and the second-2 patterns disposed on the second end among the plurality of second-2 patterns are electrically connected to each other. Also, the stylus pen includes: a body part; a tip exposed to the outside in the body part; an inductor part including a ferrite core disposed in the body part and a coil wound in multiple layers around at least a portion of the ferrite core; and a capacitor part disposed in the body part and electrically connected to the inductor part to form a resonance circuit. Also, the controller senses the stylus pen by using at least one sensing pattern among the first-1 pattern, the first-2 pattern, the second-1 pattern, and the second-2 pattern.

Here, the ferrite core may have a dielectric constant of 1000 or less, the coil may be formed such that adjacent winding layers are alternately wound, and the coil is a wire that surrounds two or more insulating wires.

Here, the coil may be formed such that adjacent winding layers are wound in an inclined zigzag pattern.

Here, the ferrite core may include nickel.

Here, the coil may be a litz wire.

Here, the controller may further include a bobbin that surrounds at least a portion of the ferrite core, and the coil may be wound around at least a portion of the bobbin.

Here, the inductor part may be formed such that two or more inductor parts are connected in series.

The controller may further include a conductive blocking member disposed on at least a portion of the inductor part.

Here, the blocking member may include one slit configured to block generation of an eddy current, both ends of the blocking member may be spaced apart from each other in the first direction by the one slit, and the first direction may be a direction in which the eddy current is formed.

Here, any one of the first to fourth patterns may include a plurality of diamond patterns and a connection pattern configured to connect two adjacent diamond patterns among the plurality of diamond patterns.

Here, the first-1 pattern may have a diamond shape, and the connection pattern may connect two adjacent first-1 patterns.

Here, the first-1 pattern or the first-2 pattern may have a diamond shape, and the first pattern may further include a connection pattern configured to connect two adjacent first-2 patterns.

Here, the first pattern or the third pattern may have an opening, and the second pattern or the fourth pattern may be disposed in the opening of the first pattern or the third pattern.

Here, the first-1 pattern or the second-1 pattern may have an opening, and the first-2 pattern or the second-2 pattern may be disposed in the opening of the first-1 pattern or the second-1 pattern.

Here, the first pattern or the third pattern may surround the second pattern or the fourth pattern, respectively.

Here, the first-1 pattern or the second-1 pattern may surround the first-2 pattern or the second-2 pattern, respectively.

Here, the first pattern and the second may be disposed on the same layer, or the third pattern and the fourth pattern may be disposed on the same layer.

Here, the first pattern and the second pattern may be disposed on the same layer.

Here, at least a portion of the first pattern and at least a portion of the second pattern may be disposed on a first layer, and at least a portion of the second pattern and at least a portion of the fourth pattern may be disposed on a second layer.

Here, at least a portion of the first-1 pattern, at least a portion of the first-2 pattern, and at least a portion of the connection pattern may be disposed on a first layer, and at least a portion of the second-1 pattern and at least a portion of the second-2 pattern may be disposed on a second layer.

Here, the plurality of first-2 pattern, the second-1 pattern, or the plurality of second-2 pattern may be electrically connected to each other by a structure different from that of the connection pattern configured to connect the first-1 patterns to each other.

Here, the plurality of first-2 pattern, the plurality of second-1 pattern, or the plurality of second-2 pattern may be electrically connected to each other through a bridge and a via.

Here, the controller may further include a second connection pattern configured to connect at least two adjacent first-2 patterns among the plurality of first-2 patterns, and the second-1 pattern or the plurality of second-2 patterns may be electrically connected to each other by a structure different from that of the connection pattern configured to connect the first-1 patterns to each other.

Here, the plurality of second-1 patterns or the plurality of second-2 patterns may be electrically connected to each other through a bridge and a via.

Here, second ends of the plurality of second and fourth patterns may be electrically connected to each other through a via.

Here, the first-2 patterns disposed on the second end among the plurality of first-2 patterns may be electrically connected through a via.

Here, the second-2 patterns disposed on the second end among the plurality of second-2 patterns may be electrically connected to each other through a via.

Here, the first-1 patterns disposed on the second end among the plurality of first-1 patterns may have a shape opened in the first direction, and the first-2 patterns disposed on the second end among the plurality of first-2 patterns may be electrically connected through the connection pattern.

Here, the second-1 patterns disposed on the second end among the plurality of second-1 patterns may have a shape opened in the second direction, and the second-2 patterns disposed on the second end among the plurality of second-2 patterns may be electrically connected through the connection pattern.

Here, a first end of the first-a patterns may be electrically opened, a second end of the first-a patterns may be electrically connected to the controller, a first end of the first-b patterns may be electrically connected to the controller, and a second end of the first-b patterns may be electrically opened.

Here, the controller may apply a driving signal for touch sensing to at least one first pattern among the plurality of first patterns and receive a sensing signal received from at least one third pattern among the plurality of third patterns.

Here, the controller may include a recording medium in which a program is recorded for executing: a process of applying a driving signal for touch sensing to at least one first pattern among the plurality of first patterns; and a process of receiving a sensing signal received from at least one third pattern among the plurality of third patterns.

Here, the controller may: apply a driving signal for touch sensing to at least one first-1 pattern among the plurality of first-1 patterns and receive a sensing signal received from at least one second-1 pattern among the plurality of second-1 patterns; or apply a driving signal for touch sensing to at least one second-1 pattern among the plurality of second-1 patterns and receive a sensing signal received from at least one first-1 pattern among the plurality of first-1 patterns.

Here, the controller may include a recording medium in which a program is recorded for executing: a process of applying a driving signal for touch sensing to at least one first-1 pattern among the plurality of first-1 patterns and a process of receiving a sensing signal received from at least one second-1 pattern among the plurality of second-1 patterns; or a process of applying a driving signal for touch sensing to at least one second-1 pattern among the plurality of second-1 patterns and a process of receiving a sensing signal received from at least one first-1 pattern among the plurality of first-1 patterns.

Here, the controller may further include: a plurality of driving circuit units for touch sensing; and a plurality of sensing circuit units for touch sensing, and the controller may control to: apply a driving signal for touch sensing to at least one driving pattern among the plurality of first or third patterns through the plurality of driving circuit units for touch sensing, and receive a sensing signal for touch sensing received from at least one sensing pattern among the plurality of first or third patterns through the plurality of sensing circuit units for touch sensing.

Here, the controller may further include: a plurality of driving circuit units for touch sensing; and a plurality of sensing circuit units for touch sensing, and the controller may control to: apply a driving signal for touch sensing to at least one driving pattern among the plurality of first or third patterns through the plurality of driving circuit units for touch sensing, and receive a sensing signal for touch sensing received from at least one sensing pattern among the plurality of first or third patterns through the plurality of sensing circuit units for touch sensing.

Here, the controller may further include: a plurality of driving circuit units for touch sensing; and a plurality of sensing circuit units for touch sensing, and the controller may control to: apply a driving signal for touch sensing to at least one driving pattern among the plurality of first-1 or second-1 patterns through the plurality of driving circuit units for touch sensing, and receive a sensing signal for touch sensing received from at least one sensing pattern among the plurality of first-1 or second-1 patterns through the plurality of sensing circuit units for touch sensing.

Here, the controller may further include: a plurality of driving circuit units for touch sensing; and a plurality of sensing circuit units for touch sensing, and the controller may control to: apply a driving signal for touch sensing to at least one driving pattern among the plurality of first-1 or second-1 patterns through the plurality of driving circuit units for touch sensing, and receive a sensing signal for touch sensing received from at least one sensing pattern among the plurality of first-1 or second-1 patterns through the plurality of sensing circuit units for touch sensing.

Here, the controller may allow: a driving signal to be outputted to at least one driving pattern among the plurality of driving patterns, and a driving signal opposite to the above-described driving signal to be outputted to at least another driving pattern among the plurality of driving patterns.

Here, the controller may include a recording medium in which a program is recorded for executing: a process of outputting a driving signal to at least one driving pattern among the plurality of driving patterns, and a process of outputting a driving signal opposite to the above-described driving signal to at least another driving pattern among the plurality of driving patterns.

Here, the controller may include a plurality of driving circuit units for pen driving, and the controller may control to: apply a driving signal to at least one driving pattern through at least one driving circuit unit for pen driving through at least one driving circuit unit for pen driving among the plurality of driving circuit for pen driving; and apply a driving signal opposite to the above-described driving signal to at least another driving pattern through at least another driving circuit unit for pen driving among the plurality of driving circuit units for pen driving.

Here, the controller may include a plurality of driving circuit units for pen driving, and the controller may control to: apply a driving signal to at least one driving pattern through at least one driving circuit unit for pen driving through at least one driving circuit unit for pen driving among the plurality of driving circuit for pen driving; and apply a driving signal opposite to the above-described driving signal to at least another driving pattern through at least another driving circuit unit for pen driving among the plurality of driving circuit units for pen driving.

Here, the controller may control to sense the pen based on an output value from at least one sensing pattern among the plurality of sensing patterns and an output value from at least one sensing pattern among other sensing patterns different from the plurality of sensing patterns.

Here, the controller may include a recording medium in which a program is recorded for executing: a process of sensing the pen based on an output value from at least one sensing pattern among the plurality of sensing patterns and an output value from at least one sensing pattern among other sensing patterns different from the plurality of sensing patterns.

Here, the controller may include a plurality of sensing circuit units for pen sensing, and the controller may control to sense the pen based on an outer value from at least one sensing pattern among the plurality of sensing patterns, which is sensed through at least one sensing circuit unit for pen sensing among the plurality of sensing circuit units for pen sensing and an output value from at least one sensing pattern among other sensing patterns different from the plurality of sensing patterns which is sensed through at least one sensing circuit unit for pen sensing among the plurality of sensing circuit units for pen sensing.

Here, at least a portion of the sensing circuit unit for pen sensing may be used for touch sensing.

Here, the controller may include a plurality of sensing circuit units for pen sensing, and the controller may control to sense the pen based on an outer value from at least one sensing pattern among the plurality of sensing patterns, which is sensed through at least one sensing circuit unit for pen sensing among the plurality of sensing circuit units for pen sensing and an output value from at least one sensing pattern among other sensing patterns different from the plurality of sensing patterns which is sensed through at least one sensing circuit unit for pen sensing among the plurality of sensing circuit units for pen sensing.

Here, at least a portion of the sensing circuit unit for pen sensing may be used for touch sensing.

Here, the controller may further include a capacitor connected to a pattern of the second end among the plurality of second patterns or the plurality of fourth patterns.

Here, the controller may further include a capacitor connected to a pattern of the second end among the plurality of first-2 patterns or the plurality of second-2 patterns.

Here, the second pattern may be a bar pattern disposed in the first pattern and extending in the first direction, and the fourth pattern may be a bar pattern disposed in the third pattern and extending in the second direction. Here, the controller may further include: a plurality of fifth patterns disposed between the plurality of first patterns, having a shape corresponding to and overlapping a main pattern part of the third pattern, and electrically connected to the fourth pattern; a capacitor connected to a pattern of the second end among the plurality of fifth patterns; a plurality of sixth patterns disposed between the plurality of third patterns, having a shape corresponding to and overlapping a main pattern part of the first pattern, and electrically connected to the second pattern; and a capacitor connected to the pattern of the second end among the plurality of sixth patterns.

Here, the controller may further include at least one trace directly connected to a portion at which the patterns disposed on the second end are electrically connected to each other and disposed outside an active area of the touch input device.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 21A to 21F are schematic views for explaining an operation principle of the stylus sensing mode of FIG. 20;

FIG. 35 is a table showing characteristics of various embodiments in FIGS. 16, 27, and 31;

DETAILED DESCRIPTION

Figure 1A:
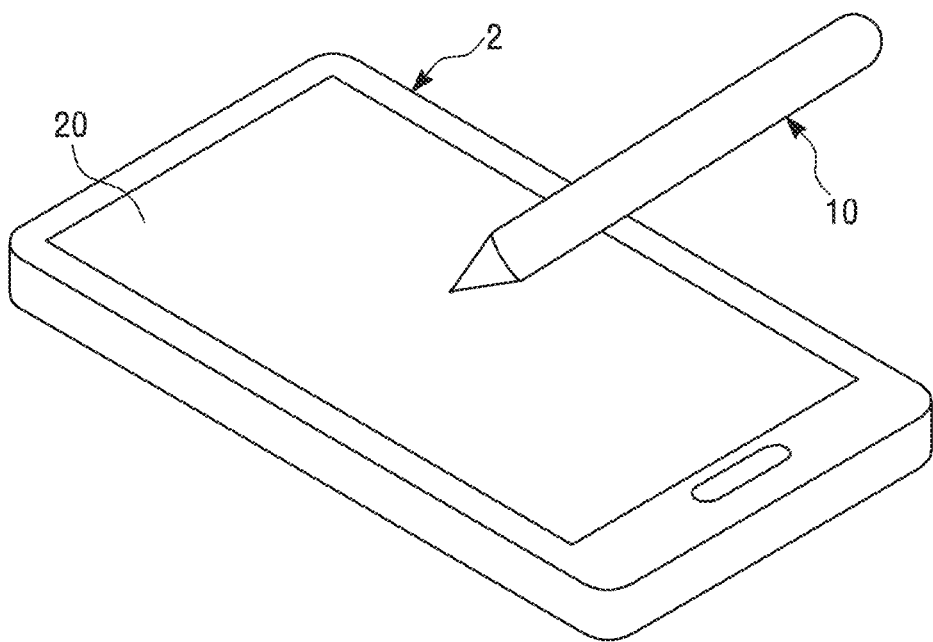
FIG. 1A is a conceptual view illustrating a pen including a stylus pen and a touch input device and a touch input system.

Hereinafter, the present invention will be described with reference to the accompanying drawings showing various embodiments of the invention. The present invention may, however, be embodied in different forms and should not be construed as limited to the embodiments set forth herein. Rather, the present invention covers various modifications, equivalents, and/or alternatives of the embodiments of the invention. When the drawings are described, like reference numerals refer to like elements throughout.

Also, it will be understood that the embodiments disclosed in this specification includes some variations without limitations to the shapes as illustrated in the figures. In the drawings, the thicknesses of layers and regions are exaggerated for clarity of illustration. Also, in the drawings, the thickness of some layers and regions are exaggerated for convenience of description.

In the specification, it will be understood that when a layer (or film), a region, or a plate is referred to as being 'on' another layer, region, or plate, it can be directly on the other layer, region, or plate, or intervening layers, regions, or plates may also be present. On the other hand, it will also be understood that when a layer, a film, an area or a plate is referred to as being "directly on" another one, intervening layers, films, areas, and plates may not be present. Further, in the specification, the term "on" or "above" represents a feature of being positioned on or below the object, and does not represent a feature of being positioned "on" or "above" the object based on a gravitational direction.

In this specification, expressions such as "have", "may have", "includes", or "may include" refer to the presence of a corresponding characteristic (e.g., a numerical value, function, operation, or component such as a part), and does not exclude the presence of additional features.

In this specification, expressions such as "A or B", "at least one of A or/and B", or "one or more of A and/or B" may include all possible combinations of the items listed together. For example, the expressions "A or B", "at least one of A and B", or "at least one of A or B" may refer to all of (1) including at least one A, (2) including at least one B, or (3) a case of including both at least one A and at least one B.

In this specification, expressions such as "first" or "second" used herein may modify various components regardless of order and/or importance and be used only to distinguish one component from another component instead of limiting the corresponding component. For example, a first user device and a second user device may represent different user devices regardless of order or importance. For example, a first component referred to as a first component in one embodiment can be referred to as a second component in another embodiment without departing from the scope of the appended claims, and similarly, the second component may also be renamed as the first component.

When a component (e.g., a first component) is (operatively or communicatively) "coupled or connected with/to" another component (e.g., a second component), it should be understood that one component may be connected to another component in a direct way or through another component (e.g., a third component). When a component (e.g., a first component) is directly "coupled or connected with/to" another component (e.g., a second component), it may be understood that no other component (e.g., a third component) exists between one component and another component.

In this specification, the expression "configured to (or set to)" may be used interchangeably with, e.g., "suitable for", "having the capacity to", "designed to", "adapted to", "made to", or "capable of" depending on the situation. The term "configured to (or set to)" may not necessarily refer to only "specifically designed to" in terms of hardware. Instead, in some circumstances, the expression "a device configured to~" may indicate that the device is "capable of~" with other devices or components. For example, the phrase "a processor configured to (or set to) perform A, B, and C" may indicate a generic-purpose processor (e.g., a CPU or an application processor) capable of performing corresponding operations by executing one or more software programs stored in a dedicated processor (e.g., an embedded processor) or memory device for performing the corresponding operation.

Terms used herein may be used only to describe specific embodiments, and may not be intended to limit the scope of other embodiments. The terms of a singular form may include plural forms unless referred to the contrary. Terms used herein, including technical or scientific terms, may have the same meanings as commonly understood by a person skilled in the art described in this specification. Among the terms used in this specification, terms defined in a general dictionary may be interpreted as having the same or similar meaning as the meaning in the context of the related art, and unless explicitly defined in this specification, it should not be construed in an ideal or overly formal sense. In some cases, even terms defined in this document may not be construed to exclude embodiments of this document.

A touch input device according to various embodiments of the present document may include at least one of, e.g., a smartphone, a tablet personal computer (PC), a mobile phone, a video phone, an e-book reader, a laptop personal computer (PC), a netbook computer, a mobile medical device, a camera, or a wearable device. According to various embodiments, the wearable device may include at least one of an accessory (e.g., a watch, a ring, a bracelet, an anklet, a necklace, glasses, contact lenses, or a head-mounted-device (HMD)), a fabric or integrated garment (e.g., electronic clothing), a body attachable (e.g., a skin pad or tattoo), and a bio-implantable (e.g., an implantable circuit).

Hereinafter, a controller for controlling a touch input device including a sensor unit and interacting with a stylus pen according to an embodiment of the present invention will be described with reference to the accompanying drawings.

When the controller according to an embodiment of the present invention is described, a pen and touch input system including a touch input device including a sensor unit and a control unit for controlling the sensor unit and a stylus pen interacting with the touch input device will be described in detail.

FIG. 1A is a conceptual view illustrating a pen including a stylus pen and a touch input device and a touch input system.

Referring to FIG. 1A, a stylus pen 10 may receive (or uplink) a signal outputted from a touch input device 2 or a touch screen 20 around the touch screen 20 of the touch input device 2 and transmit (or downlink) a signal to the touch screen 20.

Figure 1B:
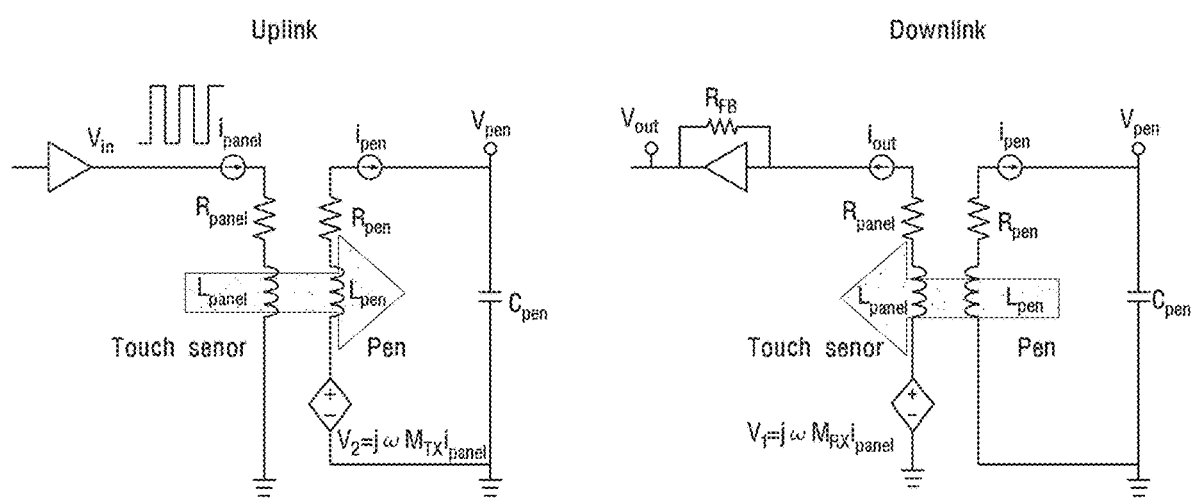
FIG. 1B is a view for explaining uplink and downlink in the pen and the touch input system in FIG. 1A.

FIG. 1B is a view for explaining uplink and downlink in the pen and the touch input system in FIG. 1A.

Referring to a left drawing of FIG. 1B, in the uplink, an electromotive force (V2, or Vemf) is formed in the coil inside the stylus pen 10 of FIG. 1A. Referring to the right drawing of FIG. 1B, in the downlink, an electromotive force V1 or Vemf is formed in the sensor unit of the touch input device 20. That is, the coil inside the stylus pen and the sensor unit of the touch input device operate as a transformer.

Figure 1C:
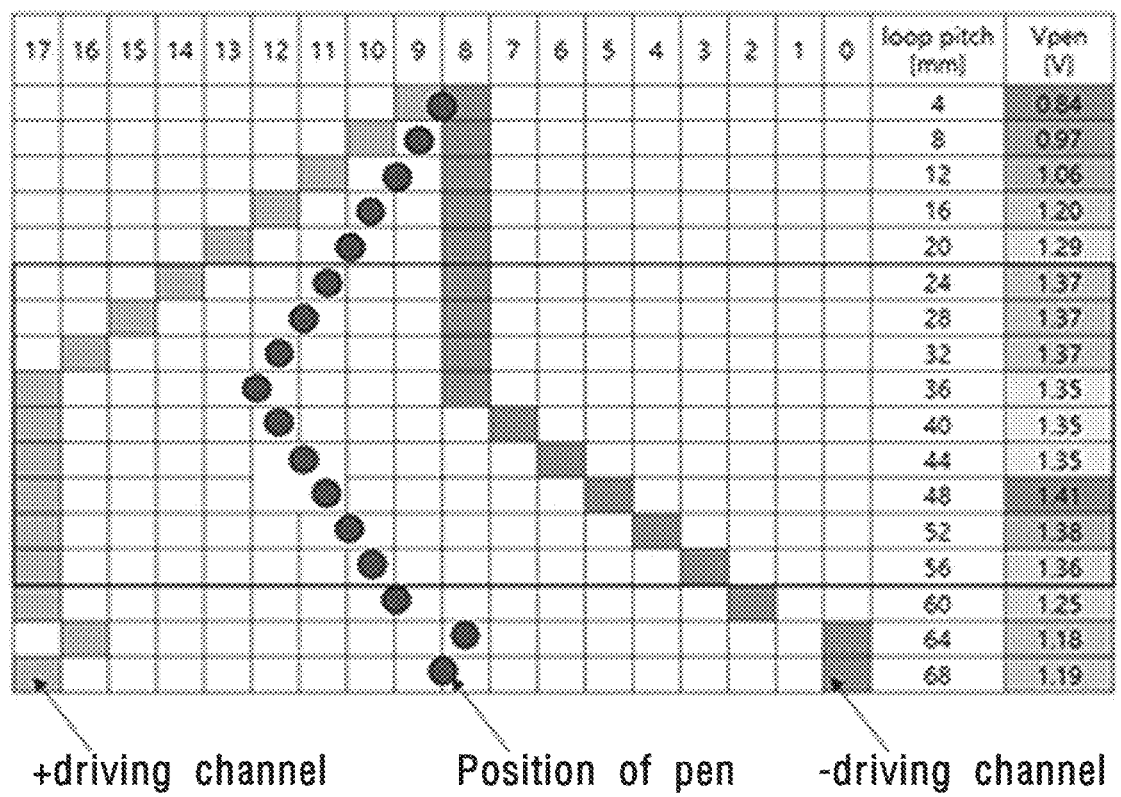
FIG. 1C is a view for explaining a gap between a + driving channel and a − driving channel in the uplink.
Figure 1C:
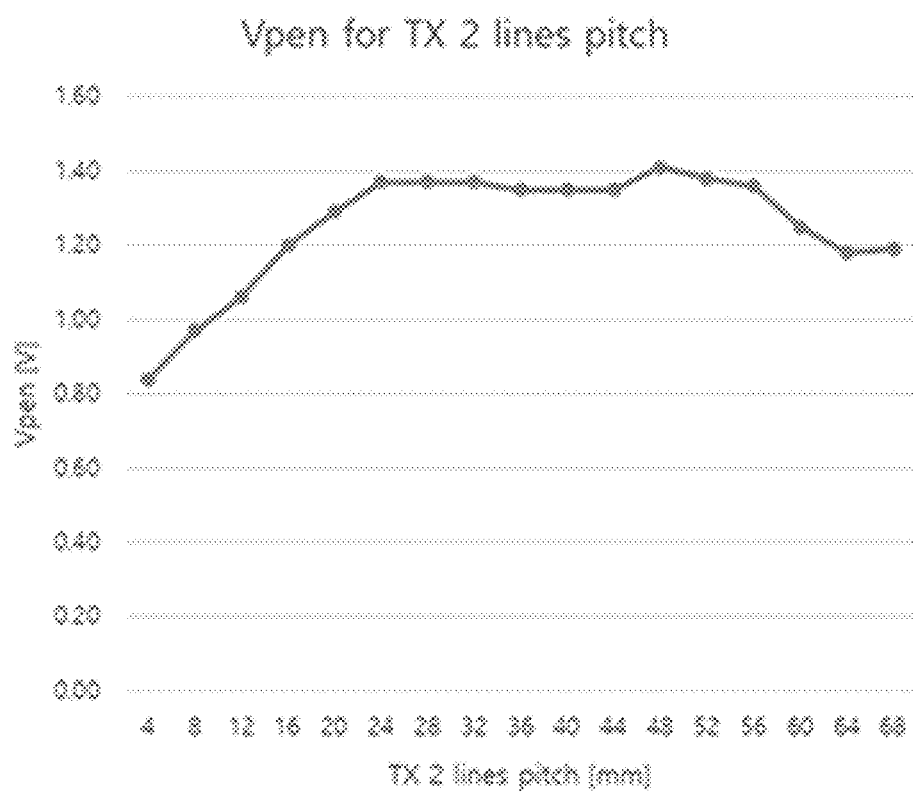

FIG. 1C is a view for explaining a gap between a + driving channel and a − driving channel in the uplink.

Referring to FIG. 1C, a gap between the + driving channel and the − driving channel in the uplink has an optimum gap according to a shape and a position of an inductor in the stylus pen. Referring to a general stylus pen design standard, the gap between the + driving channel and the − driving channel may be at least one channel gap (4 mm) or more.

Figure 2:
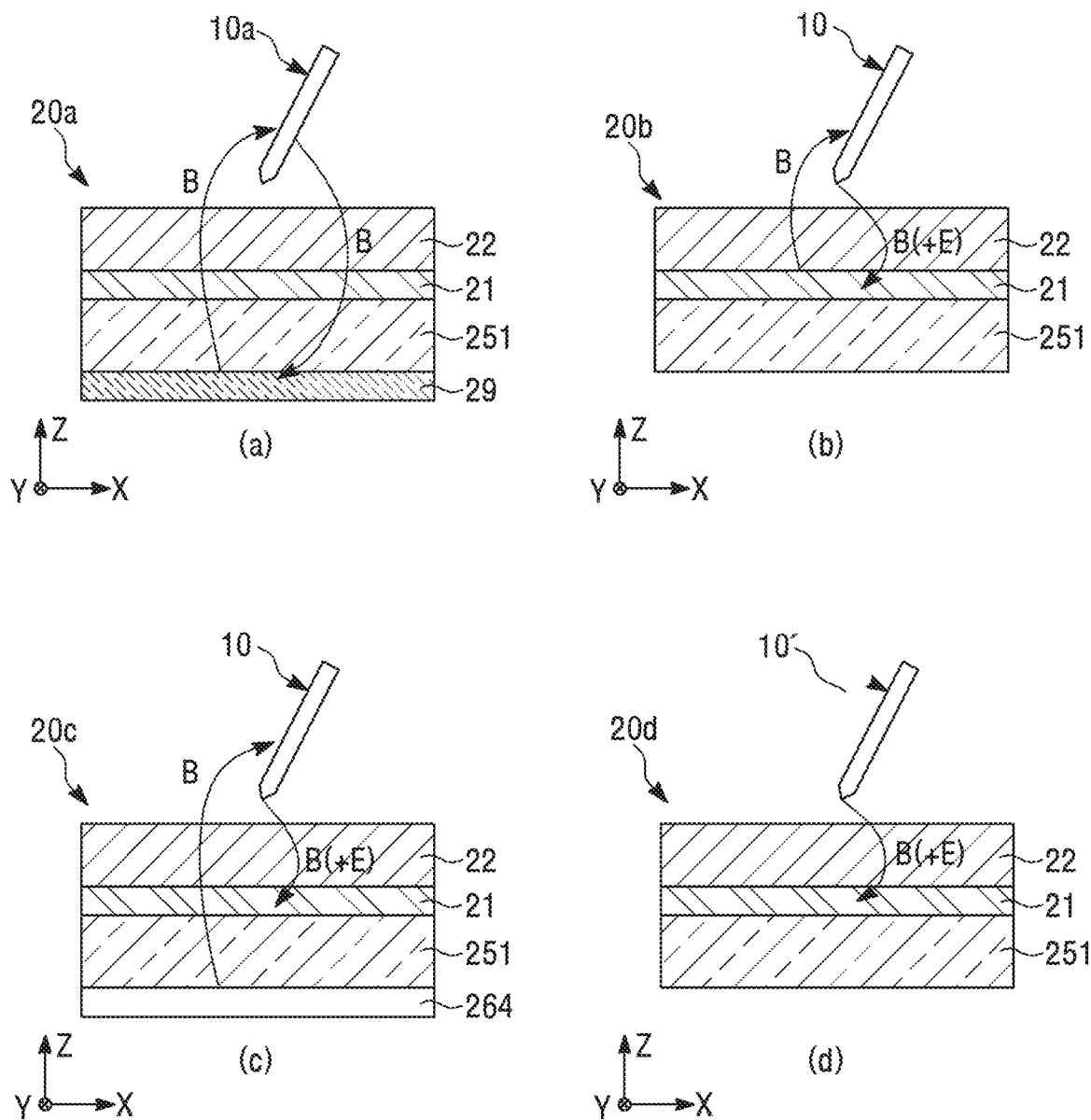
FIG. 2 is a schematic view illustrating a signal transmission operation between the stylus pen and the touch input device.

FIG. 2 is a schematic view illustrating a signal transmission operation between the stylus pen and the touch input device.

Referring to FIG. 2A, a touch screen 20a includes a digitizer 29, a display panel 251, a sensor unit 21, and a window 22.

In the case of an electro-magnetic resonance (EMR) type pen among passive stylus pens, when the digitizer 29 transmits a magnetic signal B to an EMR type stylus pen 10a, a resonance circuit contained in the stylus pen 10a resonates with the magnetic signal B. Then, the digitizer 29 receives the resonated magnetic signal B from the stylus pen 10a.

The digitizer 29 may be attached to a bottom surface of the display panel 251 and include a ferrite sheet that blocks a magnetic field generated by an antenna loop and a flexible printed circuit board (FPCB) having a plurality of conductive antenna loops and an eddy current generated from other electrical elements or components when the antenna loop forms a magnetic field.

In the FPCB, the plurality of antenna loops for detecting an input position of a resonance signal are provided as a plurality of layers. One antenna loop overlaps at least one another antenna loop in a Z-axis direction. Accordingly, the FPCB has a great thickness. Thus, when using the digitizer 29, the touch input device 2 is hardly reduced in thickness and size.

When the digitizer 29 is mounted on the foldable and flexible touch input device 2, deformation may occur in the FPCB attached to an area folded when folding is generated. Repeated folding may cause stress to be applied to a wire member forming the antenna loop, thereby causing a damage to the wire member. The ferrite sheet blocks influence of the magnetic field generated by the antenna loop on the inside of the touch input device 2. The ferrite sheet may have a great thickness, be easily deformed when the touch input device 2 is folded, and be damaged by the repeated folding.

Referring to FIG. 2B, a touch screen 20b includes a display panel 251, a sensor unit 21, and a window 22.

In the case of a stylus pen 10 including a resonance circuit, when an electrode (or pattern) of the sensor unit 21 transmits a magnetic signal B to the stylus pen, the resonance circuit contained in the stylus pen 10 resonates with the magnetic signal B. Accordingly, an electrode (or pattern) of the sensor unit 21 may receive a resonated electromagnetic signal (E and/or B) from the stylus pen 10. When the electrode (or pattern) of the sensor unit 21 is made of a metal mesh having low resistance, a magnetic signal transmitted from the stylus pen 10 may be detected.

Likewise, when compared with the digitizer 29, since a touch screen 20c does not require an additional unit or module for transmitting a magnetic signal to the stylus pen thinness of the touch screen 20b may be obtained with low manufacturing costs.

Referring to FIG. 2B, a touch screen 20c includes a loop coil 264, a display panel 251, a sensor unit 21, and a window 22.

In the case of a stylus pen 10 including a resonance circuit, when the loop coil 264 transmits a magnetic signal B to the stylus pen, the resonance circuit contained in the stylus pen 10 resonates with the magnetic signal B. Accordingly, an electrode (or pattern) of the sensor unit 21 may receive a resonated electromagnetic signal (E and/or B) from the stylus pen 10.

When compared with the digitizer 29, since the loop coil 264 does not receive a magnetic signal B for detecting a touch position, a wire structure may be simplified, and thinness of the touch screen 20c may be obtained. Thus, thinness and miniaturization of the touch input device 2 may be obtained. Also, since the loop coil 264 may be formed in various positions with various sizes, the touch screen 20c may be also applied to the foldable/flexible touch input device 2.

The loop coil 264 may include a substrate on which the antenna loop is disposed and a ferrite sheet. The antenna loop may be made of a conductive material such as copper and silver. The antenna loop may be disposed on the same layer as the sensor unit 21 in addition to the substrate. In this case, the antenna loop may be made of a conductive material having a high transmittance and a low impedance, such as a metal mesh, ITO, graphene, and a silver nanowire. Also, the antenna loop may be disposed below the window. In this case, the substrate may not be contained in the loop coil 264.

In the above, the sensor unit 21 may include a plurality of electrodes (or patterns) for detecting touch coordinates. For example, the sensor unit 21 includes a plurality of first touch electrodes for detecting touch coordinates in a first direction and a plurality of second touch electrodes for detecting touch coordinates in a second direction crossing the first direction. Although the sensor unit 21 is illustrated as one layer in FIG. 2, the first touch electrode and the second touch electrode may be disposed on different layers, may overlap each other, may not overlap each other, or may be disposed with a separate layer therebetween.

Referring to FIG. 2D, a touch screen 20d includes a display panel 251, a sensor unit 21, and a window 22.

In case of an active stylus pen 10' including a resonance circuit, the resonance circuit contained in the active stylus pen 10' resonates by using a power source (e.g., a battery for storing a power such as a secondary battery) and a capacitor such as an electric double layered capacitor (EDLC) in the active stylus pen 10'. Then, the electrode of the sensor unit 21 may receive a resonated electromagnetic signal (E and/or B) from the stylus pen 10. When the electrode (or pattern) of the sensor part 21 is made of a metal mesh having a low resistance, a magnetic signal transmitted from the stylus pen 10' may be detected. The active stylus pen 10' may include a circuit that outputs an electromagnetic signal E and/or B having a predetermined frequency using a power source in addition to a resonance circuit to generate an electromagnetic signal. Also, the active stylus pen 10' may include all of the resonance circuit and circuits that the electromagnetic signal E and/or B having a predetermined frequency.

The touch screen 20d may receive an electromagnetic signal from the stylus pen 10' without transmitting a magnetic signal to the stylus pen 10'. That is, since the touch screen 20d does not require an additional unit or module for generating a signal for resonating the resonance circuit contained in the stylus pen 10', thinness and miniaturization of the touch screen 20d may be obtained, and power consumption and manufacturing costs may be reduced.

Next, a touch input device 2 according to an embodiment will be described with reference to FIG. 3.

Figure 3:
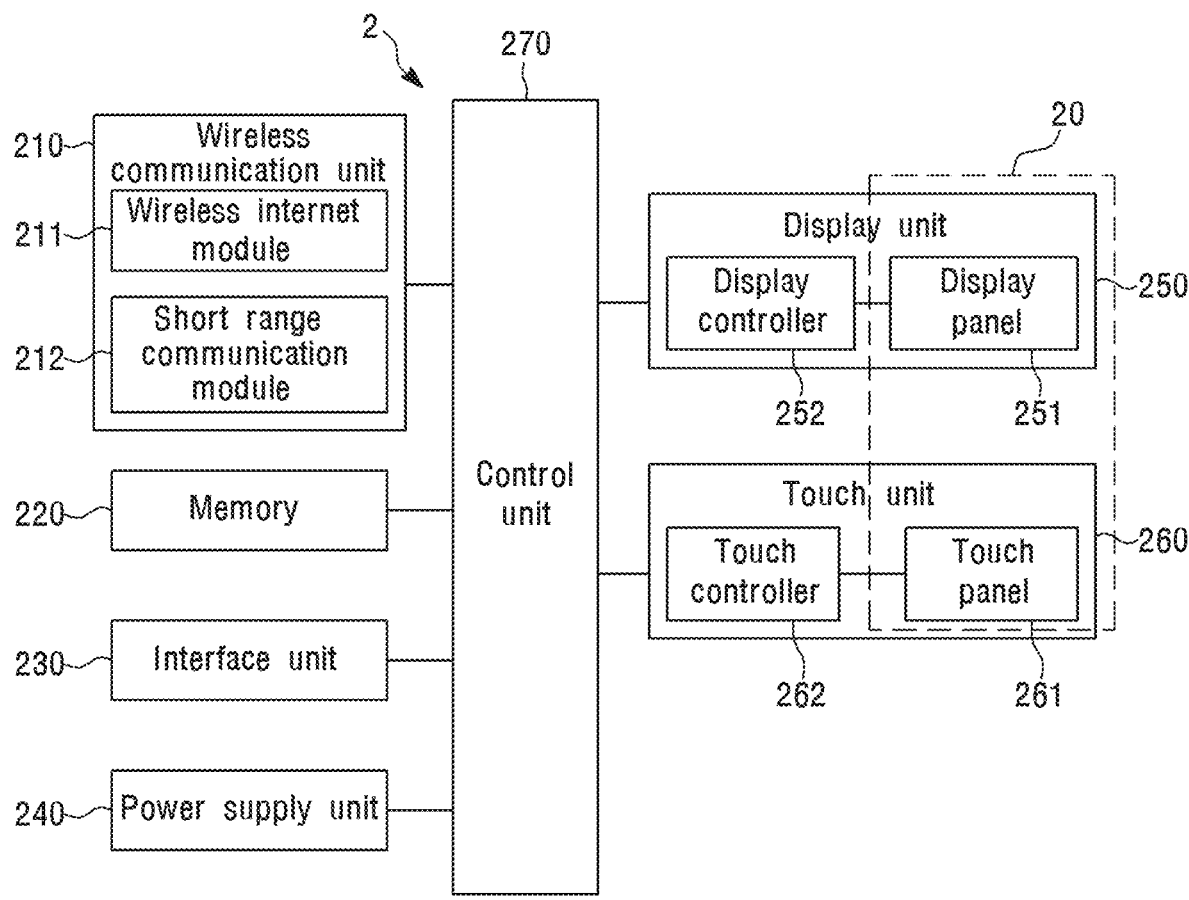
FIG. 3 is a schematic block diagram illustrating the touch input device.

FIG. 3 is a schematic block diagram illustrating a touch input device capable of interacting with a stylus pen.

As illustrated in the drawing, a touch input device 2 may include a wireless communication unit 210, a memory 220, an interface unit 230, a power supply unit 240, a display unit 250, a touch unit 260, and a control unit 270. Since components illustrated in FIG. 3 are not essential for realizing the touch input device, the touch input device described in the present disclosure may include more or less components that the above-described components.

In more detail, among the above-described components, the wireless communication unit 210 may include at least one module for allowing wireless communication between the touch input device 2 and a wireless communication system, between the touch input device 2 and another touch input device 2, or between the touch input device 2 and an external server. Also, the wireless communication unit 210 may include at least one module connecting the touch input device 2 to at least one network.

The wireless communication unit 210 may include a wireless internet module 211 and a short range communication module 212.

The wireless internet module 211 refers to a module for wireless internet connection and may be incorporated in the touch input device 2. The wireless Internet module 211 is configured to transmit and receive a wireless signal over a communication network according to wireless internet technologies. For example, the wireless internet technologies include WLAN (Wireless LAN), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), NR (New Radio), LTE (Long Term Evolution), and LTE-A (Long Term Evolution-Advanced), and the wireless internet module 211 transmits and receives data according to at least one wireless internet technology within a scope including internet technologies that are not listed above.

The short range communication module 212 is for short range communication, and at least one of Bluetooth™, RFID (Radio Frequency Identification), infrared communication (Infrared Data Association; IrDA), UWB (Ultra Wideband), ZigBee, NFC (Near Field Communication), Wi-Fi, Wi-Fi Direct, or Wireless USB (Wireless Universal Serial Bus) may be used to support the short range communication. The short-range communication module 212 may support wireless communication between the touch input device 2 and the wireless communication system, between the touch input device 2 and the wireless communication enabled device, or between the touch input device 2 and a network in which an external server is disposed through wireless area networks. The short range wireless communication network may be a short range wireless personal area networks.

Here, the wireless communication enabled device may be a mobile terminal (e.g., a smart phone, a tablet PC, and a notebook) capable of (or interoperable) exchanging data with the touch input device 2 according to the present invention. The short range communication module 212 may sense or recognize a wireless communication enabled device that is communicatable with the touch input device 2 around the touch input device 2. Further, the control unit 270 may transmit at least a portion of data processed by the touch input device 2 to the wireless communication enabled device through the short range communication module 212 when the sensed wireless communication enabled device is a device authenticated to communicate with the touch input device 2 according to an embodiment. Thus, a user of the wireless communication enabled device may use the data processed by the touch input device 2 through the wireless communication enabled device.

Also, the memory 220 stores data supporting various functions of the touch input device 2. The memory 220 may store a plurality of application programs (or applications) executed in the touch input device 2 and data for operation of the touch input device 2, and commands.

The interface unit 230 may serve as a path to various kinds of external devices connected to the touch input device 2. The interface unit 230 may include at least one of a wired/wireless headset port, an external charger port, a wired/wireless data port, a memory card port, a port for connecting a device equipped with an identification module, an audio I/O (Input/Output) port, a video I/O port, and an earphone port.

The power supply unit 240 receives external power or internal power under the control of the control unit 270 and supplies a power to each component contained in the touch input device 2. The power supply unit 240 may include a battery, and the battery may be an internal battery or a replaceable battery.

The display unit 250 displays (or outputs) information processed in the touch input device 2. For example, the display unit 250 may display execution screen information of an application program executed in the touch input device 2, or UI (User Interface) or GUI (Graphic User Interface) information according to the execution screen information.

The display unit 250 may include a LCD display (liquid crystal display), an OLED (organic light-emitting diode) display, an electronic ink display (e-ink display), a quantum dot light-emitting display, and a micro-LED (light emitting diode) display.

The display unit 250 includes a display panel 251 for displaying an image, and a display controller 252 connected to the display panel 251 to supply signals for displaying an image to the display panel 251. For example, the display panel 251 may include a plurality of scan lines, a plurality of pixels connected to the same signal lines as a plurality of data lines, and a scan driving/receiving unit for supplying a scan signal to the scan lines, and the display controller 252 may include a data driver IC for generating a data signal to be applied to the data line, a timing controller for processing an image signal and controlling an overall operation of the display unit 250, and a power management IC.

The touch unit 260 senses a touch (or touch input) applied to the touch area by using a predetermined method, e.g., a capacitive method. For example, the touch unit 260 may be configured to convert a change in capacitance, voltage, or current generated in a specific portion into an electrical input signal. The touch unit 260 may be configured to detect a position and area in which a touch object applying a touch on a touch area is touched on the touch unit 260, and a capacitance at the time of the touch. Here, the touch object that is an object applying a touch to the touch sensor may include, e.g., a user's body portion (a finger or a palm) and a passive or active stylus pen 10.

The touch unit 260 includes a touch panel 261 including the sensor unit 21 in FIG. 2 and a touch controller 262 that transmits touch data to the control unit 270 and/or the display controller 252 by applying a driving signal to the touch panel 261 and receiving a sensing signal from the touch sensor 261.

The touch controller 262 may include a first driving/receiving unit connected to at least one of the plurality of first touch electrodes of the sensor unit 21 in FIG. 2 to apply a driving signal and receive a sensing signal; a second driving/receiving unit connected to at least one of the plurality of second touch electrodes to apply a driving signal and receive a sensing signal; and a MCU (micro control unit) that controls operations of the first driving/receiving unit and the second driving/receiving unit and obtains a touch position by using sensing signals outputted from the first and second driving/receiving units.

The touch controller 262 may be integrated into one IC with the control unit 270 that will be described later or with the display controller 252. Alternatively, the touch controller 262 may be integrated into one IC with the display controller 252 and the control unit 270. The touch controller 262 and the control unit 270, the touch controller 262 and the display controller 252, or the touch controller 262, the display controller 252, and the control unit 270 may be integrated into one and referred to as the 'control unit'.

The display panel 251 and the touch panel 261 may form a mutual layer structure or be integrated with each other to be referred to as the touch screen 20.

The controller 270 may control driving of the touch input device 2 and output touch coordinate information in response to a touch sensing result of the touch input device 2. Also, the control unit 270 may change a frequency of the driving signal in response to the touch sensing result.

The controller 270 controls an overall operation of the touch input device 2 in addition to an operation related to the application program. The controller 270 may provide or process information or functions suitable for the user by processing a signal, data, and information inputted or outputted through the above-described components or driving the application program stored in the memory 220.

Also, the control unit 270 may control at least a portion of the components described with reference to FIG. 3 to drive the application programs stored in the memory 220. Furthermore, the control unit 270 may combine and operate at least two components of the components contained in the touch input device 2 for driving of the application program.

Although the touch unit 260 is contained in the touch input device 2 together with the display unit 250 as described above, the touch input device 2 may include only the touch unit 260.

Figure 4:
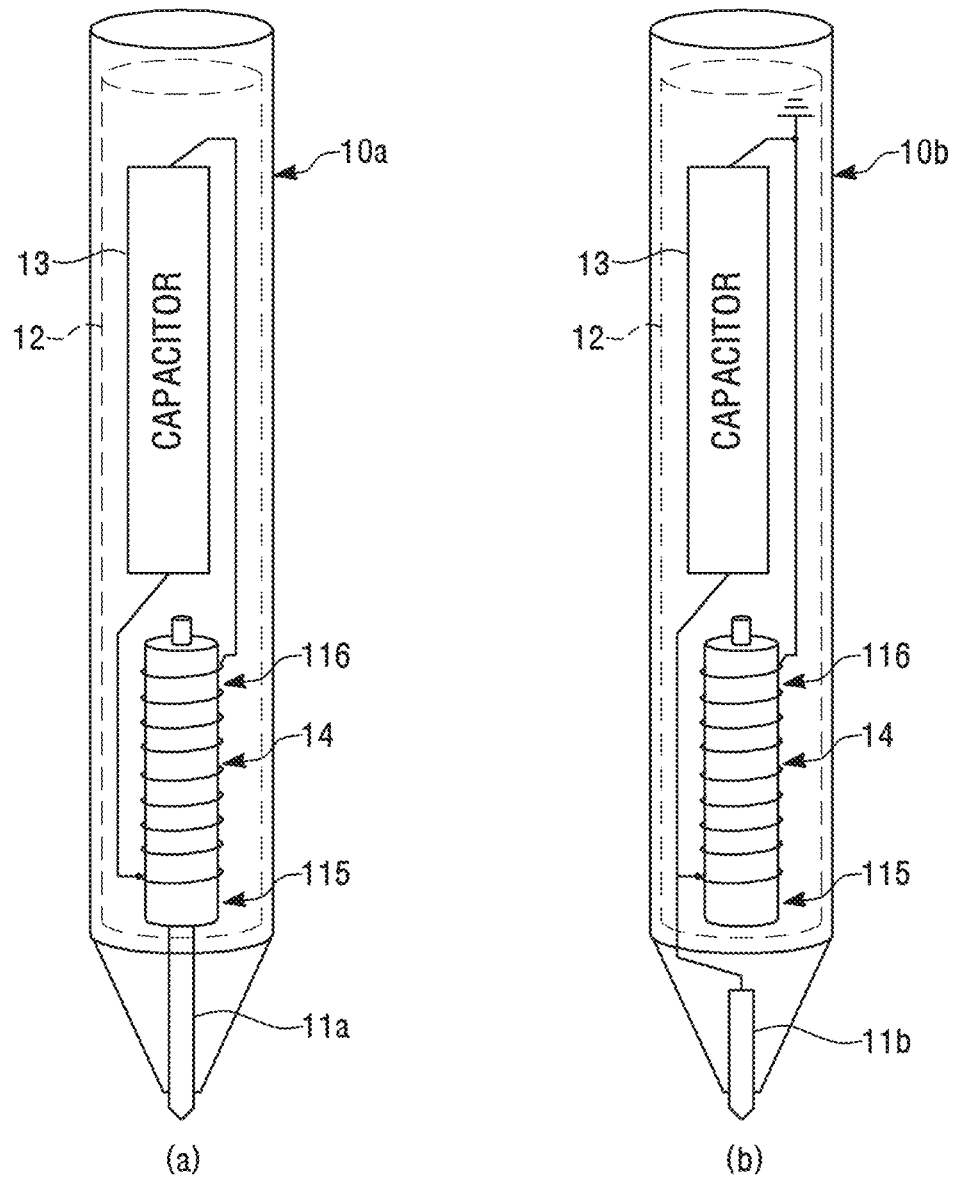
FIG. 4 is a view illustrating the stylus pen according to embodiments.

FIG. 4 is a view illustrating a stylus pen according to embodiments.

The stylus pens of FIG. 4 commonly include a resonance circuit unit 12 in a housing thereof.

The resonance circuit unit 12 that is a LC resonance circuit may resonate with the driving signal outputted from the touch screen 20 of FIGS. 2 and 3. The driving signal may include a signal (e.g., a sine wave or a square wave) having a frequency corresponding to a resonance frequency of the resonance circuit unit 12. In order to resonate, the resonance circuit unit 12 may have the same or similar resonance frequency as that of the driving signal. The resonance frequency of the stylus pen 10a and 10b is determined according to a design value of the resonance circuit unit 12 of the stylus pen 10a and 10b. When the sensor unit 21 of FIG. 2B or the loop coil 264 of FIG. 2C generates an electromagnetic field caused by a driving signal, the resonance circuit unit 12 of the stylus pen 10a and 10b resonates by using a signal received through variation of the magnetic field.

Elements of the stylus pen 10a and 10b may be accommodated in the housing. Although the housing may have a cylindrical shape, a polygonal column shape, a column shape in which at least a portion is curved, an entasis shape, a frustum of pyramid shape, and a circular truncated cone shape, the embodiment of the present invention is not limited thereto. Since the inside of the housing is empty, the elements of the stylus pen 10a and 10b such as the resonance circuit unit 12 may be accommodated in the housing. The housing may be made of a non-conductive material.

As illustrated in FIG. 4A, the EMR-type stylus pen 10a includes a resonance circuit unit 12. The resonance circuit unit 12 includes an inductor unit 14 and a capacitor unit 13. The inductor unit 14 includes a ferrite core 115 and a coil 116 wound on an outer surface of the ferrite core 115.

The EMR-type stylus pen 10a may further include a tip 11a. The tip 11a that is an end portion of the stylus pen 10a may pass through the ferrite core 115 or protrude from the ferrite core 115 as illustrated in FIG. 4A. The tip 11a may be a non-conductive tip or an electrode core made of a conductive material, e.g., a rigid resin mixed with conductive metal or conductive powder. Here, the tip 11a may not be electrically connected to the resonance circuit unit 12.

The ferrite core 115 may be, e.g., a cylindrical ferrite material. In the ferrite core 115, a through-hole which has a predetermined diameter (e.g., 1 mm) and through which the tip 11a is inserted and passes may be formed in an axial direction. In addition, the ferrite core 115 may have a cylindrical shape, a polygonal column shape, a column shape in which at least a portion is curved, an entasis shape, a frustum of pyramid shape, a circular truncated cone shape, a toroid shape, and a ring shape.

The coil 116 may be wound over an entire length of the ferrite core 115 in the axial direction or wound over a partial length thereof. The coil 116 is electrically connected to the capacitor unit 13.

The capacitor unit 13 may include a plurality of capacitors connected in parallel. Each of the capacitors on a printed board may have a different capacitance and be trimmed within a manufacturing process.

As illustrated in FIG. 4B, the ECR (Electrically Coupled Resonance)-type stylus pen 10b includes a conductive tip 11b and a resonance circuit unit 12. The resonance circuit unit 12 may include an inductor unit 14 and a capacitor unit 13 and be grounded. The inductor unit 14 includes a ferrite core 115 and a coil 116 wound around an outer surface of the ferrite core 115.

Although a whole or at least a portion of the conductive tip 11b may be made of a conductive material (e.g., metal, conductive rubber, conductive fabric, or conductive silicone), the embodiment of the present invention is not limited thereto.

The coil 116 may be wound over an entire length of the ferrite core 115 in the axial direction or wound over a partial length thereof. The coil 116 is electrically connected to the capacitor unit 13.

The capacitor unit 13 may include a plurality of capacitors connected in parallel. Each of the capacitors on a printed board may have a different capacitance and be trimmed within a manufacturing process.

Figure 5:
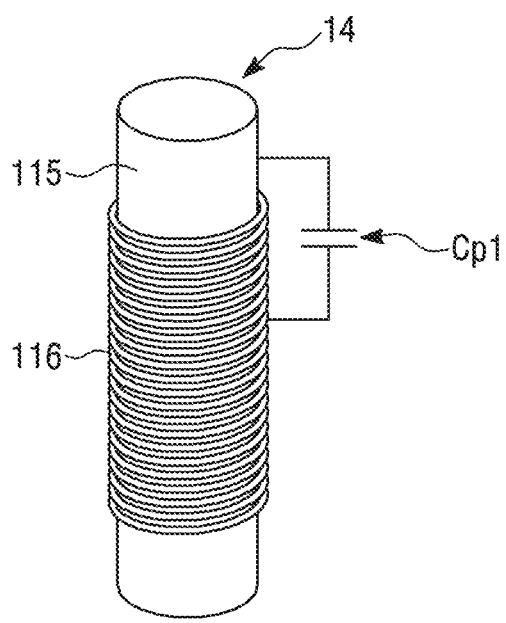
FIG. 5 is a view illustrating an inductor unit of the stylus pen in detail.

FIG. 5 is a conceptual view illustrating the inductor unit of the stylus pen in detail in FIGS. 4A and 4B.

Referring to FIG. 5, the inductor unit 14 includes a ferrite core 115 and a coil 116 wound around the ferrite core 115.

Here, an inductance of the inductor unit 14 is determined by <Equation 1> below.

$$L = \frac{\mu S N^2}{l} \quad \text{Equation 1}$$

As known from <Equation 1>, an inductance L is proportional to a permeability of the ferrite core 115, a cross-sectional area of the coil 116, and the square of the number of windings and is inversely proportional to a winding length of the coil 116.

Figure 6:
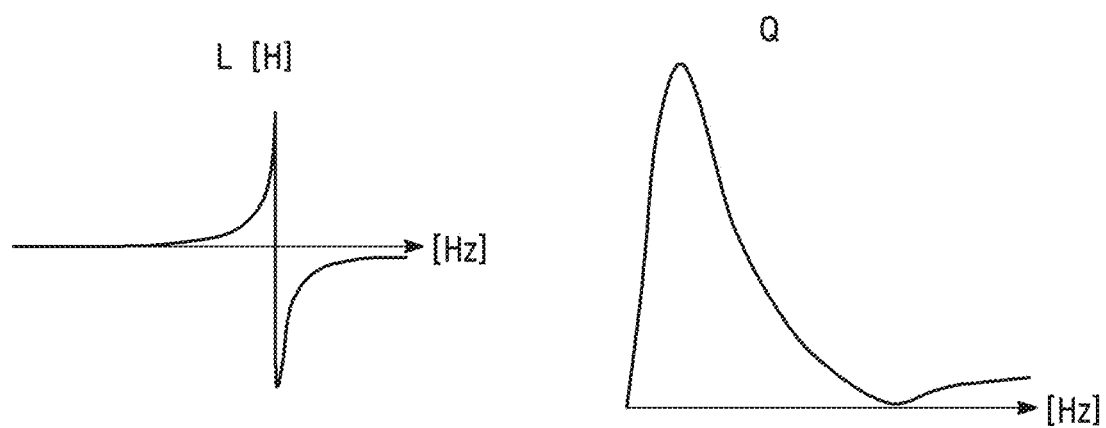
FIG. 6 is a graph representing an inductance and a Q value according to frequency variation.

A design of the inductor unit 14 in the resonance circuit unit 12 accommodated in the stylus pen illustrated in FIG. 4A and FIG. 4B is extremely important. In particular, in the design of the inductor unit 14, an inductance L and a Q value are extremely important parameters as illustrated in FIG. 6. Here, the Q value that is an amount of representing a coil characteristic as a resonance circuit element is expressed by an equation $Q=2\pi fL/R$. Here, L and R indicate an inductance and a resistance of the coil, respectively, and f indicates a frequency. As the Q value of the coil increases, sharpness of the resonance characteristic increases.

When the stylus pen illustrated in FIGS. 4A and 4B is designed, L may have a sufficiently large self-resonance frequency relative to a frequency to be used, and the Q value may have a maximum value at the frequency to be used. In order to satisfy this, a material of the ferrite core, the kind of a wire of the coil, and a winding scheme are required to be optimized. Also, a method for obtaining a high output signal while maintaining a thin diameter of the pen is required.

In embodiments below, a design method of the stylus pen that is optimized in materials of the plurality of ferrite cores, kinds of the wire of the coil, and winding schemes will be described.

(1) Material of Ferrite Core

The ferrite core used in this embodiment is made of manganese (Mn) and nickel (Ni).

(2) Kind of Wire

The wire of the coil used in this embodiment includes an enamel wire and a litz wire.

Figure 7:
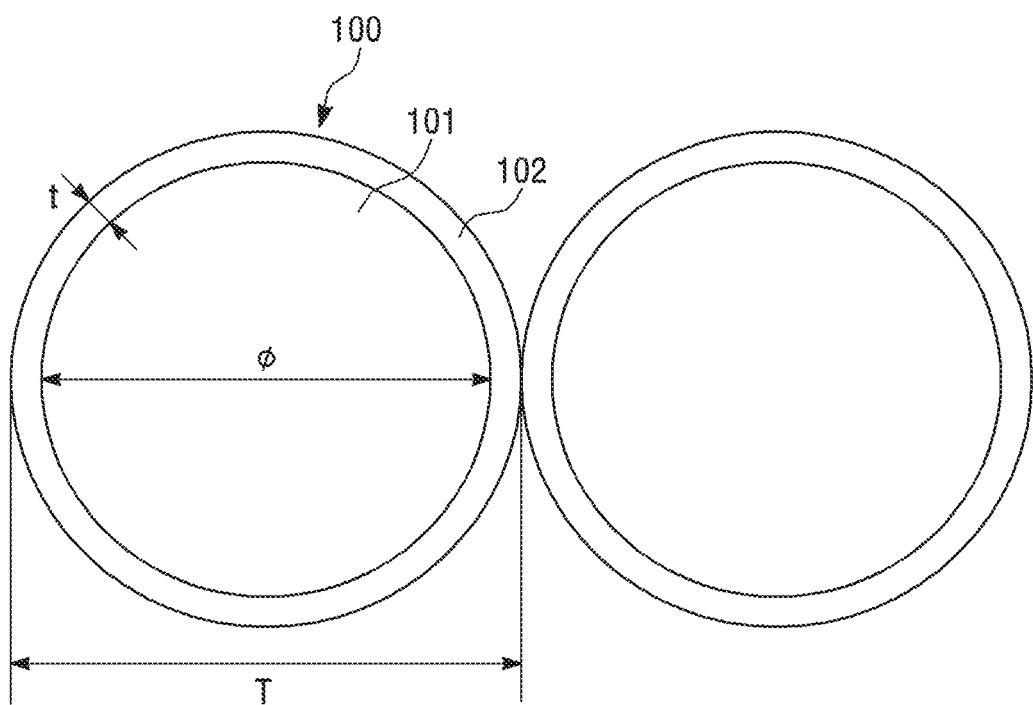
FIGS. 7 and 8 are views illustrating an enamel wire and litz wire, respectively.

As illustrated in FIG. 7, an enamel wire 100 that is a wire manufactured by coating a surface of a copper wire 101 with an insulating enamel 102 and heating the wire at a high temperature is used for windings or wirings of electrical devices, communication devices, and electrical instruments. In the embodiment, the enamel wire having a total thickness T of 0.2 mm, a wire diameter ϕ of 0.18 mm, and a coating thickness t of 0.01 mm is used.

Figure 8:
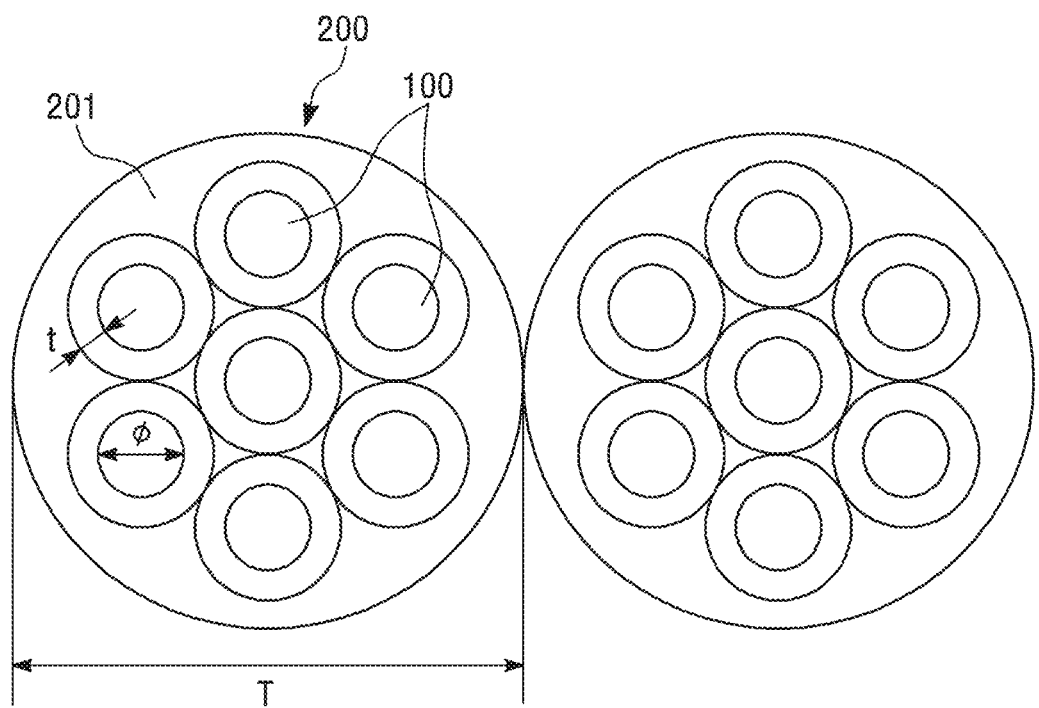

As illustrated in FIG. 8, a LITZ wire 200 is a specially insulating wire formed by twisting several thin insulating wires 100 (e.g., enamel wire) each having a diameter of about 0.1 mm into a single wire and performing insulation coating 201 on the single wire with nylon. The litz wire 200 may reduce a surface effect by increasing a surface area and be used for a coil of a high frequency circuit.

In the embodiment, the litz wire having a total thickness T of 0.2 mm, a wire diameter ϕ of 0.06 mm, and a coating thickness t of 0.007 mm is used.

(3) Winding Scheme

In the embodiment of the present invention, a winding scheme having a multilayer winding structure is used to obtain a sufficient inductance value (i.e., sufficient number of windings) in a limited space of the stylus pen. Specifically, as illustrated in FIGS. 9A and 9B, two kinds of multilayer winding schemes are used.

Figure 9:
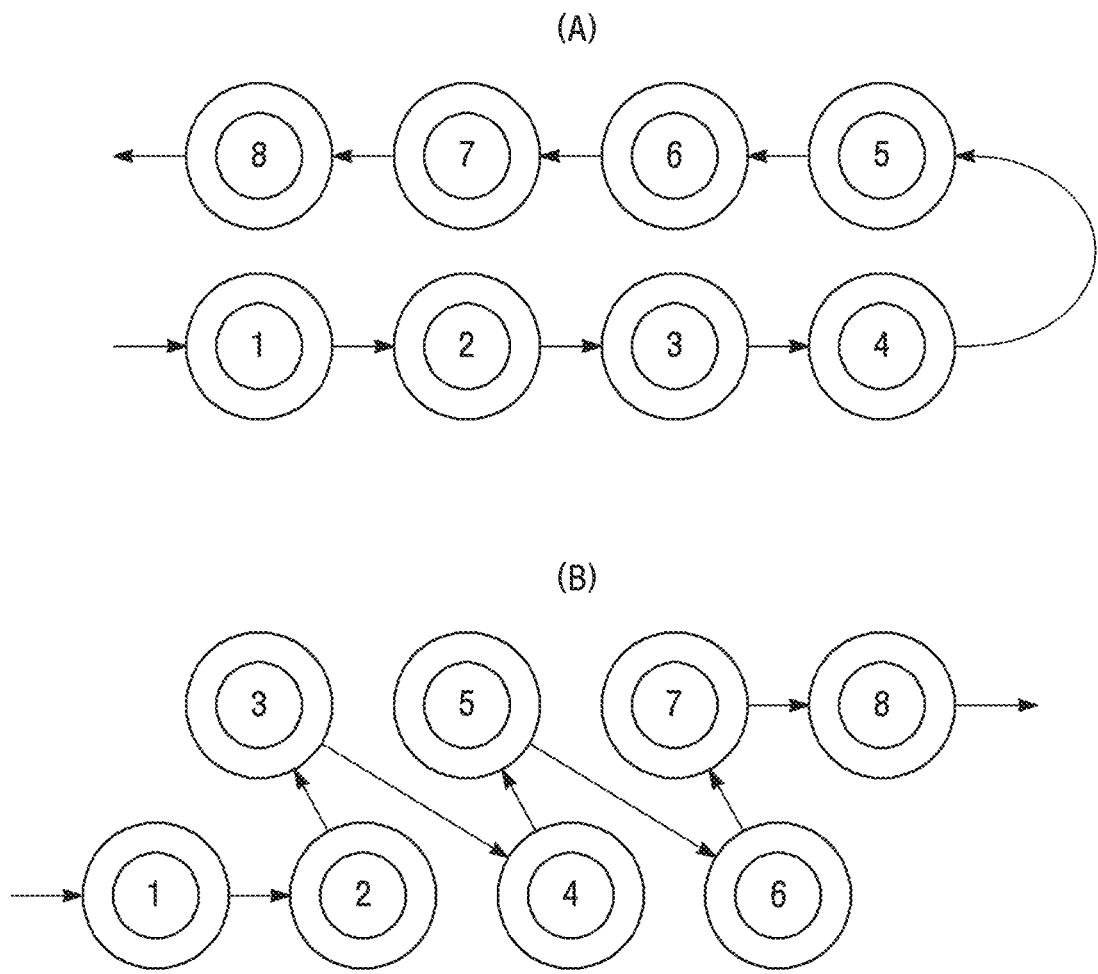
FIG. 9 is a view illustrating a winding scheme of a plurality of layers.

The winding scheme of FIG. 9A, which is a simplest winding scheme, is a sequential layer winding scheme in which a lower layer is wound and then an upper layer is wound. Here, the scheme of FIG. 9A is performed such that a winding of a directly above layer starts at a point at which a winding of a previous layer disposed directly below is finished. Hereinafter, this winding scheme is referred to as a U-type winding scheme.

The winding scheme of FIG. 9B that is an alternate layer winding scheme in which adjacent winding layers are alternately wound is performed such that windings of adjacent layers are inclined in a zigzag form. Hereinafter, this winding scheme is referred to as a zigzag-type winding scheme. Specifically, this winding scheme is performed such that a winding of a second layer is sequentially wound on a winding of a first layer and then a winding of a third layer is wound between the winding of the first layer and the winding of the second layer, and a winding of a fourth layer is wound on the winding of the second layer and then a winding of a fifth layer is wound between the winding of the second layer and the winding of the fourth layer. The above-described zigzag-type winding scheme may minimize a voltage difference between the windings of adjacent layers to reduce a winding self-capacitance. Here, the winding self-capacitance, which is a kind of parasitic capacitance, is a parameter representing electric field energy stored in the winding.

Comparative Experiment 1 (Comparison of Characteristic Value for Each Material)

The Q values are measured by changing the material of the ferrite core to manganese, nickel, and magnesium in a state in which the coil including the enamel wire is wound in the U-type winding scheme.

As a result of the measurement, a difference between the characteristics of the Q values for each material of the core is insignificant, and the measured Q value is not enough to be implemented as a product.

Comparative Experiment 2 (Comparison of Characteristic Value for Each Winding Scheme)

The Q values are measured for an inductor 1 and an inductor 2, in which the enamel wire and the litz wire are respectively used as the wires of the coils, in a state in which the coil including the ferrite core made of manganese (Mn) is wound in the U-type winding scheme.

Figure 10:
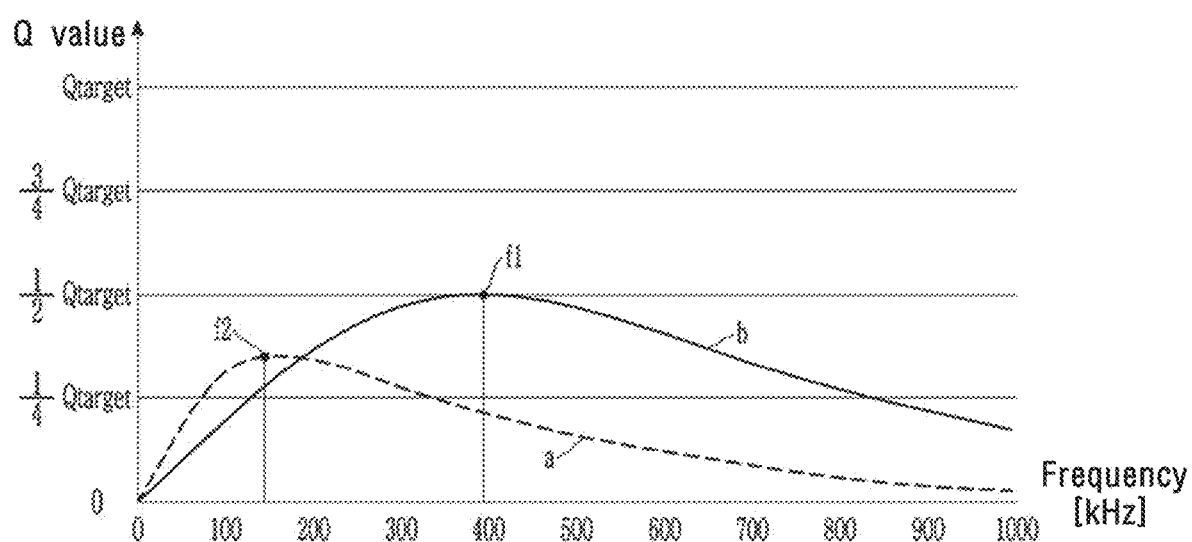
FIGS. 10 to 12 are graphs representing results of comparative experiments.

FIG. 10 is a view illustrating the Q values of the inductors 1 and 2 measured while changing a frequency through an E4980A precision LCR meter manufactured by KEYSIGHT TECHNOLOGIES.

In FIG. 10, 'a' indicates a waveform showing a change of the Q value with respect to the frequency of the inductor 1 (manganese core/enamel wire/U-type winding scheme), and 'b' indicates a waveform showing a change of the Q value with respect to the frequency of the inductor 2 (manganese core/litz wire/U-type winding scheme).

The inductor 2 manufactured by using the litz wire has an almost maximum Q value at a frequency (frequency f1) of about 400 kHz, and the inductor 1 manufactured by using the enamel wire has an almost maximum Q value at a frequency (frequency f2) of about 150 kHz.

As a result of comparison between a and b in FIG. 10, it may be known that the maximum Q value of the inductor 2 is about 1.5 times greater than that of the inductor 1. Thus, it may be known that the litz wire is superior to the enamel wire as the coil of the inductor that forms the resonance circuit of the stylus pen.

However, the maximum Q value of the inductor 2 measured in the comparative experiment 2 is about ½ of a target value Q target required for commercialization.

Comparative Experiment 3 (Comparison of Characteristic Value for Each Winding Scheme)

The Q values are measured for inductors 3 to 5 manufactured such that the enamel wire and the litz wire are respectively used as the wires of the coils and the wires are wound in the U-type winding scheme and the zigzag-type winding scheme.

FIG. 10 is a view illustrating the Q values of the inductors 3 to 5 measured while changing a frequency through an E4980A precision LCR meter manufactured by KEYSIGHT TECHNOLOGIES.

Figure 11:
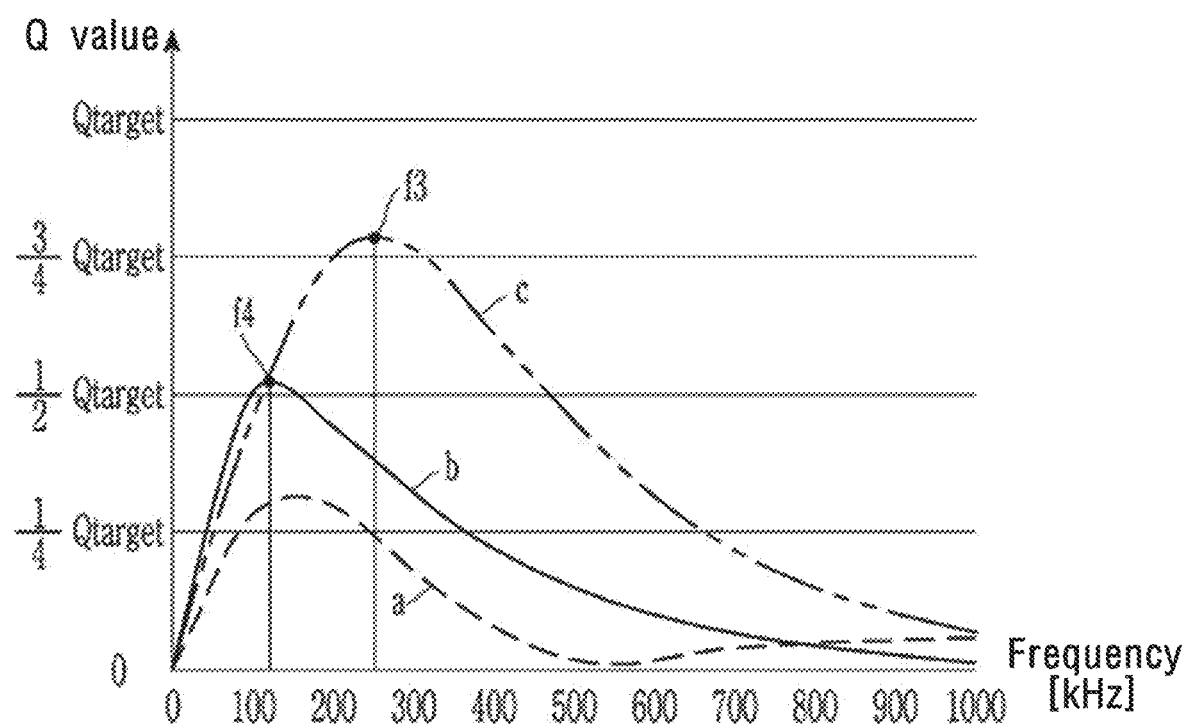

In FIG. 11, a indicates a waveform showing a change of the Q value with respect to the frequency of the inductor 3 (manganese core/enamel wire/U-type winding scheme), b indicates a waveform showing a change of the Q value with respect to the frequency of the inductor 4 (manganese core/enamel wire/zigzag-type winding scheme), and c indicates a waveform showing a change of the Q value with respect to the frequency of the inductor 5 (manganese core/litz wire/zigzag-type winding scheme).

As known from the waveform c of FIG. 11, the inductor 5 manufactured by the litz wire/zigzag-type winding scheme has an almost maximum Q value at a frequency (frequency f3) of about 300 kHz. Each of the inductor 4 manufactured by the enamel wire/zigzag-type winding scheme and the inductor 3 manufactured by the enamel wire/U-type winding scheme has an almost maximum Q value at a frequency (frequency f2) of about 150 kHz.

Also, as a result of comparison between a, b, and c of FIG. 11, it may be known that the maximum Q value of the inductor 5 is about 1.5 times greater than that of the inductor 4 and is two times or more greater than that of the inductor 3. Thus, it may be known that the zigzag-type winding scheme is superior to the U-type winding scheme in the winding scheme of the inductor that forms the resonance circuit of the stylus pen.

However, the maximum Q value of the inductor 5 (manganese core/litz wire/zigzag-type winding scheme) measured in the comparative experiment 2 is about ¾ of a target value Q target required for commercialization.

Comparative Experiment 4 (Comparison of Characteristic Value for Each Winding Scheme)

In this embodiment, manganese and nickel are used as the material of the ferrite core, and it is generally known that nickel has permeability of 200 to 300 and manganese has permeability of 3000 to 5000.

Since the manganese used in this embodiment is approximately 15 times greater in permeability than nickel, assuming that the coils have the same cross-sectional area and length, the number of windings of manganese may be reduced by approximately four times from that of windings of nickel to obtain the same inductance value. Thus, in terms of the number of windings, it may be known that manganese is more effective to use than nickel.

Since the inductor unit 14 has a complicated structure including the coil wound around the core, a parasitic capacitance is additionally formed. Since the Q value decreases by the parasitic capacitance, an amplitude of a resonance signal may be reduced.

The parasitic capacitance formed in the inductor unit 14 may be formed between the wound coils or between the core and the coil. Here, as described above, the parasitic capacitance between the wound coils may be reduced by adopting the zigzag-type winding scheme.

In this embodiment, the material of the core having permittivity lower than that of manganese is tested to reduce the parasitic capacitance between the core and the coil. As a result of the test, it may be known that nickel is an optimum material for the ferrite core.

An important physical property in manganese and nickel, which are mainly used as of a ferrite core element, is permeability that gives an important effect on the inductance value as shown in <Equation 1>. However, since the permittivity in manganese and nickel as the ferrite core element is not an important physical property, nickel substantially does not have relevant information in a data sheet provided by a manufacturer.

In this embodiment, the permittivity of manganese and nickel is measured by using E4980A precision LCR meter of KEYSIGHT TECHNOLOGIES to check the permittivity of manganese and nickel, and measurement results are shown in table 1 below.

TABLE 1

|  | Permittivity of manganese | Permittivity of nickel |
| --- | --- | --- |
| Measurement 1 | 2400 | — |
| Measurement 2 | 8300 | 2 |

Measurement 1 and measurement 2 are measured by using the same E4980A precision LCR meter manufactured by KEYSIGHT TECHNOLOGIES, and the measurement 1 represents permittivity that is automatically calculated by measurement software. According to the measurement 1, it may be known that while a permittivity of manganese is 2400, a permittivity of nickel is not measured.

The measurement 2 is a method of calculating permittivity by measuring a capacitance, an area, and a distance between the ferrite cores, and according to the measurement 2, the permittivity of manganese is 8300 and the permittivity of nickel is 2.

It is confirmed that there is a big difference between permittivity measurement results of the measurement 1 and the measurement 2, and particularly the measurement 2 shows a considerable error according to the capacitance, the area, and the distance. However, as the results of the measurement 1 and the measurement 2, it may be known that nickel has permittivity that is at least 1/1000 less than that of manganese.

In comparative experiment 4, the Q values are measured for inductors 6 and 7 manufactured by changing the winding type into the U-type and the zigzag-type in a state in which the material of the ferrite core is nickel, and the kind of the wire is the litz wire.

Figure 12:
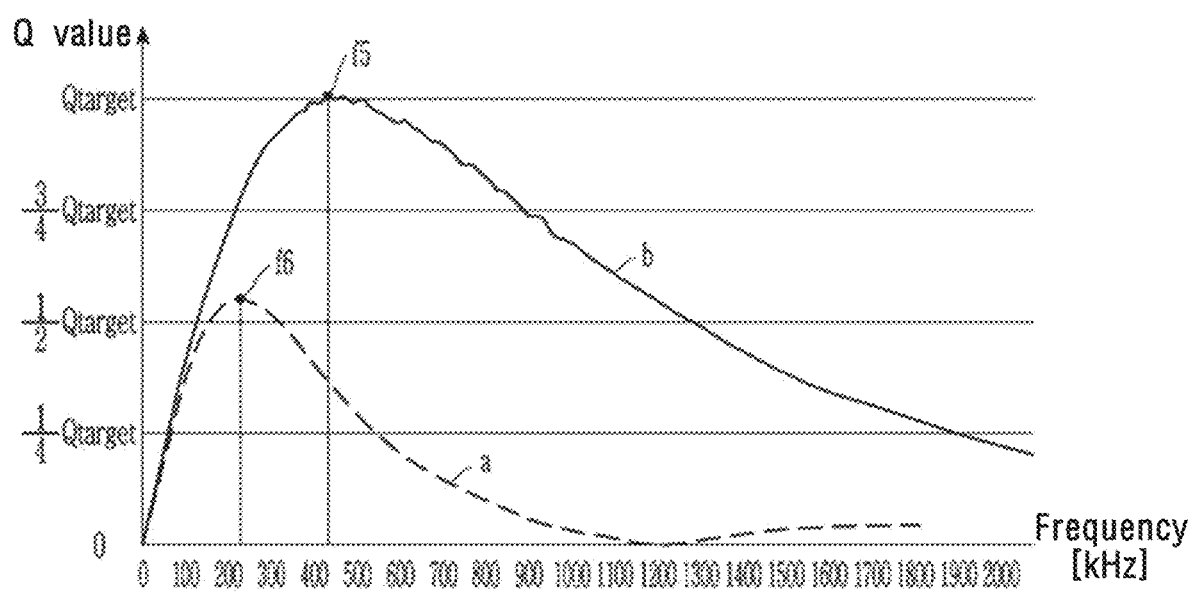

FIG. 12 is a view illustrating Q values of the inductors 6 and 7 measured while changing a frequency through an E4980A precision LCR meter manufactured by KEYSIGHT TECHNOLOGIES.

In FIG. 12, 'a' indicates a waveform showing a change of the Q value with respect to the frequency of the inductor 6 (nickel core/litz wire/U-type winding scheme), and 'b' indicates a waveform showing a change of the Q value with respect to the frequency of the inductor 7 (nickel core/litz wire/zigzag-type winding scheme).

As known from the waveform b of FIG. 12, the inductor 7 manufactured by the nickel core/litz wire/zigzag-type winding scheme has an almost maximum Q value at a frequency (frequency f5) of about 400 kHz. The inductor 7 manufactured by the nickel core/litz wire/U-type winding scheme has an almost maximum Q value at a frequency (frequency f6) of about 200 kHz. As a result of comparison between a and b in FIG. 11, it may be known that the maximum Q value of the inductor 7 is about two times greater than that of the inductor 6.

The maximum Q value of the inductor 7 (nickel core/litz wire/zigzag-type winding scheme) measured in the comparative experiment 4 almost reaches a target value $Q_{target}$ required for commercialization.

In the comparative experiments 1 to 4 described above, the Q values are tested by manufacturing the inductors while changing a combination of the material of the ferrite core, the kind of the wire of the coil, and the winding scheme, and the test results show that the highest Q value is obtained when the inductor unit of the capacitive resonance stylus pen is designed by using the nickel core, the litz wire, and the zigzag-type winding scheme. Also, it may be known that the maximum Q value of the inductor manufactured by the above-described combination reaches the target value $Q_{target}$ for commercialization.

Although the experiment is performed by using the nickel core as the ferrite core and the litz wire as the wire of the core in this embodiment, similar results may be obtained when a material with permittivity of 1000 or less is used as the ferrite core instead of the nickel core, and a wire in which a single wire surrounds two or more insulating strands is used instead of the litz wire.

Hereinafter, a reason why an output voltage Vout of CVA (Capacitor Voltage Amplitude) varies according to a position of the stylus pen on the touch screen will be described before the touch input device in the pen and touch input system according to an embodiment of the present invention is described in detail.

Figure 13:
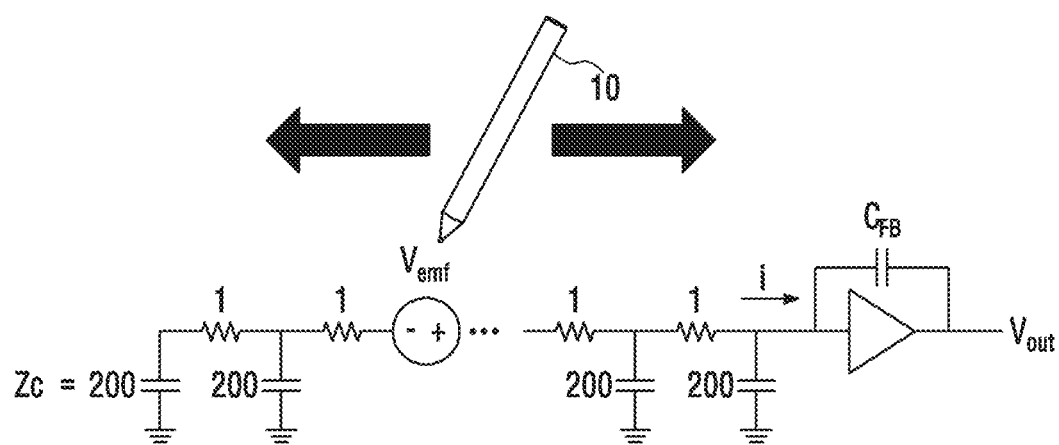
FIG. 13 is a schematic view for explaining that an output voltage Vout of a capacitor voltage amplitude (CVA) varies according to a position of a stylus pen 10 on a typical flexible touch screen.

FIG. 13 is a schematic view for explaining that the output voltage Vout of CVA (Capacitor Voltage Amplitude) varies according to a position of the stylus pen 10 on a typical touch screen.

Referring to FIG. 13, a reason why an output of the CVA is different according to the position of the stylus pen 10 on the touch screen is that impedance ratios of both sides with respect to the stylus pen 10 on a sensing line are different.

Based on a major axis of the typical touch screen, a resistance R of a metal mesh touch sensor is approximately 1.2 k ohm, and the capacitor C is approximately 250 pF.

Based on ten distributed models, at a driving frequency of 300 kHz, an impedance of the capacitor is approximately 300 times (120 ohm vs.1/(2∂*300 k*25 pF)=21 k ohm) greater than a resistance thereof. Therefore, the capacitor is a main factor.

Figure 14:
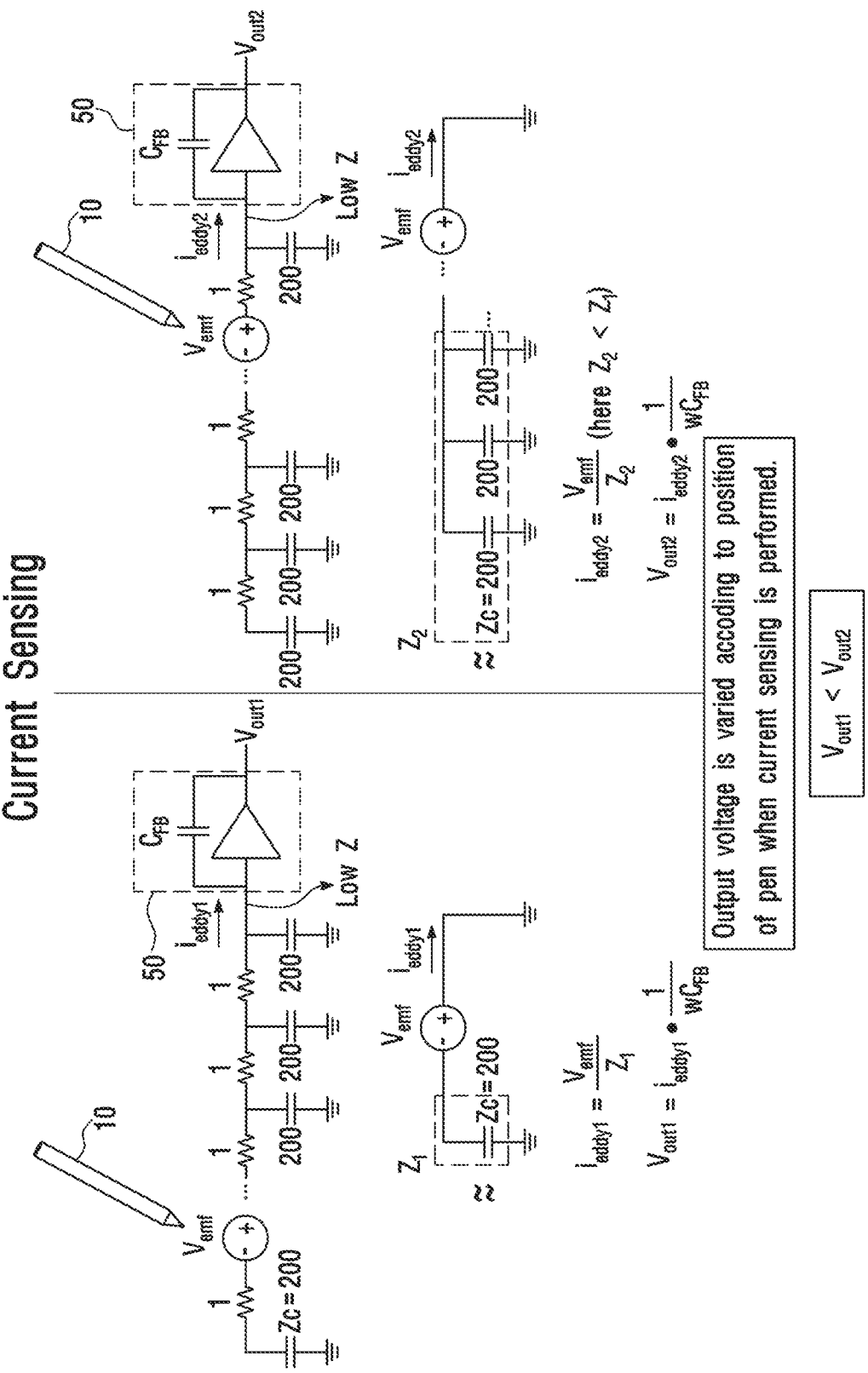
FIG. 14 is a view for explaining that output voltages Vout1 and Vout2 of the CVA are different according to the position of the stylus pen 10 in FIG. 13 through current sensing.
Figure 15:
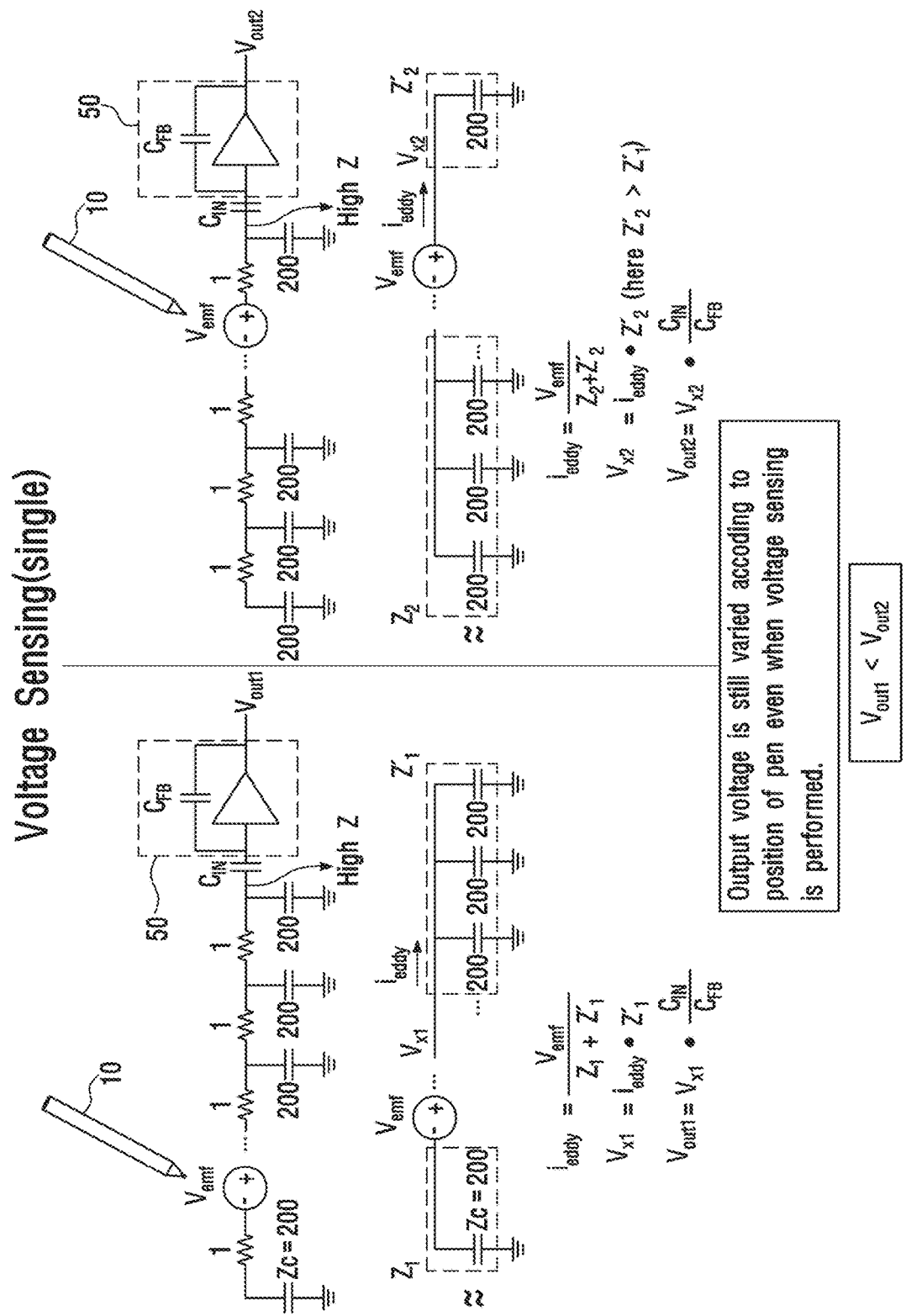
FIG. 15 is a view for explaining that the output voltages Vout1 and Vout2 of the CVA are different according to the position of the stylus pen 10 in FIG. 13 through voltage sensing.

FIG. 14 is a view for explaining that output voltages Vout1 and Vout2 of the CVA are different according to the position of the stylus pen 10 in FIG. 13 through current sensing, and FIG. 15 is a view for explaining that the output voltages Vout1 and Vout2 of the CVA are different according to the position of the stylus pen 10 in FIG. 13 through voltage sensing.

Referring to FIGS. 14 and 15, the output voltage of the CVA are different according to the position of the stylus pen 10 on the sensing line. That is, the output voltage of the CVA increases as the stylus pen 10 moves toward the sensing circuit unit 50 and decreases as the stylus pen 10 moves away from the sensing circuit unit 50.

Hereinafter, a touch input device according to various embodiments of the present invention will be described in detail with reference to the accompanying drawings.

Figure 16:
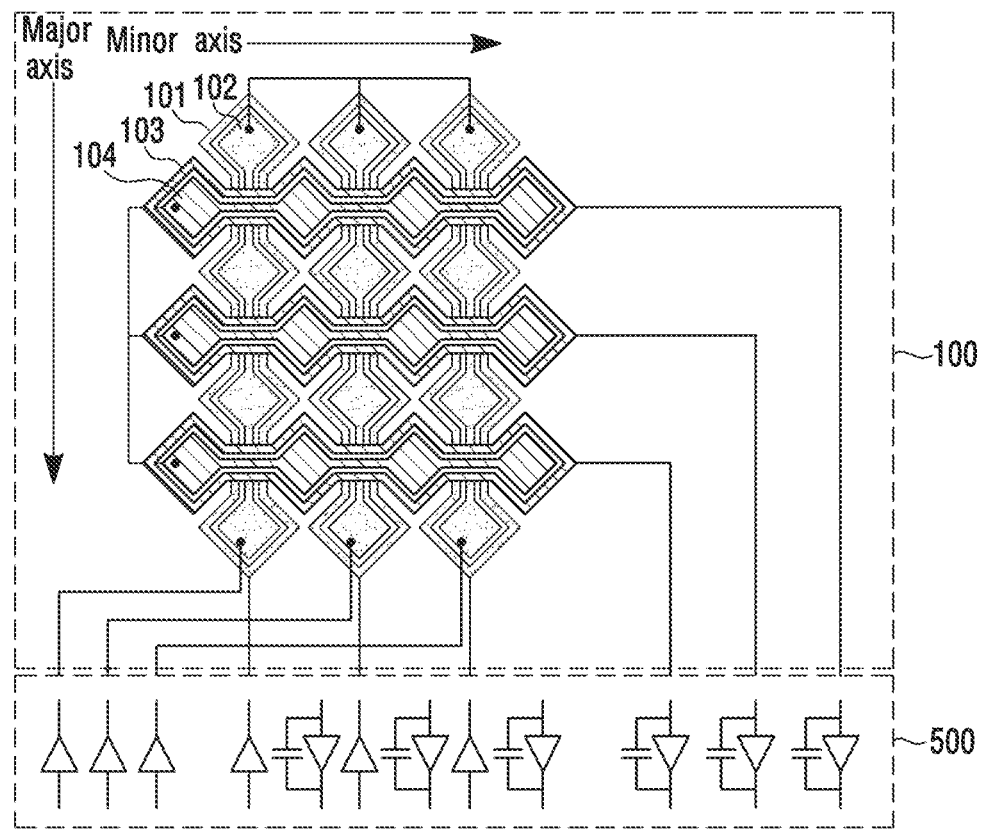
FIG. 16 is a schematic view illustrating a touch input device according to an embodiment of the present invention.

FIG. 16 is a schematic view illustrating a touch input device according to an embodiment of the present invention.

Referring to FIG. 16, a touch input device according to an embodiment of the present invention includes a sensor unit 100 and a control unit 500.

The sensor unit 100 includes a plurality of patterns (or a plurality of electrodes). Here, in the drawing, the sensor unit 100 is an embodiment of the sensor unit 21 illustrated in FIG. 2.

The sensor unit 100 may include a plurality of first to fourth patterns 101, 102, 103, and 104.

The first pattern 101 has a shape extending in a first direction. Although the first direction is illustrated as a major axis in FIG. 16, the embodiment of the present invention is not limited thereto. For example, the first direction may be a minor axis.

The first pattern 101 may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The first pattern 101 may have an opening in which the second pattern 102 is disposed. The opening may have a shape corresponding to an outer shape of the first pattern 101.

The first pattern 101 may have a structure surrounding the second pattern 102. Here, the surrounding structure includes a feature in which the first pattern 101 surrounds most of the second pattern 102 except for one portion on one plane in addition to a feature in which the first pattern 101 completely surrounds the second pattern 102 on one plane.

The first pattern 101 is spaced a predetermined distance from the second pattern 102.

The second pattern 102 is disposed adjacent to the first pattern 101. For example, the second pattern 102 may be disposed in the first pattern 101.

The second pattern 102 may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the second pattern 102 may have a shape corresponding to that of the main pattern part of the first pattern 101, and the connection pattern part of the second pattern 102 may have a shape corresponding to that of the connection pattern part of the first pattern 101.

A plurality of the first patterns 101 and a plurality of second patterns 102 are arranged in parallel to each other.

The plurality of first patterns 101 have one ends electrically connected to the control unit 500 and the other ends that are electrically opened. Here, each of the one ends is relatively close to the control unit 500, and each of the other ends is relatively far from the control unit 500. Hereinafter, in this specification, one end may be referred to as a first end, and the other end may be referred to as a second end. The one ends of the plurality of first patterns 101 may be electrically connected to the control unit 500 through a conductive trace.

The plurality of second patterns 102 may have one ends electrically connected to the control unit 500 and the other ends that are electrically connected to each other through vias. Here, the vias of the other ends of the plurality of second patterns 102 may be electrically connected to each other through a conductive trace. Here, each of the one ends is relatively close to the control unit 500, and each of the other ends is relatively far from the control unit 500. Here, when the other ends of the plurality of second patterns 102 are electrically connected to each other, a total impedance is reduced because a capacitances for each second pattern 102 is added. Thus, an effect in which each of the other ends of the plurality of second patterns 102 is AC GND is obtained.

Although not shown in the drawings, the other ends of the plurality of second patterns 102, which are electrically connected to each other, may be grounded.

Also, although not shown in the drawings, the other ends of the plurality of second patterns 102 may not be electrically connected to each other, and a predetermined capacitor may be connected to each of the other ends of the second patterns 102.

At least a portion of the first pattern 101 and at least a portion of the second pattern 102 are disposed on the same layer. For example, the first pattern 101 and the second pattern 102 may be disposed on the same layer. The first pattern 101 and the second pattern 102 may be formed on the same layer by using a metal mesh.

The third pattern 103 has a shape extending in a second direction. Although the second direction is illustrated as a minor axis in FIG. 16, the embodiment of the present invention is not limited thereto. For example, the second direction may be a major axis.

The third pattern 103 may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The third pattern 103 may have an opening in which the fourth pattern 104 is disposed. The opening may have a shape corresponding to an outer shape of the third pattern 103. The third pattern 103 may have a structure surrounding the fourth pattern 104. The third pattern 103 is spaced a predetermined distance from the fourth pattern 104.

The fourth pattern 104 is disposed adjacent to the third pattern 103. For example, the fourth pattern 104 may be disposed in the third pattern 103. The fourth pattern 104 may includes a plurality of main pattern parts and a connection pattern part connecting two adjacent main pattern parts among the plurality of main pattern parts. Here, although the main pattern part may have a diamond shape, the embodiment of the present invention is not limited thereto. For example, the main pattern part may have various shapes that are different from that of the connection pattern part.

The main pattern part of the fourth pattern 104 may have a shape corresponding to that of the main pattern part of the third pattern 103, and the connection pattern part of the fourth pattern 104 may have a shape corresponding to that of the connection pattern part of the third pattern 103.

A plurality of the third patterns 103 and a plurality of fourth patterns 104 are disposed in parallel to each other.

The plurality of third patterns 103 have one ends electrically connected to the control unit 500 and the other ends that are electrically opened. Here, each of the one ends is relatively close to the control unit 500, and each of the other ends is relatively far from the control unit 500. The one ends of the plurality of third patterns 103 may be electrically connected to the control unit 500 through a conductive trace.

The plurality of fourth patterns 104 may have one ends electrically connected to the control unit 500 and the other ends that are electrically connected to each other through vias. Here, the vias of the other ends of the plurality of fourth patterns 104 may be electrically connected to each other through a conductive trace. Here, each of the one ends is relatively close to the control unit 500, and each of the other ends is relatively far from the control unit 500. Here, when the other ends of the plurality of fourth patterns 104 are electrically connected to each other, total impedance is reduced because a capacitance for each fourth pattern 104 is added. Thus, an effect in which each of the other ends of the plurality of fourth patterns 104 is AC GND is obtained.

The other ends of the plurality of fourth patterns 104, which are electrically connected to each other, may be grounded.

Also, although not shown in the drawings, the other ends of the plurality of fourth patterns 104 may not be electrically connected to each other, and a predetermined capacitor may be connected to each of the other ends of the fourth patterns 104.

At least a portion of the third pattern 103 and at least a portion of the fourth pattern 104 are disposed on the same layer. For example, the third pattern 103 and the fourth pattern 104 may be disposed on the same layer. The third pattern 103 and the fourth pattern 104 may be formed on the same layer by using a metal mesh. Here, the third pattern 103 and the fourth pattern 104 may be disposed on a layer different from that of the first pattern 101 and the second pattern 102. For example, the first pattern 101 and the second pattern 102 may be disposed on a first layer, and the third pattern 103 and the fourth pattern 104 may be disposed on a second layer that is different from the first layer.

The control unit 500 may be electrically connected to the sensor unit 100 and control an operation of the sensor unit 100. The control unit 500 and the sensor unit 100 may be electrically connected to each other through a conductive trace.

Here, although the control unit 500 is the touch controller 262 illustrated in FIG. 3, the embodiment of the present invention is not limited thereto. The control unit 500 may be obtained by: integrating the touch controller 262 and the display controller 252 in FIG. 3; integrating the touch controller 262 and the control unit 270 in FIG. 3; or integrating the touch controller 262, the display controller 252, and the control unit 270 in FIG. 3. Alternatively, the control unit 500 may be a separate controller contained in the sensor unit 100. Thus, the control unit 500 according to the present invention is not limited to the touch controller 262 or the control unit 270 in FIG. 3, and a component capable of controlling a sensor unit according to following embodiments in addition to the sensor unit 100 may be referred to as a 'controller'.

The control unit 500 may include a plurality of driving circuit units and a plurality of sensing circuit units. The plurality of driving circuit units may include a driving circuit unit for touch sensing and a driving circuit unit for stylus driving. The plurality of sensing circuit units may include a sensing circuit unit for touch sensing and a sensing circuit unit for stylus sensing. Here, some sensing circuit units among the plurality of sensing circuit units may perform touch sensing in addition to stylus sensing.

The control unit 500 may control the sensor unit 100 to operate in one of a touch sensing mode, an antenna driving mode, and a stylus pen sensing mode. The control unit 500 may connect the plurality of the driving/sensing circuit units to the sensor unit 100 according to each mode and control the driving signal to be applied to the plurality of driving circuit units. To this end, the control unit 500 may include a plurality of switches for electrically connecting the plurality of driving/sensing circuit units and the sensor unit 100.

Hereinafter, each mode will be described with reference to FIGS. 17 to 21.

Figure 17:
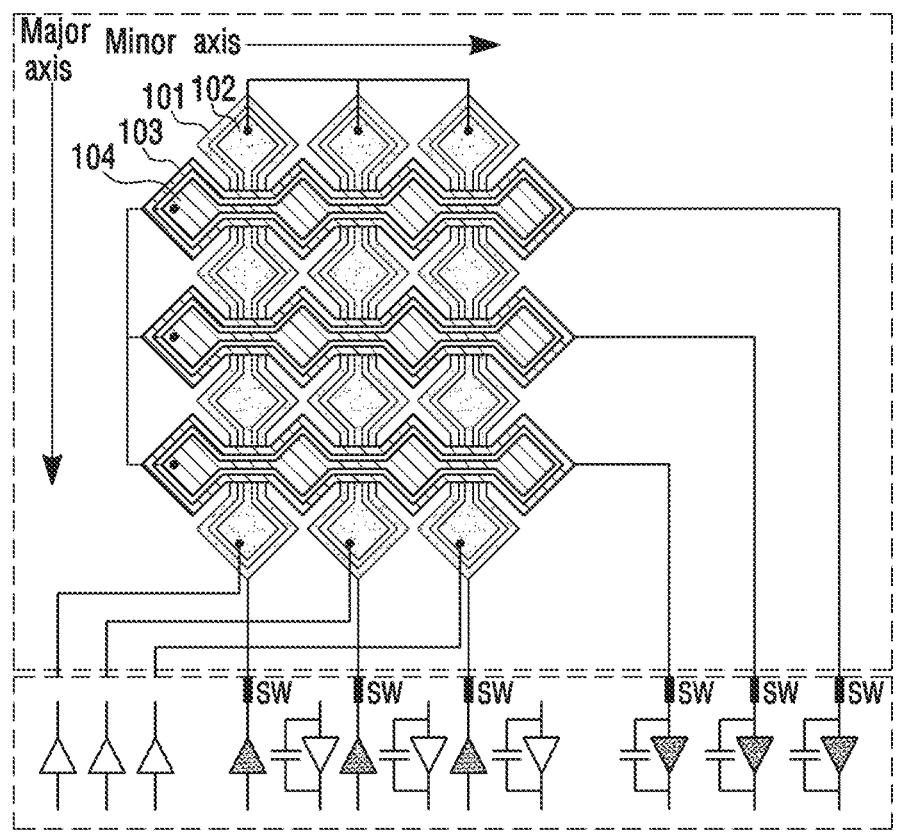
FIG. 17 is a view illustrating a case in which the touch input device in FIG. 16 operates in a touch sensing mode (or 2D sensing mode)

FIG. 17 is a view illustrating a case in which the touch input device illustrated in FIG. 16 operates in the touch sensing mode (or 2D sensing mode).

Referring to FIGS. 16 and 17, in the touch sensing mode, the control unit 500 may electrically connect the plurality of driving circuit units for touch sensing to the first pattern 101 of the sensor unit 100. The control unit 500 may control a plurality of switches sw to electrically connect the conductive traces connected to the plurality of first patterns 101 with the plurality of driving circuit units.

Also, the control unit 500 may electrically connect the plurality of sensing circuit units for touch sensing to the third pattern 103 of the sensor unit 100. The control unit 500 may control a plurality of switches sw to electrically connect the conductive traces connected to the plurality of first patterns 103 with the plurality of driving circuit units.

In the touch sensing mode, the control unit 500 simultaneously or sequentially applies a driving signal (or, touch driving signal) for the touch sensing to at least one first pattern among the plurality of first patterns 101 and receives a sensing signal (or, touch sensing signal) received from at least one third pattern among the plurality of third patterns 103. The plurality of sensing circuit units of the control unit 500 electrically connected to the plurality of third patterns 103 may output information on capacitance variation contained in the input sensing signal as a predetermined voltage value. The control unit 500 may process the outputted voltage value to detect a touch position.

Although the control unit 500 is not electrically connected to the plurality of second patterns 102, the plurality of driving circuit units may be electrically connected to the plurality of second patterns 102 so that capacitive coupling is not generated between the first pattern 101 and the second pattern 102. Here, the control unit 500 may control the same driving signal as the driving signal applied to the plurality of first patterns 101 to be applied to the plurality of second patterns 102. Also, the control unit 500 may control a predetermined reference potential to be applied to the plurality of second patterns 102 when the driving signal is applied to the plurality of first patterns.

Figure 18:
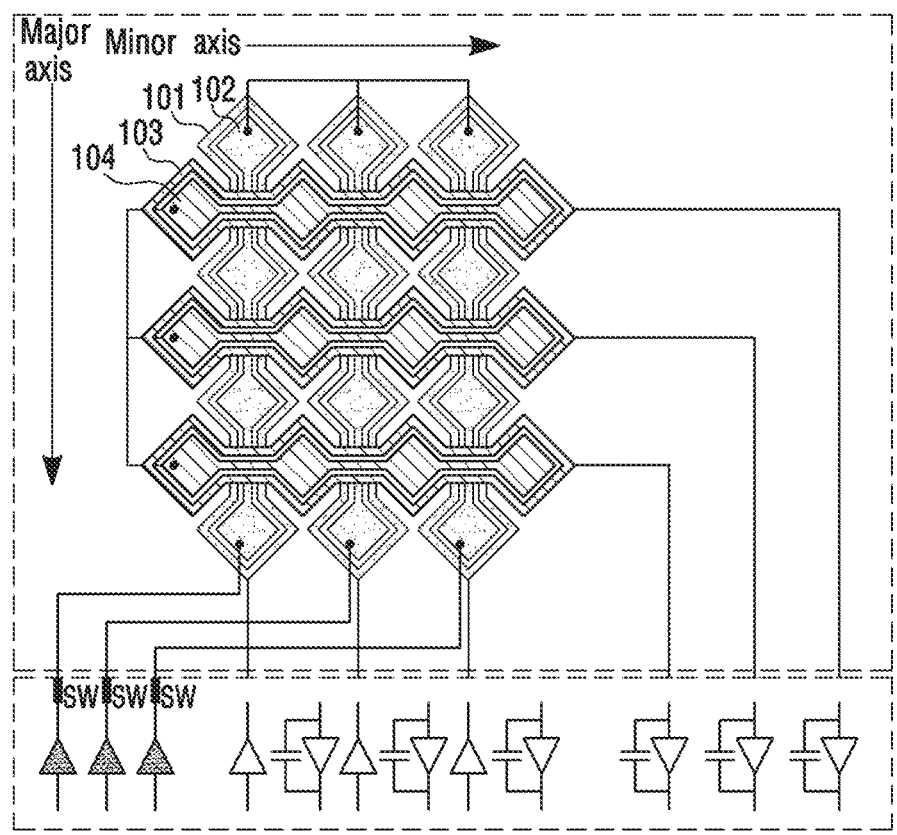
FIG. 18 is a view illustrating a case in which the touch input device in FIG. 16 operates in an antenna driving mode (or stylus driving mode, or stylus uplink mode)

FIG. 18 is a view illustrating a case in which the touch input device illustrated in FIG. 16 operates in the antenna driving mode (or stylus pen driving mode, or stylus uplink mode).

Referring to FIGS. 16 and 18, in the antenna driving mode, the control unit 500 may electrically connect the plurality of driving circuit units for antenna driving to the plurality of second patterns 102 of the sensor unit 100. The control unit 500 may control a plurality of switches sw to electrically connect the conductive traces connected to the plurality of second patterns 102 with the plurality of driving circuit units.

The control unit 500 may control the driving signal (or pen driving signal) outputted to each driving circuit unit connected to the plurality of second patterns 102.

For example, the control unit 500 may control: a pulse signal having a predetermined frequency to be outputted from a first driving circuit unit; any pulse signal not to be outputted from a second driving circuit unit; and a reverse pulse signal having a phase opposite to that of the pulse signal outputted from the first driving circuit unit to be outputted from the third driving circuit unit, among the plurality of driving circuit units connected to the plurality of second patterns 102. In this case, a current loop is formed by the second pattern 102 electrically connected to the first driving circuit unit and the second pattern 102 electrically connected to the third driving circuit unit. A magnetic field is generated by the formed current loop, and the resonance circuit unit of the stylus pen adjacent to the sensor unit 100 may be resonated and driven by the magnetic field.

The control unit 500 may control opposite driving signals (e.g., pulse signals) to be outputted from two arbitrary driving circuit units among the plurality of driving circuit units electrically connected to the plurality of second patterns 102. Thus, the control unit 500 may variously change and set a size and a position of the current loop. For example, when the control unit 500 detects a position of the stylus pen adjacent to the sensor unit 100, the control unit 500 may control opposite driving signals to be outputted from the driving circuit unit electrically connected to two second patterns disposed around the position of the stylus pen, and when the control unit 500 does not detect the position of the stylus pen, the control unit 500 may control opposite driving signals to be outputted from the driving circuit unit electrically connected to two second patterns disposed both outermost portions among the plurality of second patterns 102.

The control unit 500 may simultaneously form two or more current loops. This will be described with reference to FIG. 19.

Figure 19A:
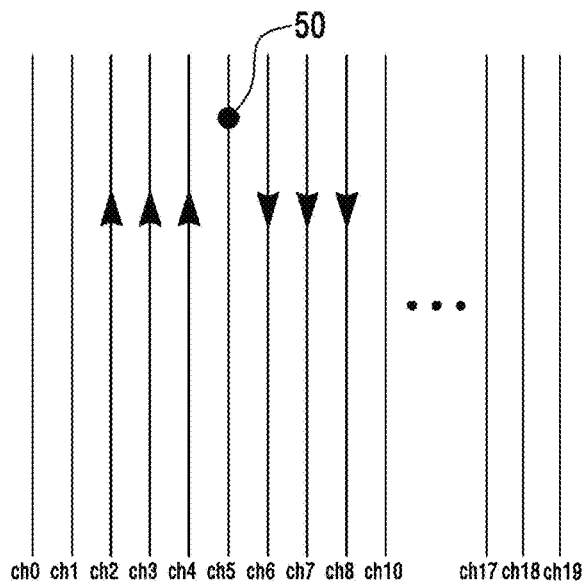
FIGS. 19A to 19C are views for explaining various methods by which the control unit 500 applies a pen driving signal for driving the stylus pen to a plurality of second patterns 102 in FIG. 18.
Figure 19B:
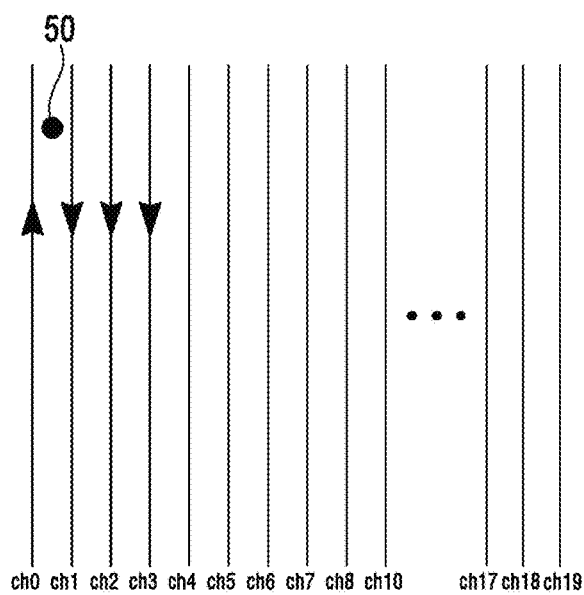
Figure 19C:
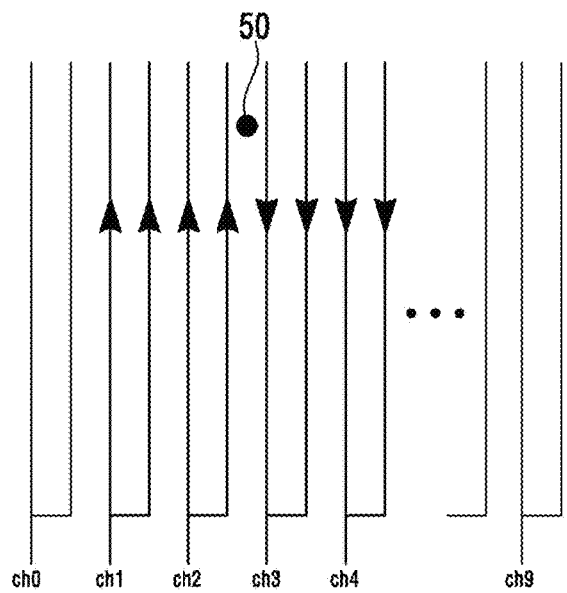

FIGS. 19A to 19C are views for describing various methods by which the control unit 500 applies a pen driving signal for driving the stylus pen to the plurality of second patterns 102 illustrated in FIG. 16. For reference, in FIGS. 19A to 19C, one second pattern 102 in FIG. 16 is simply illustrated as one line Ch, and each line Ch is one channel FIG. 19A shows a case in which a stylus pen 50 is disposed on a central portion (an area except for an edge) of the sensor unit 100 in FIG. 16. For example, the stylus pen 50 is disposed on a fifth channel Ch5. In this case, the control unit 500 may control a plurality of driving circuit units so that a pulse signal and a reverse pulse signal (or ground) are applied to the same number of channels Ch2, Ch3, Ch4/Ch6, Ch7, Ch8 on left and right sides based on a position on which the stylus pen 50 is disposed. Specifically, the control unit 500 controls the pulse signal to be applied to the three second to fourth channels Ch2, Ch3, and Ch4 disposed on the left side of the stylus pen 50 and the reverse pulse signal to be applied to the three sixth to eighth channels Ch6, Ch7, and Ch8 disposed at the right side of the stylus pen 50. Here, although the pulse signal and the reverse pulse signal (or ground) are applied to the three channels on each of the left and right sides with respect to the stylus pen 50 in FIG. 19A, the embodiment of the present invention is not limited thereto. For example, in FIG. 19A, the pulse signal and the reverse pulse signal (or ground) may be applied to two channels or one channel on each of the left and right sides with respect to the stylus pen 50, or the pulse signal and the reverse pulse signal (or ground) may be applied to four or more channels.

FIG. 19B shows a case in which the stylus pen 50 is disposed on the edge of the sensor unit 100 in FIG. 16. For example, the stylus pen 50 is disposed between a 0-th channel Ch0 and a first channel Ch1. When compared with FIG. 19A, the control unit 500 may not apply the pulse signal and the reverse pulse signal (or ground) to the same number of channel(s) on each of the left and right sides with respect to the stylus pen 50. In this case, the control unit 500 may control the pulse signal and the reverse pulse signal (or ground) to be applied to the different number of channels on the left and right sides with respect to the stylus pen 50. Specifically, the control unit 500 may control the pulse signal to be applied to the 0-th channel Ch0 and the reverse pulse signal to be applied to the first to third channels Ch1, Ch2, and Ch3. Although not shown in the drawings, when the stylus pen 50 is disposed at an outermost edge of the left side of the 0-th channel Ch0, the control unit 500 may control the reverse pulse signal to be applied to the 0-th to second channels Ch0, Ch1, and Ch2.

In FIGS. 19A and 19B, as the number of channels Ch0, Ch1, . . . , Ch19 increases, the number of terminals of the control unit 500 for driving each channel increases, and a configuration of the driving circuit unit becomes complicated. Thus, at least two or more channels adjacent to each other among the channels Ch0, Ch1, . . . , Ch19 may be electrically connected and driven as one channel Specifically, as illustrated in (c) of FIG. 19, two channels are electrically connected to form one channel In this configuration, the same signal is simultaneously applied to the two electrically connected channels. FIG. 19C shows a case in which 20 channels Ch0, Ch1, . . . , Ch19 are electrically connected for each two channels to form 10 channels. Although not shown in the drawing, seven channels may be configured such that the 20 channels are electrically connected for each three channels and the rest two channels are electrically connected, and five channels may be configured such that the 20 channels are electrically connected for each four channels.

Figure 20:
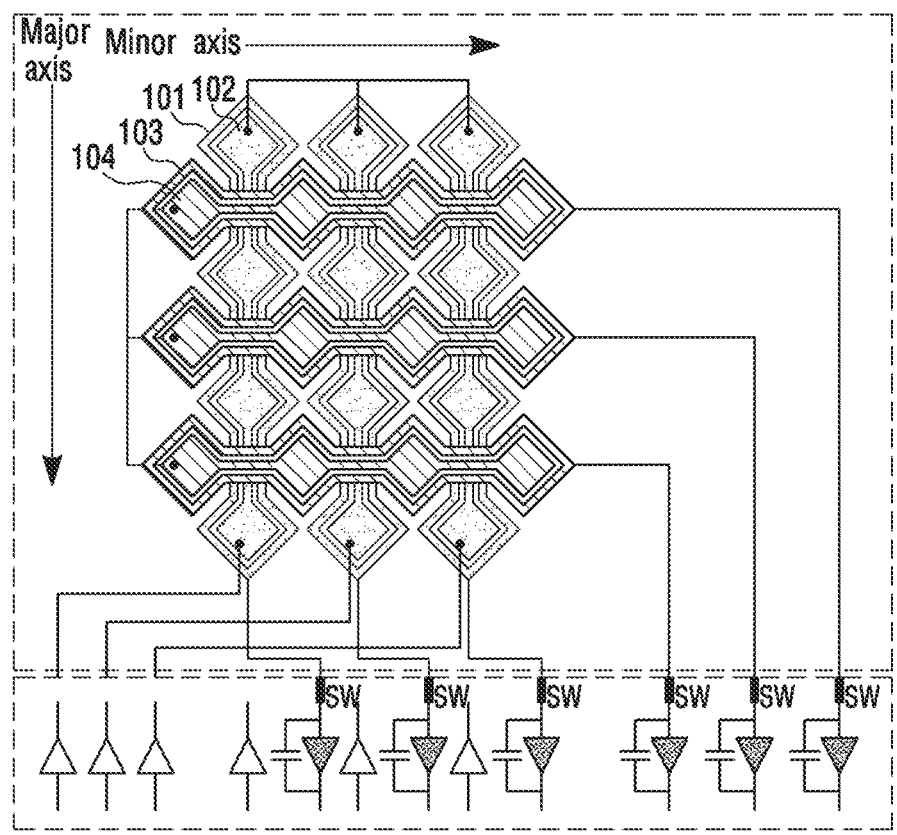
FIG. 20 is a view illustrating a case in which the touch input device in FIG. 16 operates in a stylus sensing mode (or stylus downlink mode)

FIG. 20 is a view illustrating a case in which the touch input device illustrated in FIG. 16 operates in the stylus pen sensing mode (or stylus downlink mode).

Referring to FIGS. 16 and 20, in case of the stylus pen sensing mode, the control unit 500 may electrically connect the plurality of sensing circuit units for stylus sensing to the first pattern 101 and the third pattern 103 of the sensor unit 102. The control unit 500 may control a plurality of switches sw to electrically connect the conductive traces connected to the plurality of first patterns 101 and the plurality of third patterns 103 with the plurality of sensing circuit units.

The touch input device according to an embodiment of the present invention has an advantage in that an output voltage value of the plurality of sensing circuit units is hardly changed according to the position of the stylus pen on the sensor unit 100 in the stylus pen sensing mode due to the configuration of the sensor unit 100. A specific principle for this will be described with reference to FIGS. 21A to 21F.

FIGS. 21A to 21F are schematic views for explaining an operation principle of the stylus pen sensing mode of FIG. 20

FIG. 21A is a schematic circuit diagram of modeling one first pattern 101 in FIG. 20 and the sensing circuit unit of the control unit 500 electrically connected thereto, and FIG. 21B is a schematic circuit diagram of modeling the second pattern 102 disposed in one first pattern 101.

FIG. 21C is a voltage distribution graph in the circuit diagram of FIG. 21A, and FIG. 21D is a voltage distribution graph in the circuit diagram of FIG. 21B.

Referring to FIGS. 21A and 21C, when the stylus pen 50 approaches an arbitrary point A spaced away from the sensing circuit unit on the first pattern 101, a voltage Vemf (hereinafter, referred to as an 'induced voltage') induced by a signal emitted from the stylus pen is generated at the corresponding point A.

When an induced voltage Vemf is generated at the point A, since an equivalent capacitance of the first pattern 101 viewed from the point A to the left side decreases, equivalent impedance increases. Thus, as most of the induced voltage Vemf is applied to the left side of the point A, and a voltage of about 0 V is applied to the right side of the point A, almost no current flows. Furthermore, as the voltage of about 0 V applied to the right side of the point A gradually decreases by equivalent resistances of the first pattern 101, almost no voltage is applied to an input terminal of the sensing circuit unit.

Referring to FIGS. 21B and 21D, when the induced voltage Vemf is generated at the point A, since the other ends of each second pattern 102 are electrically connected to each other on the left side of the point A, since an equivalent capacitance viewed from the point A to the left side increases, equivalent impedance approaches almost 0. Thus, a voltage of 0 V is applied to the left side of the point A, and the voltage Vemf is applied to the right side of the point A without causing a voltage drop at equivalent resistors because one end of the second pattern 102 is opened.

When FIGS. 21C and 21D are compared, it may be known that a potential difference as much as the voltage Vemf exists at any position between the first pattern 101 and the second pattern 102. The potential difference as much as the voltage Vemf between the first pattern 101 and the second pattern 102 causes capacitive coupling between the first pattern 101 and the second pattern 102. As illustrated in FIG. 21E, current flows from the second pattern 102 to the first pattern 101 by the capacitive coupling. As illustrated in FIG. 21A, although current generated from the first pattern 101 itself gradually decreases as a distance from the position of the stylus pen to the sensing circuit unit of the control unit 500 increases, since current is introduced to the first pattern 101 from the second pattern 102, current outputted from the first pattern 101 to the sensing circuit unit of the control unit 500 has almost no difference from the position of the pen. Thus, the control unit 500 may sense the position of the stylus pen through the sensing circuit unit electrically connected to the first pattern 101 and the third pattern 103.

As shown in FIGS. 21A to 21E, it may be known that a potential difference between the first pattern 101 and the second pattern 102 is constant as the voltage Vemf although the point A moves to the left or right side. Thus, the control unit 500 may sense the stylus pen from a constant signal outputted from the sensing circuit unit regardless of whether the position of the stylus pen on the sensor unit 100 is close to or far from the sensing circuit unit.

Although the current is introduced to the first pattern 101 from the second pattern 102 by the capacitive coupling in a description of FIG. 21E, the embodiment of the present invention is not limited thereto. For example, current may be also introduced to the first pattern 101 from the second pattern 102 by magnetic coupling (magnetic field coupling).

Various combinations of the plurality of first to fourth patterns 101, 102, 103, and 104 may be used so that the sensor unit 100 of the touch input device shown in FIG. 16 drives and senses the stylus pen. The various combinations are shown in <Table 2> below. In <Table 2> below, '1' represents the plurality of first patterns 101, '2' represents the plurality of second patterns 102, '3' represents the plurality of third patterns 103, and '4' represents the plurality of fourth patterns 104.

TABLE 2

| No. | Finger Touch Operation | | Stylus Operation | | | | uplink signal magnitude | | downlink signal magnitude | | Stylus additional channel | |
|---|---|---|---|---|---|---|---|---|---|---|---|---|
| | Driving Tx | Sensing Rx | Driving Major axis | Driving Minor axis | Sensing X-axis | Sensing Y-axis | Major axis | Minor axis | X-axis | Y-axis | Driving | Sensing |
| 1 | 1 | 3 | 2 | | 1 | 3 | Small | | Small | Small | Yes | No |
| 2 | 1 | 3 | 2 | | 1 | 4 | Large | | Small | Large | Yes | Yes |
| 3 | 1 | 3 | 2 | | 2 | 3 | Large | | Large | Small | Yes | Yes |
| 4 | 1 | 3 | 2 | | 2 | 4 | Large | | Large | Large | Yes | Yes |
| 5 | 1 | 3 | | 4 | 1 | 3 | | Large | Small | Small | Yes | No |
| 6 | 1 | 3 | | 4 | 1 | 4 | | Large | Small | Large | Yes | Yes |
| 7 | 1 | 3 | | 4 | 2 | 3 | | Large | Large | Small | Yes | Yes |
| 8 | 1 | 3 | | 4 | 2 | 4 | | Large | Large | Large | Yes | Yes |
| 9 | 1 | 3 | 2 | 4 | 1 | 3 | Large | Large | Small | Small | Yes | No |
| 10 | 1 | 3 | 2 | 4 | 1 | 4 | Large | Large | Small | Large | Yes | Yes |
| 11 | 1 | 3 | 2 | 4 | 2 | 3 | Large | Large | Large | Small | Yes | Yes |
| 12 | 1 | 3 | 2 | 4 | | 4 | Large | Large | Large | Large | Yes | Yes |
| 13 | 1 | 3 | 1 | | 1 | 3 | Small | | Small | Small | No | No |
| 14 | 1 | 3 | 1 | | 1 | 4 | Small | | Small | Large | No | Yes |
| 15 | 1 | 3 | 1 | | 2 | 3 | Small | | Large | Small | No | Yes |
| 16 | 1 | 3 | 1 | | 2 | 4 | Small | | Large | Large | No | Yes |
| 17 | 1 | 3 | | 3 | 1 | 3 | | Small | Small | Small | No | No |
| 18 | 1 | 3 | | 3 | 1 | 4 | | Small | Small | Large | No | Yes |
| 19 | 1 | 3 | | 3 | 2 | 3 | | Small | Large | Small | No | Yes |
| 20 | 1 | 3 | | 3 | 2 | 4 | | Small | Large | Large | No | Yes |
| 21 | 1 | 3 | 1 | 3 | 1 | 3 | Small | Small | Small | Small | No | No |
| 22 | 1 | 3 | 1 | 3 | 1 | 4 | Small | Small | Small | Large | No | Yes |
| 23 | 1 | 3 | 1 | 3 | 2 | 3 | Small | Small | Large | Small | No | Yes |
| 24 | 1 | 3 | 1 | 3 | 2 | 4 | Small | Small | Large | Large | No | Yes |
| 25 | 1 | 3 | 2 | 3 | 1 | 3 | Large | Small | Small | Small | Yes | No |
| 26 | 1 | 3 | 2 | 3 | 1 | 4 | Large | Small | Small | Large | Yes | Yes |
| 27 | 1 | 3 | 2 | 3 | 2 | 3 | Large | Small | Large | Small | Yes | Yes |
| 28 | 1 | 3 | 2 | 3 | 2 | 4 | Large | Small | Large | Large | Yes | Yes |
| 29 | 1 | 3 | 1 | 4 | 1 | 3 | Small | Large | Small | Small | Yes | No |
| 30 | 1 | 3 | 1 | 4 | 1 | 4 | Small | Large | Small | Large | Yes | Yes |
| 31 | 1 | 3 | 1 | 4 | 2 | 3 | Small | Large | Large | Small | Yes | Yes |
| 32 | 1 | 3 | 1 | 4 | 2 | 4 | Small | Large | Large | Large | Yes | Yes |

Referring to the <Table 2> above, in various combinations No. 1 to No. 32, the plurality of first patterns 101 and the plurality of third patterns 103 sense a touch of an object such as a finger. Specifically, the plurality of first patterns 101 operate as touch driving electrodes, and the plurality of third patterns 103 operate as touch receiving electrodes by the control unit 500. Although not shown in the table, the plurality of first patterns 101 may operate as the touch receiving electrodes and the plurality of third patterns 103 may operate as the touch driving electrodes by the control unit 500.

One or two of the plurality of first to fourth patterns 101, 102, 103, and 104 may operate as a stylus driving electrode for driving the stylus pen by the control unit 500. One or two of the plurality of first to fourth patterns 101, 102, 103, and 104 may be used to form a current loop for driving the stylus pen. An X-axis driving may be performed by one of the plurality of first patterns 101 and the plurality of second patterns 102, and a Y-axis driving may be performed by one of the plurality of third patterns 103 and the plurality of fourth patterns 104. The driving of the stylus pen may be performed by either the X-axis driving or the Y-axis driving or by both the X-axis driving and the Y-axis driving.

At least two of the plurality of first to fourth patterns 101, 102, 103, and 104 may operate as a sensing electrode for sensing a stylus pen signal emitted from the stylus pen. Since both X-axis sensing and Y-axis sensing are required to sense the stylus pen signal, two of the plurality of first to fourth patterns 101, 102, 103, and 104 are used. An X-axis sensing may be performed by one of the plurality of first patterns 101 and the plurality of second patterns 102, and a Y-axis sensing may be performed by one of the plurality of third patterns 103 and the plurality of fourth patterns 104.

In the <Table 2> above, the 'magnitude of uplink signal' represents a magnitude of a driving signal for driving the stylus pen. When the same stylus pen driving signal is applied to each of the plurality of first patterns 101 and the plurality of second patterns 102, and magnitudes of signals received by the stylus pen are compared, the uplink signal is relatively greater when the stylus pen driving signal is applied to the plurality of second patterns 102 than when the stylus pen driving signal is applied to the plurality of first patterns 101.

This is because the other ends of the plurality of first patterns 101 are not electrically connected not to form a current loop while the other ends of the plurality of second patterns 102 are electrically connected to form at least one current loop when two or more second patterns to which the stylus pen driving signal is applied are properly selected. When current flows through each first pattern 101, since RC of each first pattern 101 is charged, the current may not flow smoothly from one end to the other end of each first pattern 101. Also, a stylus pen driving signal applied through the plurality of first patterns 101 is transmitted to the plurality of second patterns 101 in which the current loop is formed through the capacitive coupling. Here, signal attenuation occurs by the capacitive coupling.

Likewise, the uplink signal is relatively greater when the stylus pen driving signal is applied to the plurality of fourth patterns 104 than when the stylus pen driving signal is applied to the plurality of third patterns 103.

In the <Table 2> above, the 'magnitude of downlink signal' represents a magnitude of stylus pen signal received from the stylus pen. When the same stylus pen driving signal is received by each of the plurality of first patterns 101 and the plurality of second patterns 102, and magnitudes of the signals are compared, the downlink signal is relatively greater when the stylus pen driving signal is received by the plurality of second patterns 102 than when the stylus pen driving signal is received by the plurality of first patterns 101. This is because, although the other ends of the plurality of second patterns 102 are electrically connected to form a current loop, the other ends of the plurality of first patterns 101 are not electrically connected to each other, particularly, the stylus pen signal is transmitted to the plurality of first patterns 101 from the plurality of second patterns 101 in which the current loop is formed through the capacitive coupling, and thus attenuation of the downlink signal occurs.

Likewise, the downlink signal is relatively greater when the stylus pen signal is received through the plurality of fourth patterns 104 than when the stylus pen signal is received through the plurality of third patterns 103.

In <Table 2> above, the 'stylus additional channel' represents whether an additional channel is necessary for the stylus pen in addition to the touch sensing. When the plurality of second patterns 102 and/or the plurality of fourth patterns 104 are used for driving or sensing the stylus pen, an additional channel is required (marked by 'Yes' in the <Table 2>). Also, when the plurality of first patterns 101 and/or the plurality of third patterns 103 for touch sensing are used for driving or sensing the stylus pen, an additional channel is not required (marked by 'No' in the <Table 2>).

Hereinafter, some examples of the various combinations No. 1 to No. 32 of the <Table 2> above will be described in detail below. Here, combinations not described will be sufficiently understood by a person skilled in the art through the following detailed description.

In case of No. 1, the plurality of first patterns 101 are used as a touch driving electrode for sensing a touch of an object and a stylus sensing electrode for sensing a stylus pen signal. The plurality of second patterns 102 are used as a stylus driving electrode for driving the stylus pen. The plurality of third patterns 103 are used as the stylus sensing electrode for sensing the stylus pen signal as well as the touch sensing electrode for sensing the touch of the object. Also, the plurality of fourth patterns 104 are electrically floated.

In case of No. 1, since the plurality of second patterns 102 are used as the stylus driving electrode, the uplink signal has a relatively large magnitude. Since the plurality of first patterns 101 and the plurality of third patterns 103 are used as the stylus sensing electrode, the downlink signal has a relatively small magnitude. Also, since the plurality of second patterns 102 are separately used as the stylus driving electrode, an additional channel for driving the stylus pen is required, but an additional channel for sensing the stylus pen is not required.

In case of No. 4, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. Also, The plurality of fourth patterns 104 are used as the stylus sensing electrode for sensing the stylus pen signal.

In case of No. 4, since the plurality of second patterns 102 are used as the stylus driving electrode, the uplink signal has a relatively large magnitude. Since the plurality of second patterns 102 and the plurality of third patterns 103 are used as the stylus sensing electrode, the downlink signal has a relatively small magnitude. Also, since the plurality of second patterns 102 are separately used as the stylus driving electrode and the stylus sensing electrode, and the plurality of fourth patterns 104 are separately used as the stylus sensing electrode, a separate additional channel is required for driving and sensing the stylus pen.

In case of No. 8, the plurality of first patterns 101 are used as the touch driving electrode for sensing the touch of the object. The plurality of second patterns 102 are used as the stylus sensing electrode for sensing the stylus pen signal. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In case of No. 8, since the plurality of fourth patterns 104 are used as the stylus driving electrode, the uplink signal has a relatively large magnitude. Since the plurality of second patterns 102 and the plurality of fourth patterns 104 are used as the stylus sensing electrode, the downlink signal has a relatively large magnitude. Also, since the plurality of second patterns 102 are separately used as the stylus sensing electrode, and the plurality of fourth patterns 104 are separately used as the stylus driving electrode and the stylus sensing electrode, a separate additional channel is required for driving and sensing the stylus pen.

In case of No. 12, the plurality of first patterns 101 are used as the touch driving electrode for sensing the touch of the object. The plurality of second patterns 102 are used as the stylus sensing electrode for sensing the stylus pen signal as well as the stylus driving electrode for driving the stylus pen. The plurality of third patterns 103 are used as the touch sensing electrode for sensing the touch of the object. Also, the plurality of fourth patterns 104 are used as the stylus sensing electrode for sensing the stylus pen signal as well as the stylus driving electrode for driving the stylus pen.

In case of No. 12, since the plurality of second and fourth patterns 102 and 104 are used as the stylus driving electrode, the uplink signal has a relatively large magnitude. Since the plurality of second patterns 102 and the plurality of fourth patterns 104 are used as the stylus sensing electrode, the downlink signal has a relatively large magnitude. Also, since the plurality of second patterns 102 are separately used as the stylus driving electrode and the stylus sensing electrode, and the plurality of fourth patterns 104 are separately used as the stylus driving electrode and the stylus sensing electrode, a separate additional channel is required for driving and sensing the stylus pen.

In case of No. 13, the plurality of first patterns 101 are used as the touch driving electrode for sensing the touch of the object, the stylus driving electrode for driving the stylus pen, and the stylus sensing electrode for sensing the stylus pen signal. The plurality of third patterns 103 are used as the stylus sensing electrode for sensing the stylus pen signal as well as the touch sensing electrode for sensing the touch of the object. Also, the plurality of second and fourth patterns 102 and 104 are electrically floated.

In case of No. 13, since the plurality of first patterns 101 are used as the stylus driving electrode, the uplink signal has a relatively large magnitude. Since the plurality of first patterns 101 and the plurality of third patterns 103 are used as the stylus sensing electrode, the downlink signal has a relatively small magnitude. Also, since the plurality of first patterns 101 are separately used as the stylus driving electrode and the stylus sensing electrode, and the plurality of third patterns 103 are used as the stylus sensing electrode, a separate additional channel is not required for driving and sensing the stylus pen.

In case of No. 17, the plurality of first patterns 101 are used as a touch driving electrode for sensing the touch of the object and the stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floated.

In case of No. 17, since the plurality of third patterns 103 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of first patterns 101 are separately used as the stylus sensing electrode, and the plurality of third patterns 103 are used as the stylus driving electrode and the stylus sensing electrode, a separate additional channel is not required for driving and sensing the stylus pen.

In case of No. 21, the plurality of first patterns 101 are used as the touch driving electrode for sensing the touch of the object, the stylus driving electrode for driving the stylus pen, and the stylus sensing electrode for sensing the stylus pen signal. The plurality of third patterns 103 are used as the touch sensing electrode for sensing the touch of the object, the stylus driving electrode for driving the stylus pen, and the stylus sensing electrode for sensing the stylus pen signal. Also, the plurality of second and fourth patterns 102 and 104 are electrically floated.

In case of No. 17, since the plurality of first and third patterns 103 are used as the stylus driving electrode, the uplink signal has a relatively small magnitude. Since the plurality of first patterns 101 and the plurality of third patterns 103 are used as the stylus sensing electrode, the downlink signal has a relatively small magnitude. Also, since the plurality of first patterns 101 are used as the stylus driving electrode and the stylus sensing electrode, and the plurality of third patterns 103 are used as the stylus driving electrode and the stylus sensing electrode, a separate additional channel is not required for driving and sensing the stylus pen.

Among the various combinations No. 1 to No. 32 in the <Table 2> above, in Nos. 1, 5, 9, 25, and 29, driving is 'Yes' and sensing is 'No' in a column of 'Stylus additional channel' The Nos. 1, 5, 9, 25, and 29 use the plurality of first and third patterns 101 and 103 for sensing the stylus pen and the plurality of second and/or fourth patterns 102 and 104 for driving the stylus pen. When the stylus pen is driven, since formation of a magnetic field for resonating the stylus pen may be somewhat difficult although the plurality of second and/or fourth patterns 102 and 104 are used, two or more adjacent one ends of the second patterns may be electrically connected to each other. Likewise, two or more adjacent one ends of the fourth patterns may be electrically connected to each other. This configuration has an advantage of reducing the additional channel for driving the stylus pen.

FIGS. 22 to 26 are views illustrating some of the combinations of the <Table 2> above.

Figure 22:
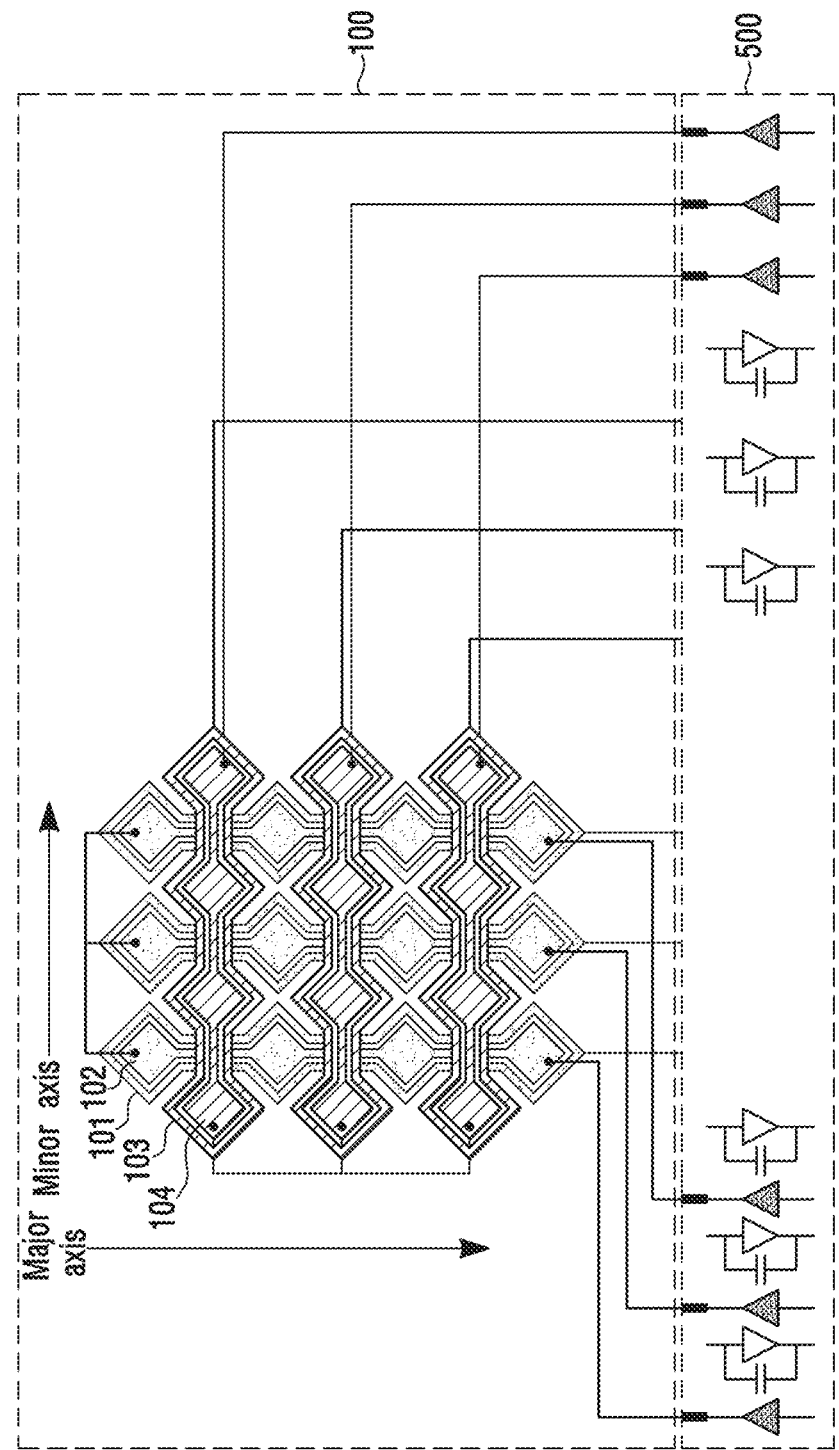
FIG. 22 is a view for explaining another example of operating a sensor unit 100 in FIG. 16 in the antenna driving mode.

FIG. 22 is a view for explaining another example of operating the sensor unit 100 in FIG. 16 in an antenna driving mode.

While only the plurality of second patterns 102 are used for operating the sensor unit 100 in FIG. 16 in the antenna driving mode in FIG. 18, the plurality of fourth patterns 104 are used for driving the sensor unit 100 in the antenna driving mode in addition to the plurality of second patterns 102 in FIG. 22.

The control unit 500 may control the stylus pen driving signal to be applied to the plurality of second patterns 102 and the plurality of fourth patterns 104 or control the stylus pen driving signal to be applied to the plurality of fourth patterns 104 after the stylus pen driving signal is applied to the plurality of second patterns 102. Alternatively, the opposite case may be true.

Figure 23:
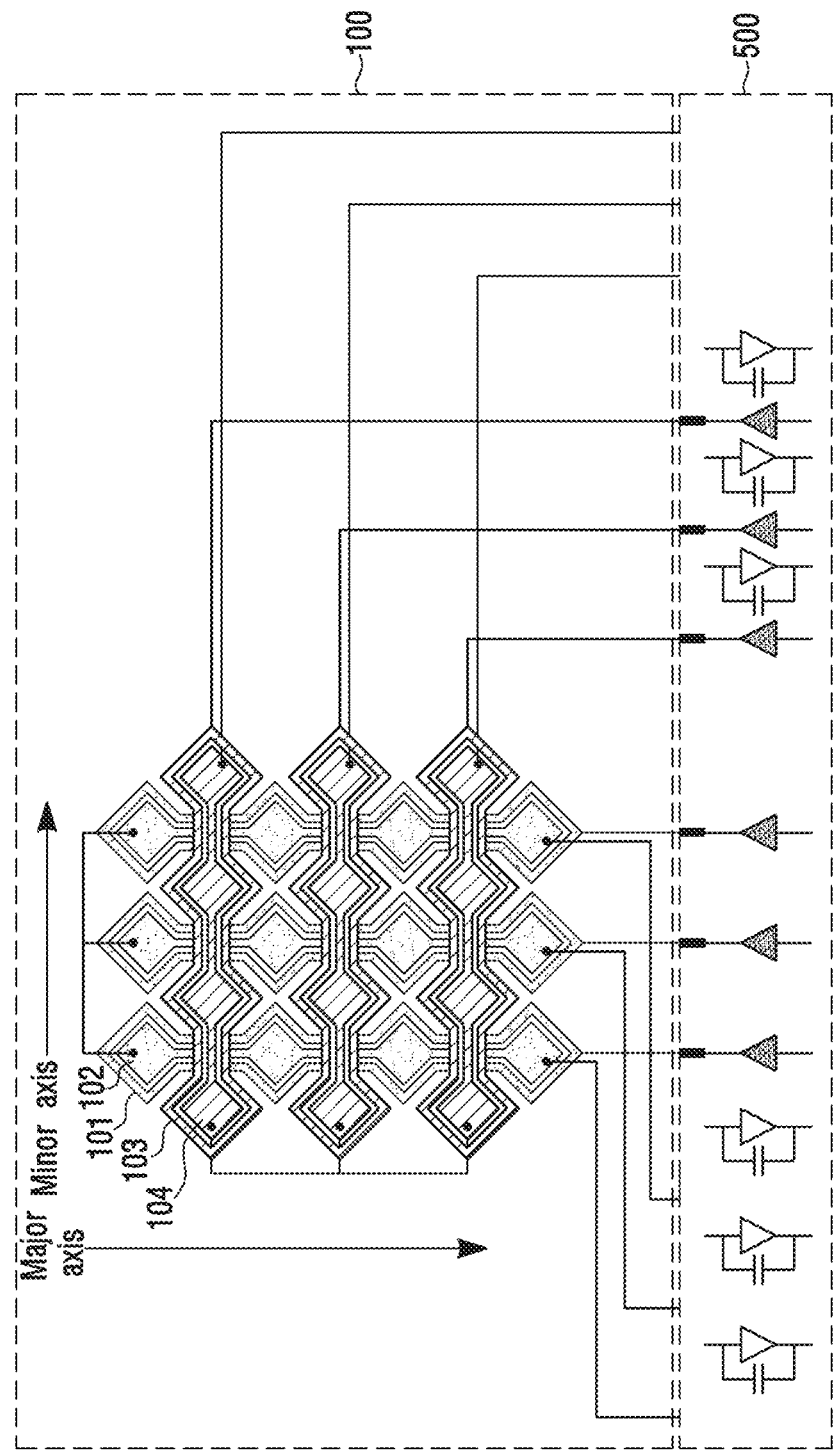
FIG. 23 is a view for explaining another example of operating the sensor unit 100 in FIG. 16 in the antenna driving mode.

FIG. 23 is a view for explaining another example in which the sensor unit 100 in FIG. 16 operates in the antenna driving mode.

While only the plurality of second patterns 102 are used for operating the sensor unit 100 in FIG. 16 in the antenna driving mode in FIG. 18, the plurality of first patterns 101 and the plurality of third patterns 103 are used for driving the sensor unit 100 in the antenna driving mode in FIG. 23.

The control unit 500 may control the stylus pen driving signal to be applied to the plurality of first patterns 101 and the plurality of third patterns 103 or control the stylus pen driving signal to be applied to the plurality of third patterns 103 after the stylus pen driving signal is applied to the plurality of first patterns 101. Alternatively, the opposite case may be true.

Figure 24:
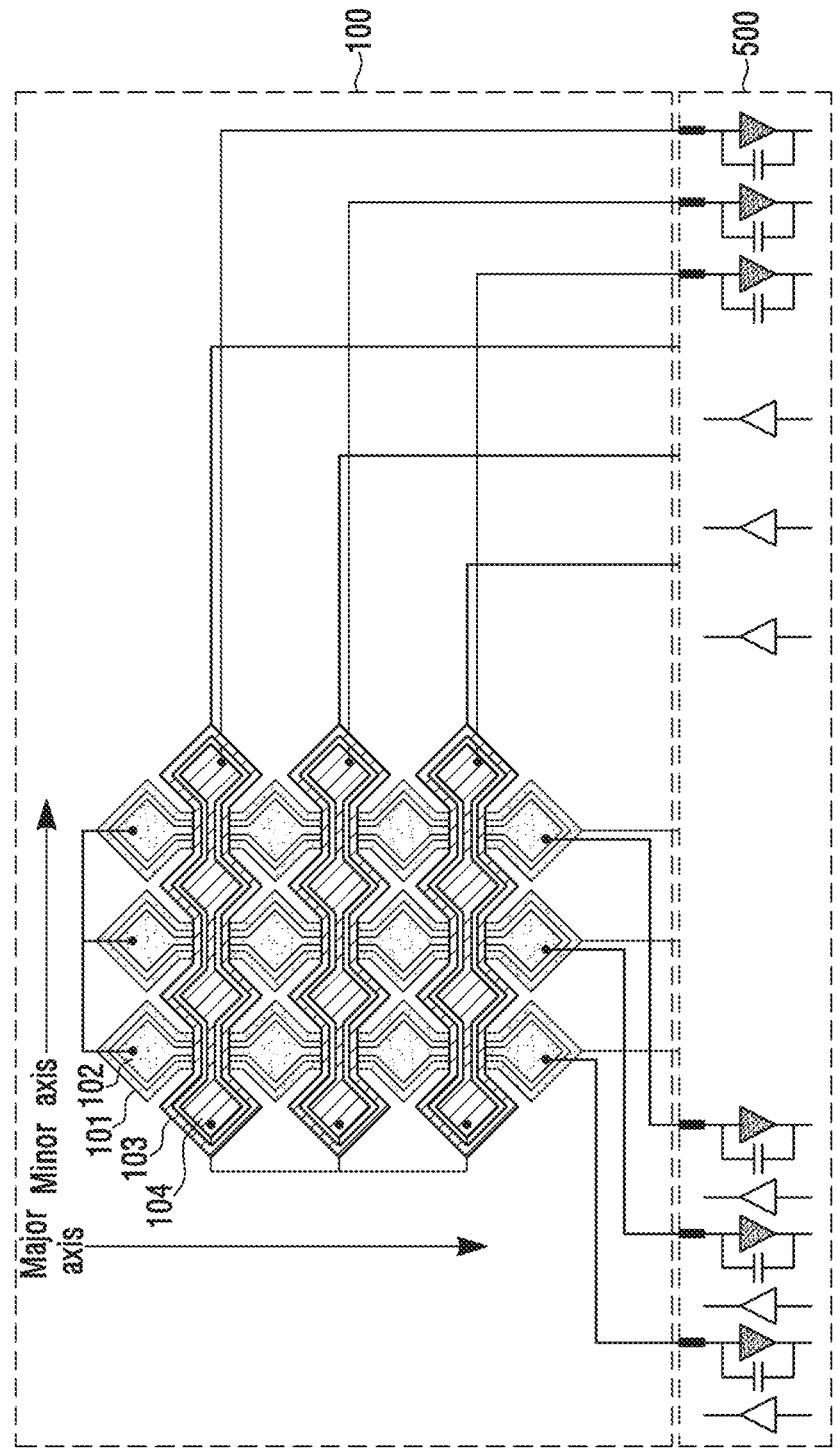
FIG. 24 is a view for explaining another example of operating a sensor unit 100 in FIG. 16 in the stylus sensing mode.

FIG. 24 is a view for explaining another example in which the sensor unit 100 in FIG. 16 operates in the stylus pen sensing mode.

Although the plurality of first patterns 101 and the plurality of third patterns 103 are used when the sensor unit 100 in FIG. 16 operates in the stylus pen sensing mode in FIG. 20, the plurality of second patterns 102 and the plurality of fourth patterns 104 are used together in the stylus pen sensing mode in FIG. 24.

The control unit 500 may sense the stylus pen receiving signal received from the plurality of second patterns 102 and the plurality of fourth patterns 104 to detect a position of the stylus pen in the stylus pen sensing mode.

Figure 25:
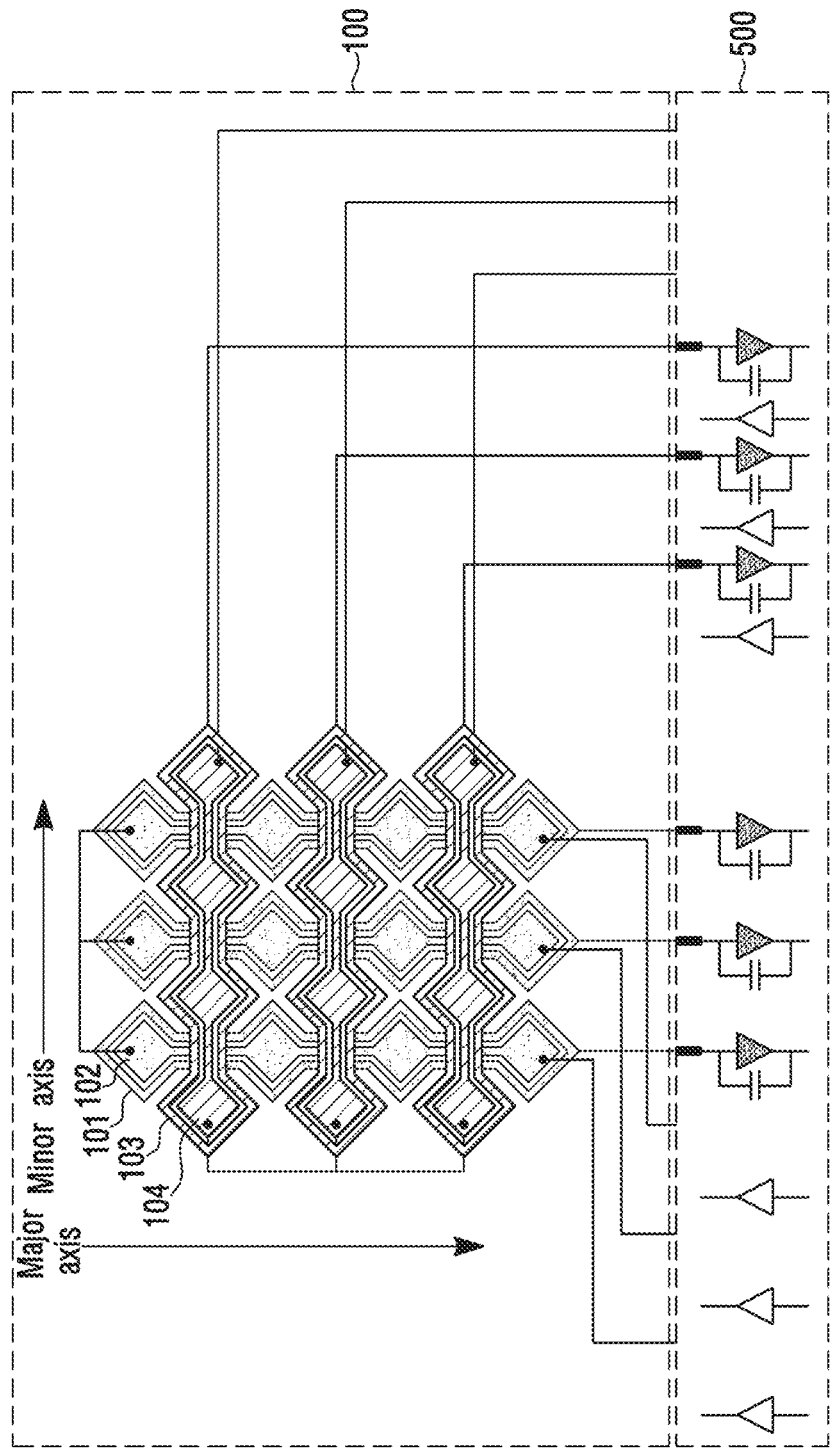
FIG. 25 is a view for explaining another example of operating the sensor unit 100 in FIG. 16 in the stylus sensing mode.

FIG. 25 is a view for explaining another example in which the sensor unit 100 in FIG. 16 operates in the stylus pen sensing mode.

Although the plurality of second patterns 102 and the plurality of fourth patterns 104 are used when the sensor unit 100 in FIG. 16 operates in the stylus pen sensing mode in FIG. 20, the plurality of first patterns 101 and the plurality of second patterns 102 are used together in the stylus pen sensing mode in FIG. 25.

The control unit 500 may sense the stylus pen receiving signal received from the plurality of first patterns 101 and the plurality of third patterns 103 to detect a position of the stylus pen in the stylus pen sensing mode.

Figure 26:
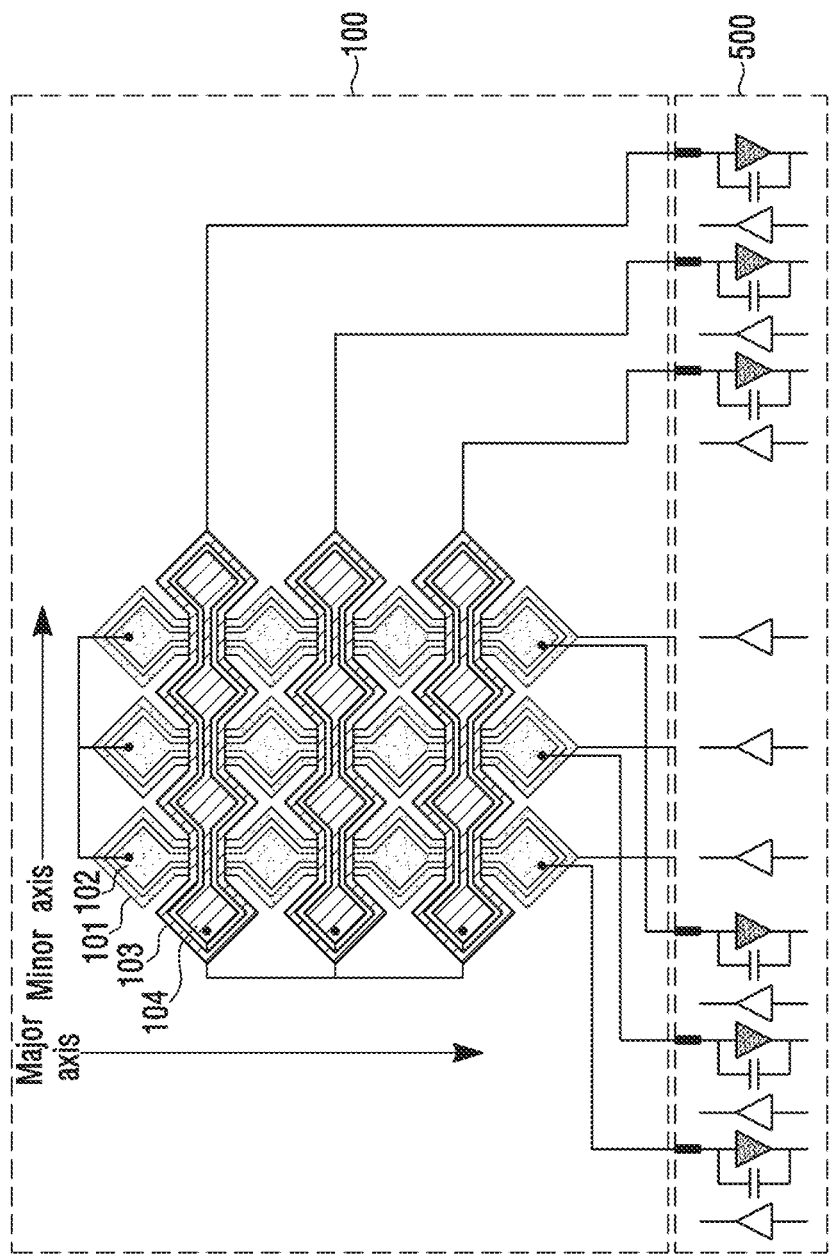
FIG. 26 is a view for explaining another example of operating the sensor unit 100 in FIG. 16 in the stylus sensing mode.

FIG. 26 is a view for explaining another example in which the sensor unit 100 in FIG. 16 operates in the stylus sensing mode.

Although the plurality of first patterns 101 and the plurality of third patterns 103 are used when the sensor unit 100 in FIG. 16 operates in the stylus pen sensing mode in FIG. 20, the plurality of second patterns 102 and the plurality of third patterns 103 are used together in the stylus pen sensing mode in FIG. 26.

The control unit 500 may sense the stylus pen receiving signal received from the plurality of second patterns 102 and the plurality of third patterns 103 to detect a position of the stylus pen in the stylus pen sensing mode. The control unit 500 may sense the stylus pen receiving signal received from the plurality of first patterns 101 and the plurality of fourth patterns 104 to detect a position of the stylus pen in the stylus pen sensing mode.

Figure 27:
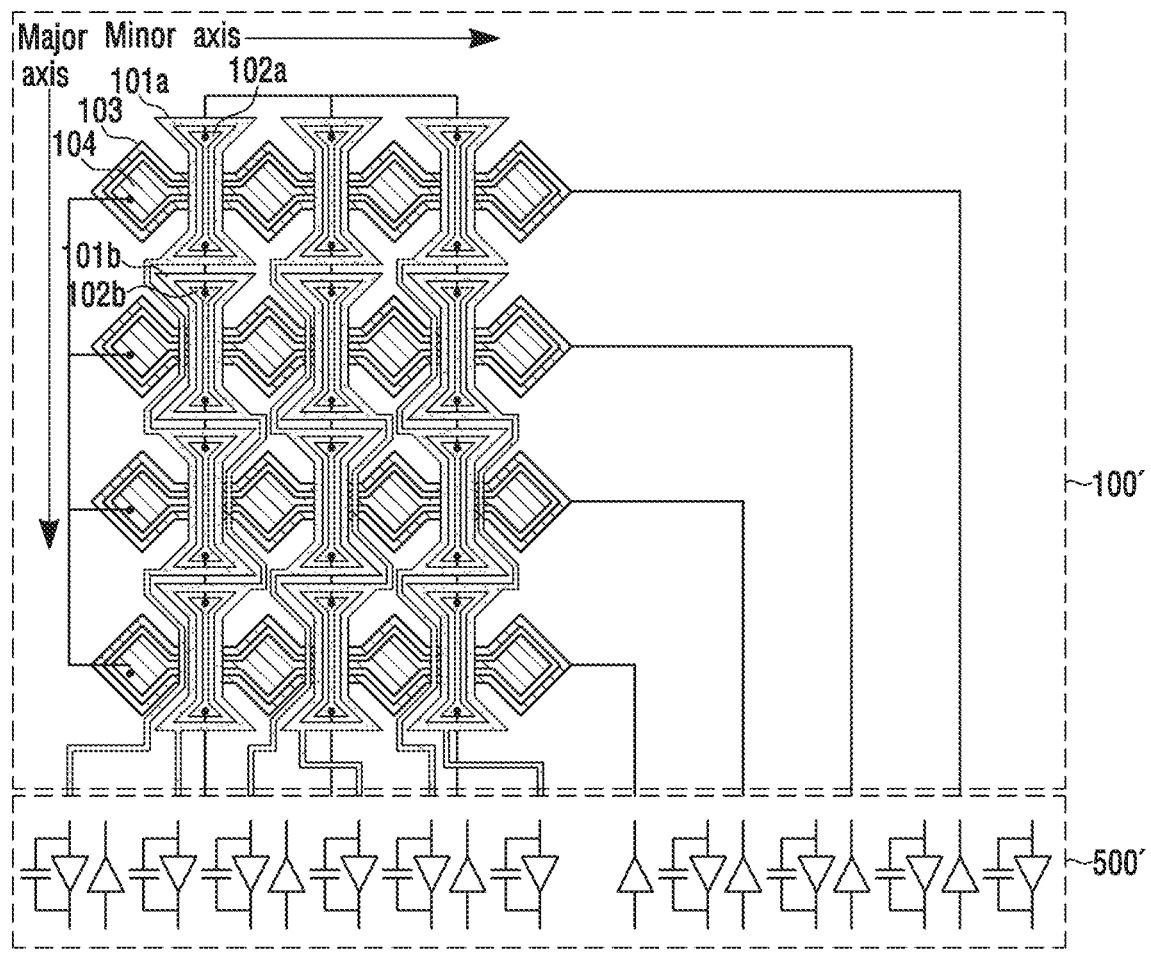
FIG. 27 is a schematic view illustrating a touch input device according to another embodiment of the present invention.

FIG. 27 is a schematic view illustrating a touch input device according to another embodiment of the present invention.

Referring to FIG. 27, the touch input device according to another embodiment of the present invention includes a sensor unit 100' and a control unit 500'.

The sensor unit 100' includes a plurality of patterns. The plurality of patterns may include a first-a pattern 101a, a first-b pattern 101b, a second-a pattern 102a, a second-b pattern 102b, a third pattern 103, and a fourth pattern 104. Here, since the third pattern 103 and the fourth pattern 104 have the same configuration as the third pattern part 103 and the fourth pattern part 104 of the sensor unit 100 illustrated in FIG. 16, a description thereof will be omitted.

The first-a pattern 101a has a shape extending along the first direction (or major axis).

The first-a pattern 101a may include an inverted triangle pattern part, a triangle pattern part, and a connection pattern part connecting the inverted triangle pattern part and the triangular pattern part.

The first-a pattern 101a may have an opening in which the second-a pattern 102a is disposed.

The first-a pattern 101a may have a structure surrounding the second-a pattern 102a. The first-a pattern 101a is spaced a predetermined distance from the second-a pattern 102a. Through this, the first-a pattern 101a and the second-a pattern 102a are electrically insulated from each other.

The second-a pattern 102a is disposed adjacent to the first-a pattern 101a. For example, the second-a pattern 102a may be disposed in the first-a pattern 101a.

The second-a pattern 102a may include an inverted triangle pattern part, a triangle pattern part, and a connection pattern part connecting the inverted triangle pattern part and the triangular pattern part.

The first-b pattern 101b has a shape extending along the first direction (or major axis).

The first-b pattern 101b may include an inverted triangle pattern part, a triangle pattern part, and a connection pattern part connecting the inverted triangle pattern part and the triangular pattern part.

The first-b pattern 101b may have an opening in which the second-b pattern 102b is disposed.

The first-b pattern 101b may have a structure surrounding the second-b pattern 102b. The first-b pattern 101b is spaced a predetermined distance from the second-b pattern 102b. Through this, the first-b pattern 101b and the second-b pattern 102b are electrically insulated from each other.

The second-b pattern 102b is disposed adjacent to the first-b pattern 101b. For example, the second-b pattern 102b is disposed in the first-b pattern 101b.

The second-b pattern 102b may include an inverted triangle pattern part, a triangle pattern part, and a connection pattern part connecting the inverted triangle pattern part and the triangular pattern part.

A plurality of the first-a patterns 101a and a plurality of the first-b patterns 101b are alternately arranged along the first direction, the plurality of the first-a patterns 101a are electrically connected each other, and the plurality of the first-b patterns 101b are also electrically connected to each other.

The first-a pattern 101a disposed at one end of the plurality of the first-a patterns 101a is electrically connected to the control unit 500'.

The first-b pattern 101b disposed at one end of the plurality of the first-b patterns 101b is electrically connected to the control unit 500'.

A plurality of the second-a patterns 102a and a plurality of the second-b patterns 102b are alternately arranged in the first direction and electrically connected to each other. The second-b pattern 102b disposed at one end of the plurality of the second-b patterns 102b may be electrically connected to the control unit 500', and the second-a pattern 102a disposed at the other end of the plurality of the second-a patterns 102a may be electrically connected to other adjacent second-a patterns. Here, other second-a patterns adjacent to the second-a pattern 102a disposed at the other end may be grounded.

The first-a pattern 101a, the first-b pattern 101b, the second-a pattern 102a, and the second-b pattern 102b may be disposed on the same layer. The first-a pattern 101a, the first-b pattern 101b, the second-a pattern 102a, and the second-b pattern 102b may be formed on the same layer by using a metal mesh.

The control unit 500' has the same function as the controller unit 500 in FIG. 16.

Figure 28:
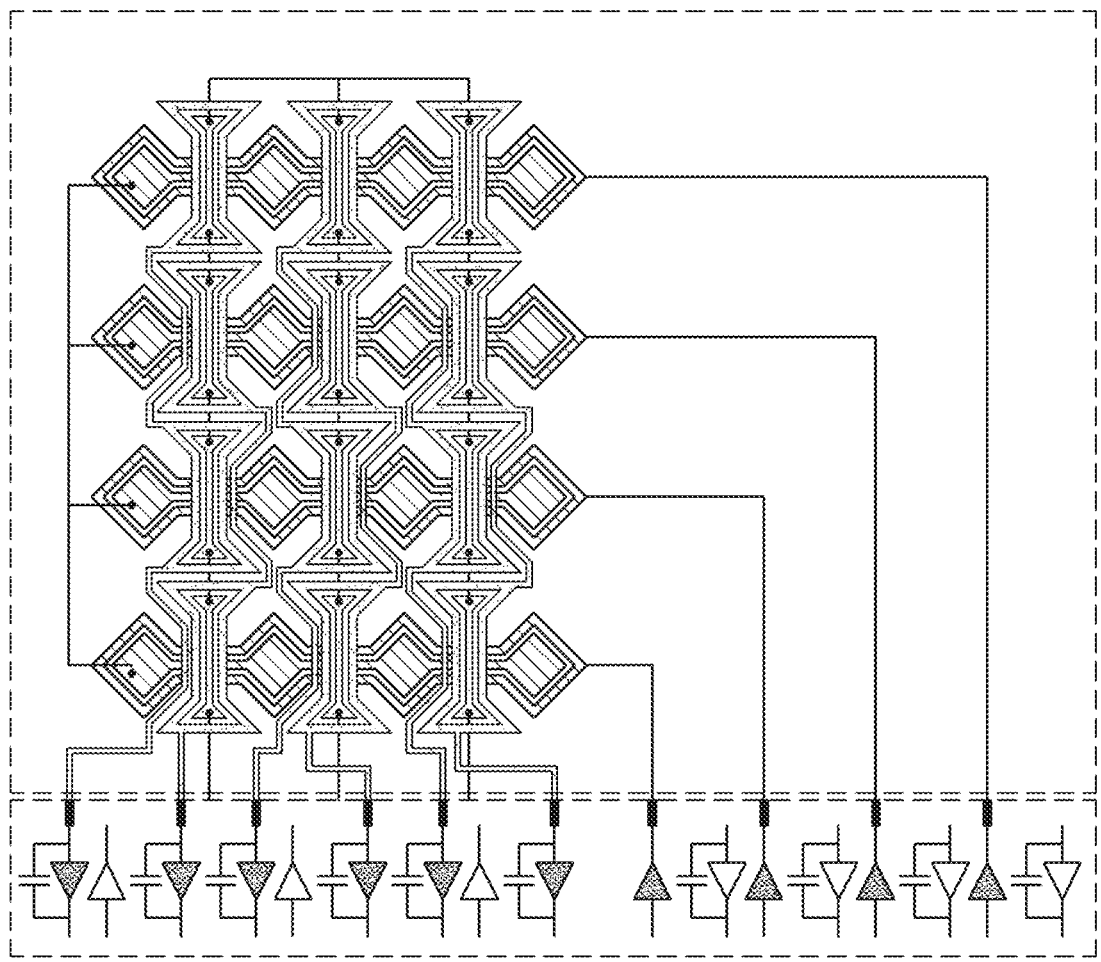
FIG. 28 is a view illustrating a case in which a touch input device in FIG. 27 operates in a touch sensing mode (or 2D sensing mode)

FIG. 28 is a view illustrating a case in which the touch input device illustrated in FIG. 27 operates in the touch sensing mode (or 2D sensing mode).

Referring to FIGS. 27 and 28, in case of the touch sensing mode, the control unit 500' may electrically connect the driving circuit unit for touch sensing to the third pattern 103 of the sensor unit 100'. One driving circuit unit may be electrically connected to each of the plurality of the third patterns 103.

Also, the control unit 500' may electrically connect the sensing circuit unit for touch sensing to the first-a and first-b patterns 101a and 101b of the sensor unit 100'.

In the touch sensing mode, the control unit 500' applies a driving signal for touch sensing to the plurality of the third pattern 103 and receives a sensing signal received from the plurality of the first-a and the first-b patterns 101a and 101b. The sensing circuit unit of the control unit 500' electrically connected to the plurality of first-a and first-b patterns 101a and 101b may output information on capacitance variation contained in the input sensing signal as a predetermined voltage value. The control unit 500' may process the outputted voltage value to detect a touch position. Here, the control unit 500' may cancel a display noise and a LGM noise by subtracting the sensing signal received from the first-b pattern 101b from a sensing signal received from the first-a pattern 101a.

Here, the control unit 500' controls the same driving signal to be applied to the plurality of third patterns 103 and the plurality of fourth patterns, so that capacitive coupling is not generated between the third pattern 103 and the fourth pattern 104. Alternatively, the control unit 500' may control a reference potential to be applied to the plurality of fourth patterns 104.

Figure 29:
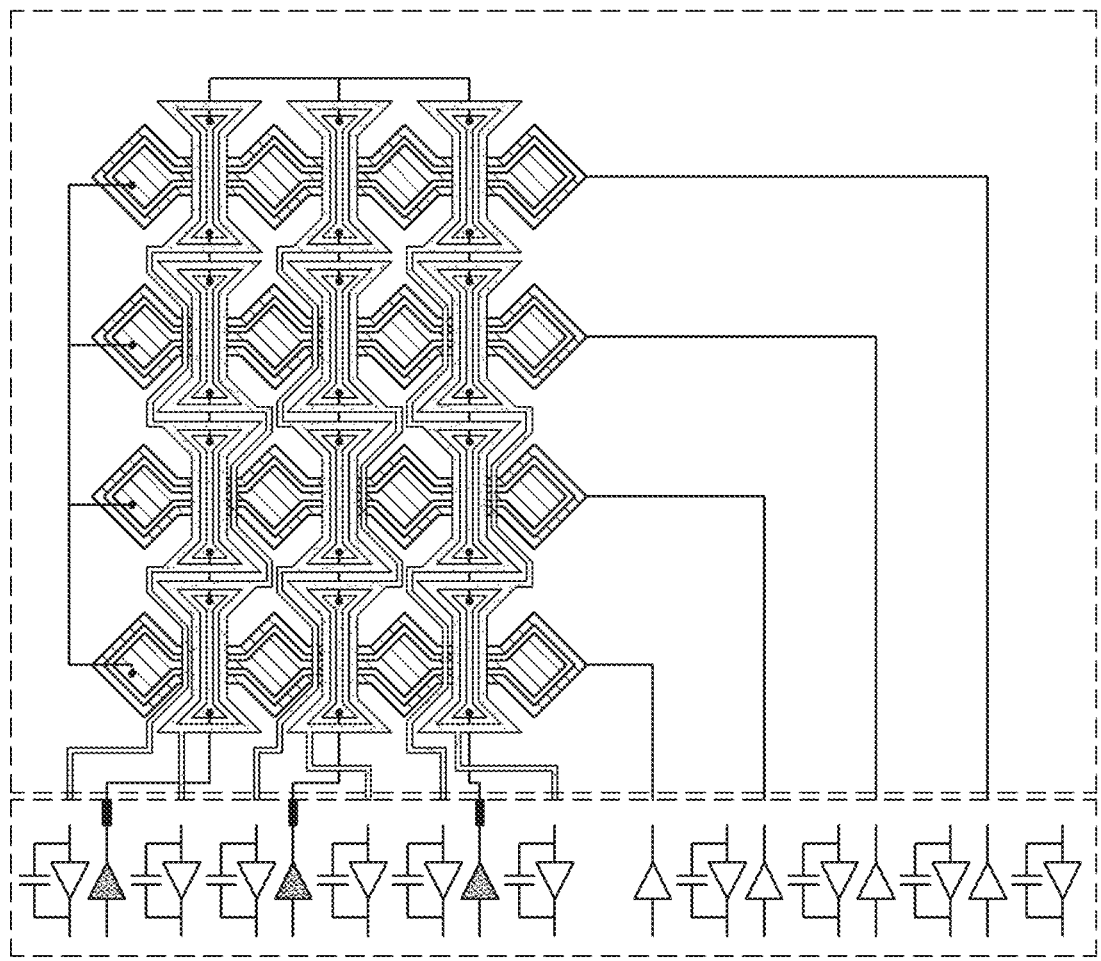
FIG. 29 is a view illustrating a case in which the touch input device in FIG. 27 operates in the antenna driving mode (or stylus driving mode, or stylus uplink mode)

FIG. 29 is a view illustrating a case in which the touch input device illustrated in FIG. 27 operates in the antenna driving mode (or stylus driving mode, or stylus uplink mode).

Referring to FIGS. 27 and 29, in the antenna driving mode, the control unit 500' may electrically connect the driving circuit unit for antenna driving to the plurality of second-a and second-b patterns 102a and 102b of the sensor unit 100'.

The control unit 500' may control a driving signal outputted from each driving circuit unit connected to the plurality of second-a and second-b patterns 102a and 102b. For example, the control unit 500' may control a first driving circuit unit to output a pulse signal having a predetermined frequency, a second driving circuit unit not to output a pulse signal, and a third driving circuit unit to output a pulse signal that is opposite to the pulse signal outputted from the first driving circuit unit. In this case, a current loop is formed by the second-a and second-b patterns 102a and 102b electrically connected to the first driving circuit unit and the second-a and second-b patterns electrically connected to the third driving circuit unit. A magnetic field is generated by the formed current loop, and the stylus pen adjacent to the magnetic field may be resonated and driven by the magnetic field.

The control unit 500' may control two arbitrary driving circuit units among the plurality of driving circuit units electrically connected to the plurality of second-a and second-b patterns 102a and 102b to output pulse signals opposite to each other. Thus, the control unit 500' may variously change and set a size and a position of the current loop. For example, when the control unit 500' detects a position of the stylus pen adjacent to the sensor unit 100', the control unit 500' may control opposite driving signals to be outputted from the driving circuit unit electrically connected to two second patterns disposed around the position of the stylus pen, and when the control unit 500' does not detect the position of the stylus pen, the control unit 500' may control opposite driving signals to be outputted from the driving circuit unit electrically connected to two second-a and second-b patterns 102a and 102b disposed both outermost portions among the plurality of second-a and second-b patterns 102a and 102b.

Although not shown in the drawing, the control unit 500' may control the driving signal to be applied to the plurality of first-a and first-b patterns 101a and 101b and/or the third pattern 103. In this case, the total number of channels may be reduced.

Figure 30:
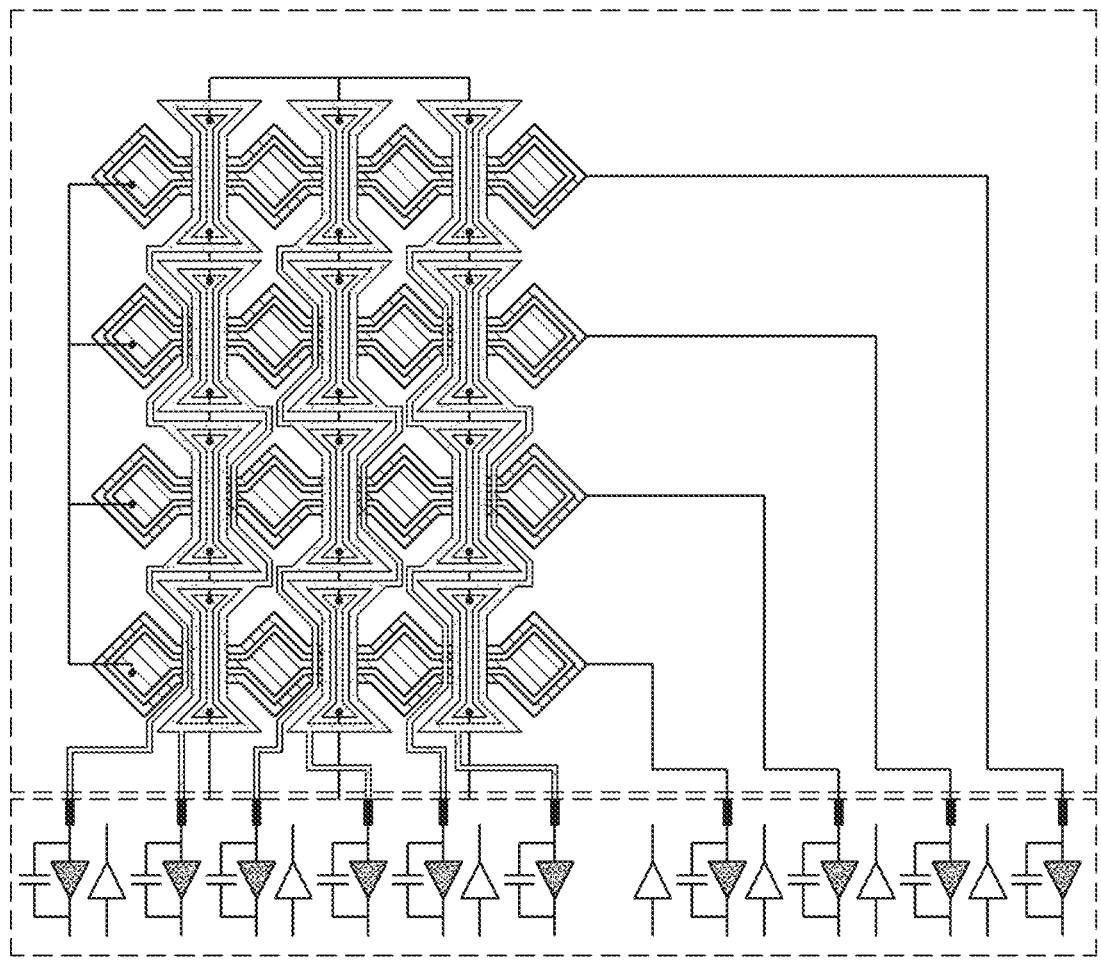
FIG. 30 is a view illustrating a case in which the touch input device in FIG. 27 operates in the stylus sensing mode (or stylus downlink mode)

FIG. 30 is a view illustrating a case in which the touch input device illustrated in FIG. 27 operates in the stylus sensing mode (or stylus downlink mode).

Referring to FIGS. 30 and 27, in case of the stylus sensing mode, the control unit 500' may electrically connect the sensing circuit unit for stylus sensing to the first-a and first-b patterns 101a and 101b and the third pattern 103 of the sensor unit 100'.

In the stylus sensing mode, similar to the principle described with reference to FIG. 21, when the stylus pen approaches an arbitrary position of the sensor unit 100', a predetermined signal is outputted from the stylus pen, and an induced voltage is generated in the first-a, first-b, second-a, second-b, third, and fourth patterns 101a, 101b, 102a, 102b, 103, and 104 by the outputted signal.

Here, when the stylus pen is spaced apart from the control unit 500', since current is introduced from the plurality of second-a patterns 102a although current does not flow through the plurality of first-a patterns 101a themselves by the generated induced voltage, the control unit 500' may detect the position of the stylus pen through the sensing circuit unit electrically connected to the plurality of first-a patterns 101a. Here, the feature in which the current is introduced from the second-a pattern 102a to the first-a pattern 101a is caused by capacitive coupling between the first-a pattern 101a and the second-a pattern 102a, which occurs by a potential difference generated as much as the induced voltage between the first-a pattern 101a and the second-a pattern 102a.

Likewise, although almost no current flows through the plurality of first-b patterns 101b themselves, since current is introduced from the plurality of second-b patterns 102b, the control unit 500' may detect the position of the stylus pen through the sensing circuit unit electrically connected to the plurality of first-b patterns 101b.

Likewise, although almost no current flows through the plurality of first-b patterns 101b themselves, since current is introduced from the plurality of fourth patterns 104, the control unit 500' may detect the position of the stylus pen through the sensing circuit unit electrically connected to the third pattern 103.

Although not shown in the drawing, unlike FIG. 30, the control unit 500' may electrically connect the sensing circuit units to the plurality of second-a and second-b patterns 102a and 102b and/or the fourth pattern 104 to detect the position of the stylus pen.

Figure 31:
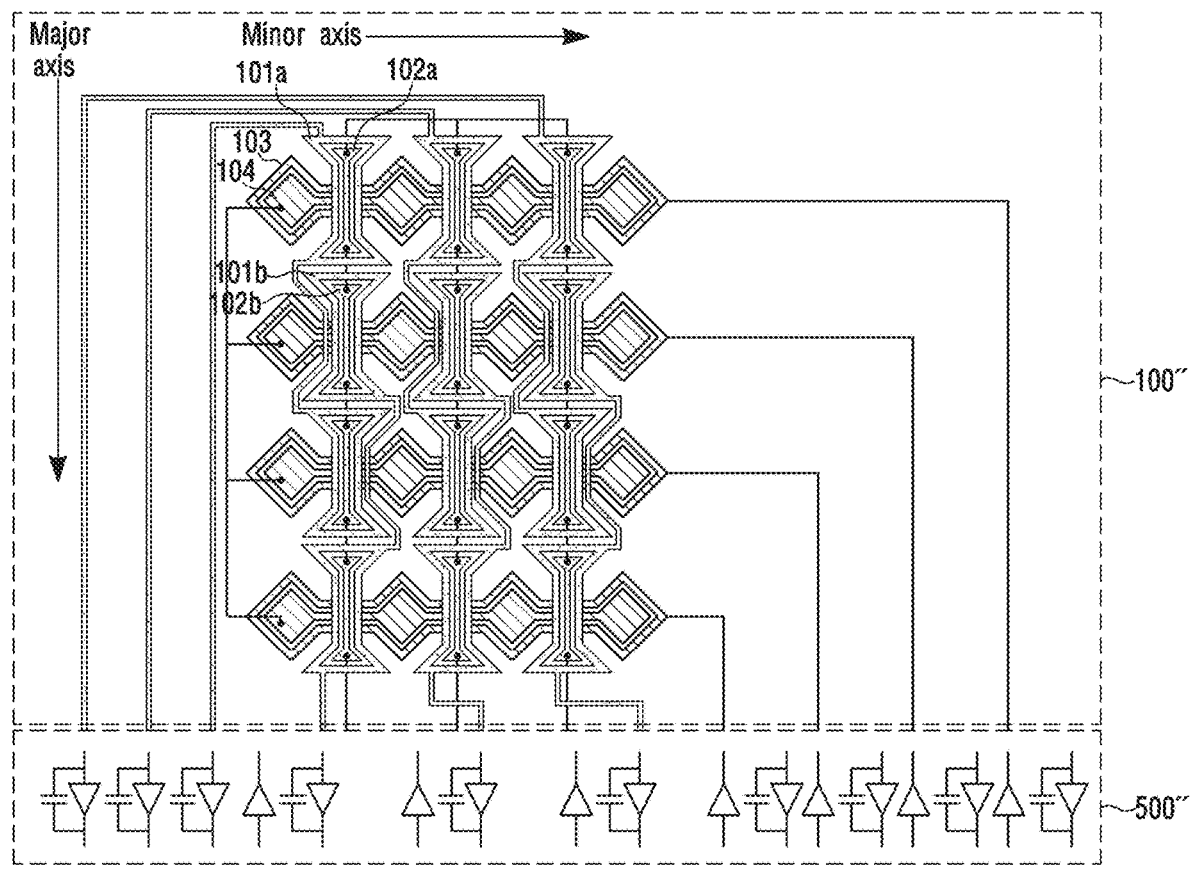
FIG. 31 is a schematic view illustrating a touch input device according to another embodiment of the present invention.

FIG. 31 is a schematic view illustrating a touch input device according to another embodiment of the present invention.

A sensor unit 100" of the touch input device in FIG. 31 has the same structure of the first-a, first-b, second-a, second-b, third, and fourth patterns as the sensor unit 100' in FIG. 27. The sensor unit 100" is different from the sensor unit 100' in that the first-b pattern disposed at one side (lower side) among the plurality of first-b patterns 101*b* electrically connected to each other in the first direction is electrically connected to a control unit 500″, and the first-a pattern disposed at the other side (upper side) among the plurality of first-a patterns 101*a* electrically connected to each other in the first direction is electrically connected to the control unit 500″. Here, the first-b pattern disposed at the other side (upper side) among the plurality of first-b patterns 101*b* electrically connected to each other in the first direction is electrically opened, and the first-a pattern disposed at one side (lower side) among the plurality of first-a patterns 101*a* electrically connected to each other in the first direction is electrically opened.

Figure 32:
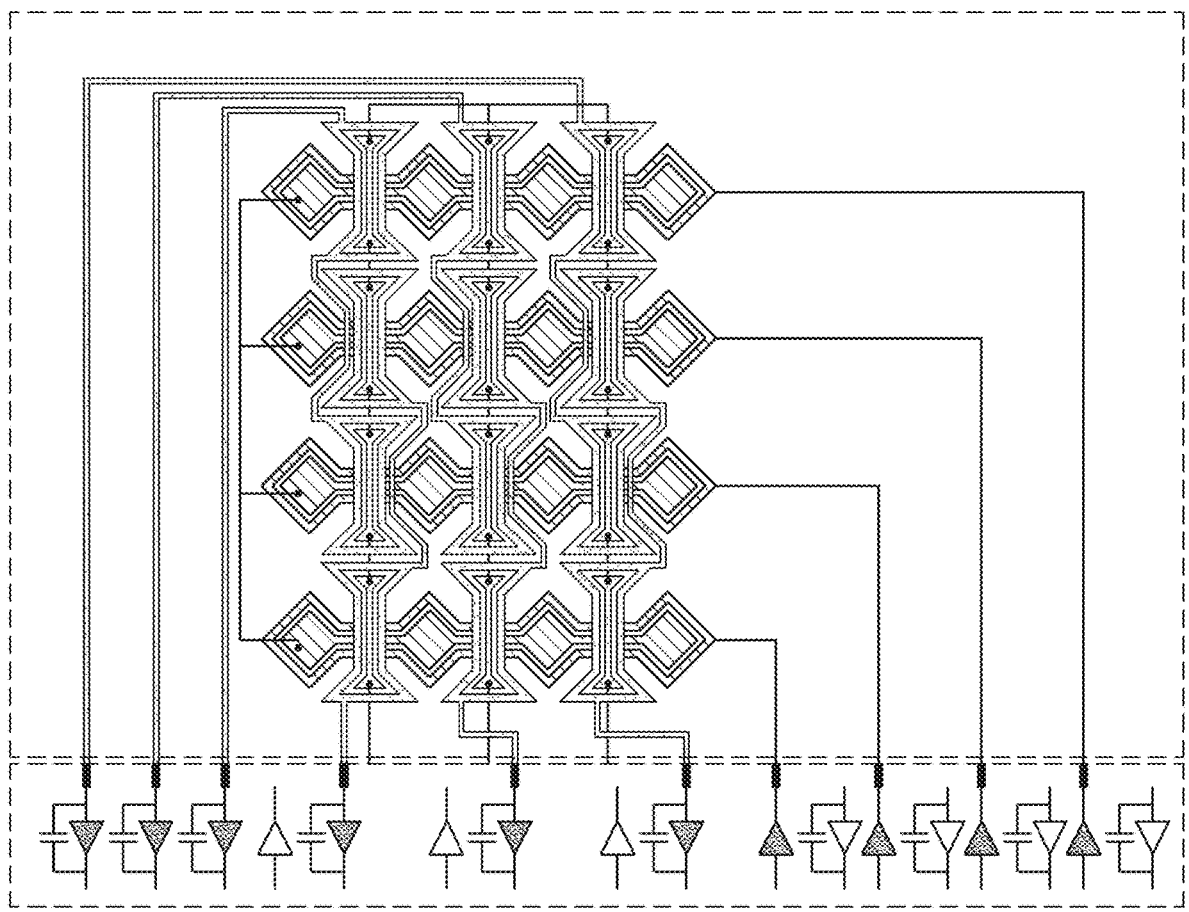
FIG. 32 is a view illustrating a case in which a touch input device in FIG. 31 operates in the touch sensing mode (or 2D sensing mode)

FIG. 32 is a view illustrating a case in which the touch input device illustrated in FIG. 31 operates in the touch sensing mode (or 2D sensing mode).

Since the touch sensing mode is the same as that described in FIG. 28, a description thereof will be omitted.

Figure 33:
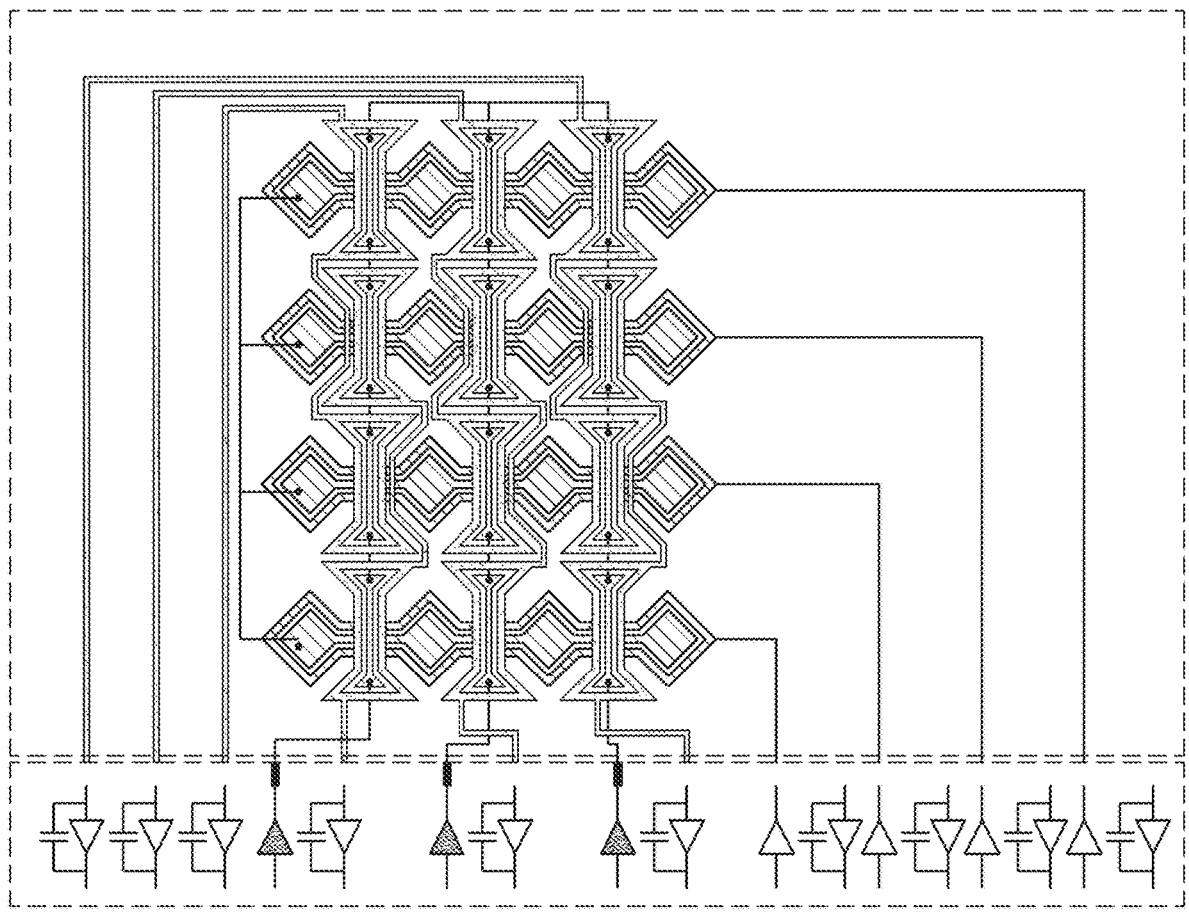
FIG. 33 is a view illustrating a case in which the touch input device in FIG. 31 operates in the antenna driving mode (or stylus driving mode, or stylus uplink mode)

FIG. 33 is a view illustrating a case in which the touch input device illustrated in FIG. 31 operates in the antenna driving mode (or stylus driving mode, or stylus uplink mode).

Since the antenna driving mode is the same as that described in FIG. 29, a description thereof will be omitted.

Figure 34:
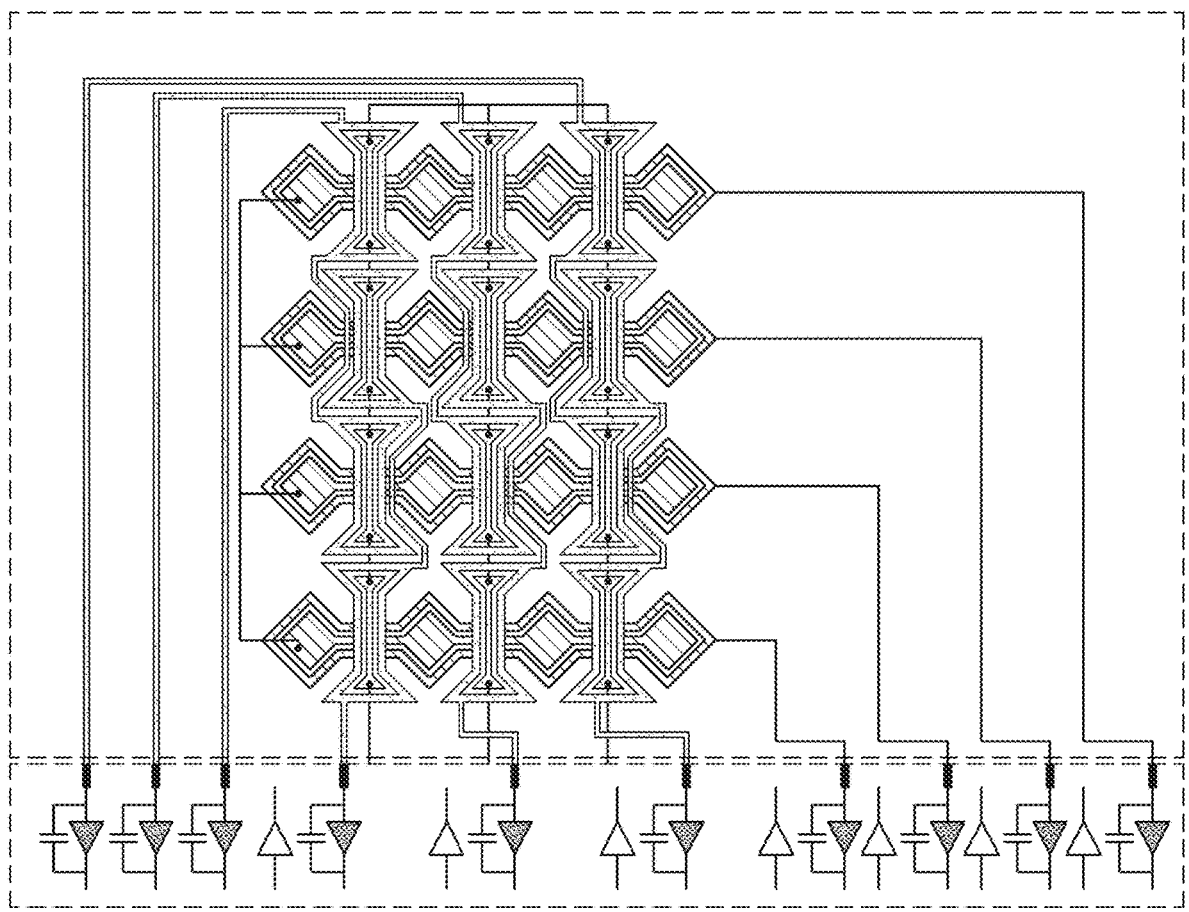
FIG. 34 is a view illustrating a case in which the touch input device in FIG. 31 operates in the stylus sensing mode (or stylus downlink mode)

FIG. 34 is a view illustrating a case in which the touch input device illustrated in FIG. 31 operates in the stylus sensing mode (or stylus downlink mode).

The stylus sensing mode of FIG. 34 is different from that of FIG. 30.

When the stylus pen approaches an arbitrary position on the sensor unit 100″ and then is driven to emit a signal from the stylus pen, a predetermined signal is outputted from the stylus pen, and an induced voltage is generated in the first-a, first-b, second-a, second-b, third, and fourth patterns 101*a*, 101*b*, 102*a*, 102*b*, 103, and 104 by the outputted signal.

Here, when the stylus pen is spaced apart from the control unit 500″, although almost no current flows through the plurality of first-b patterns 101*b* by the generated induced voltage, since current is introduced from the plurality of first-a patterns 101*a* as well as the plurality of second-b patterns 102*b*, the control unit 500″ may detect the position of the stylus pen through the sensing circuit unit electrically connected to the plurality of first-b patterns 101*b*. Here, the feature in which current is introduced from the second-b patterns 102*b* and the first-a patterns 101*a* to the first-b patterns 101*b* is caused by capacitive coupling between the first-b patterns 101*b* and the second-b pattern 102*b* and capacitive coupling between the first-b patterns 101*b* and the first-a pattern 101*a*, which occur by potential differences generated as much as the induced voltage between the first-b patterns 101*b* and the second-b patterns 102*b* and between the first-b patterns 101*b* and the first-a patterns 101*a*.

Here, unlike FIG. 30, a reason why current is introduced from the first-a pattern 101*a* to the first-b pattern 101*b* is that a relatively large amount of current flows through the plurality of first-a patterns 101*a* themselves. This is because a direction of conductive traces connected to the plurality of first-a patterns 101*a* is opposite to that of conductive traces connected to the plurality of first-b patterns 101*b*. In other words, when the stylus pen is spaced apart from the sensing circuit unit connected to the plurality of first-b patterns 101*b*, the stylus pen is disposed closer to the sensing circuit unit connected to the plurality of first-a patterns 101*a*.

Likewise, although almost no current flows through the plurality of third patterns 103 themselves, since current is introduced from the plurality of fourth patterns 104, the control unit 500″ may detect the position of the stylus pen through the sensing circuit unit electrically connected to the third pattern 103.

Although not shown in the drawing, unlike FIG. 34, the control unit 500′ may electrically connect the sensing circuit units to the plurality of second-a patterns 102*a*, the plurality of second-b patterns 102*b*, or the fourth pattern 104 to detect the position of the FIG. 35 is a table showing characteristics of various embodiments illustrated in FIGS. 16, 27, and 31.

Referring to FIG. 35, the embodiment of FIG. 16 may include total 70 to 80 channels. Specifically, a driving electrode TX used in the touch sensing mode may include 20 channels, a receiving electrode RX may include 40 channels, and an antenna driving electrode TX used in the antenna driving mode may include 10 to 20 channels. Here, when the antenna driving mode includes 10 channels, two adjacent channels may be connected in parallel.

Also, the embodiment of FIG. 16 may include 20 left conductive traces and 20 right conductive traces in the second direction (minor axis). Thus, a width of a bezel of the touch input device may be maintained as same as an original width thereof.

The embodiment of FIG. 27 may include total 90 to 100 channels. Specifically, a driving electrode TX used in the touch sensing mode may include 40 channels, a receiving electrode RX may include 40 channels, and an antenna driving electrode TX used in the antenna driving mode may include 10 to 20 channels. Here, when the antenna driving mode includes 10 channels, two adjacent channels may be connected in parallel.

Also, the embodiment of FIG. 27 may include 20 left conductive traces and 20 right conductive traces in the second direction (minor axis). Thus, a width of a bezel of the touch input device may be maintained as same as an original width thereof.

The embodiment of FIG. 31 may include total 90 to 100 channels. Specifically, a driving electrode TX used in the touch sensing mode may include 40 channels, a receiving electrode RX may include 40 channels, and an antenna driving electrode TX used in the antenna driving mode may include 10 to 20 channels. Here, when the antenna driving mode includes 10 channels, two adjacent channels may be connected in parallel.

Also, the embodiment of FIG. 31 may include 30 left conductive traces and 30 right conductive traces in the second direction (minor axis).

Figure 36:
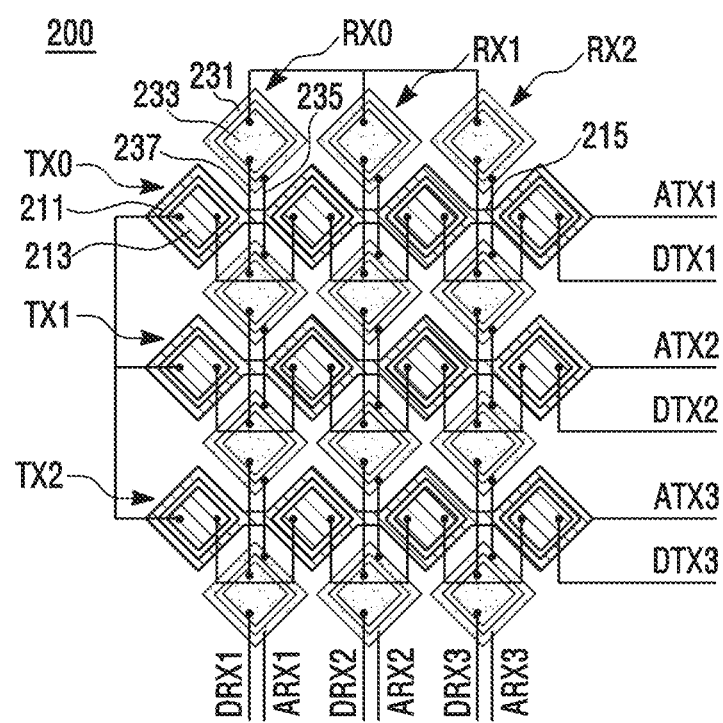
FIG. 36 is a partial plan view of a sensor unit 200 according to another embodiment, which may replace the sensor unit 100 of FIG. 16.

FIG. 36 is a partial plan view of a sensor unit 200 according to another embodiment, which may replace the sensor unit 100 of FIG. 16

Referring to FIG. 36, the sensor unit 200 according to another embodiment of the present invention includes a plurality of first patterns and a plurality of second patterns. Hereinafter, the plurality of first patterns will be described as a plurality of driving electrodes TX0, TX1, TX2, . . . , and the plurality of second patterns will be described as a plurality of receiving electrodes RX0, RX1, RX2, . . . . Alternatively, although not shown in the drawing, the plurality of first electrodes may be a plurality of receiving electrodes RX0, RX1, RX2, . . . , and the plurality of second electrodes may be a plurality of driving electrodes TX0, TX1, TX2, . . . .

The plurality of driving electrodes TX0, TX1, TX2, . . . may have a shape extending in a first direction (or horizontal direction), and the plurality of receiving electrodes RX0, RX1, RX2, . . . may have a shape extending in a second direction (or vertical direction) perpendicular to the first direction.

A predetermined capacitance is formed between the plurality of driving electrodes TX0, TX1, TX2, . . . and the plurality of receiving electrodes RX0, RX1, RX2, . . . , particularly at a crossing portion therebetween. The capacitance is varied when a touch input is generated at a corresponding point or a surrounding thereof. Thus, whether a touch is generated or a touch input may be detected by detecting an amount of a capacitance variation from a signal outputted from the plurality of receiving electrodes RX0, RX1, RX2, . . . .

Each of the plurality of driving electrodes TX0, TX1, TX2, . . . in FIG. 36 includes a first driving pattern part 211, a second driving pattern part 213, and a connection pattern 215. Here, the first driving pattern part 211 may be referred to as a first-1 pattern part, the second drive pattern part 213 may be referred to as a first-2 pattern part, and the connection pattern 215 may be referred to as a connection pattern part.

The first driving pattern part 211 has a diamond shape or a rhombus shape and includes an opening O. The opening O has a diamond shape or a rhombus shape corresponding to an outer shape of the first driving pattern part 211. The first driving pattern part 211 may have a diamond or rhombus band shape by the opening O. Although the first driving pattern part 211 has a diamond or rhombus shape in the drawings, this is merely an example. For example, the first driving pattern part 211 may have a polygonal or rectangular shape.

The second driving pattern part 213 is disposed in the opening O of the first driving pattern part 211.

The second driving pattern part 213 is disposed adjacent to the first driving pattern part 211. The second driving pattern part 213 may have a diamond shape or a rhombus shape. The second driving pattern part 213 may have an outer shape corresponding to that of the first driving pattern part 211. The second driving pattern part 213 may not have an opening therein unlike the first driving pattern part 211.

The first driving pattern part 211 and the second driving pattern part 213 are spaced a predetermined distance from each other.

The first driving pattern part 211 in which the second driving pattern part 213 is disposed is provided in plurality and arranged in the first direction (or horizontal direction). The connection patterns 215 disposed between the plurality of first driving pattern parts 211 electrically connect the plurality of first driving pattern parts 211 to each other.

The connection pattern 215 connects two adjacent first driving pattern parts 211. One end is connected to the first driving pattern part 211 disposed at one side, and the other end is connected to the first driving pattern part 211 disposed at the other side. Although the connection pattern 215 may have a bar shape, the embodiment of the present invention is not limited thereto. For example, the connection pattern 215 may have various shapes connecting two adjacent first driving pattern parts 211.

At least a portion of the plurality of first driving pattern parts 211, at least a portion of the plurality of second driving pattern parts 213, and at least a portion of the plurality of connection patterns 215 are disposed on the same layer. For example, the plurality of first driving pattern parts 211, the plurality of second driving pattern parts 213, and the plurality of connection patterns 215 may be disposed on the same layer. The plurality of first driving pattern parts 211, the plurality of second driving pattern parts 213, and the plurality of connection patterns 215 may be made of the same material. For example, the plurality of first driving pattern parts 211, the plurality of second driving pattern parts 213, and the plurality of connection patterns 215 may be made of a metal mesh. As the metal mesh is patterned according to shapes of the shapes of the plurality of first driving pattern parts 211, the plurality of second driving pattern parts 213, and the plurality of connection patterns 215, the plurality of driving electrodes TX0, TX1, TX2, . . . may be formed.

Although the second driving pattern part 213 is disposed in the opening of the first driving pattern part 211 in FIG. 36, the embodiment of the present invention is not limited thereto. For example, each of the first driving pattern part 211 and the second driving pattern part 213 may have a shape different from the diamond or rhombus shape. The first driving pattern part 211 and the second driving pattern part 213 may be combined with various shapes to form one driving electrode.

The second driving pattern parts 213 of each of the driving electrodes TX0, TX1, and TX2 are electrically connected. For example, the second driving pattern parts 213 of each of the driving electrodes TX0, TX1, and TX2 may be electrically connected through a bridge and a via.

The first driving pattern parts 211 disposed at the other edge among the first driving pattern parts 211 of each of the driving electrodes TX0, TX1, and TX2 are electrically opened, and the second driving pattern parts 213 disposed at the other edge among the second driving pattern parts 213 of each of the driving electrodes TX0, TX1, and TX2 may be electrically connected. For example, the second driving pattern parts 213 of each of the driving electrodes TX0, TX1, and TX2 may be electrically connected through a bridge and a via. Here, the other side represents a farthest side from the control unit 500 of FIG. 16 among the first and second driving pattern parts 211 and 213 of each of the driving electrodes TX0, TX1, and TX2.

Each of the plurality of receiving electrodes RX0, RX1, and RX2 includes a first receiving pattern part 231 and a second pattern part 233. Here, the first driving pattern part 231 may be referred to as a second-1 pattern part, and the second receiving pattern part 233 may be referred to as a second-2 pattern part.

Since the first driving pattern part 231 and the second driving pattern part 233 have the same shape as the first driving pattern part 211 and the second driving pattern part 213, a detailed description thereof will be omitted.

A plurality of first receiving pattern parts 231 are arranged in the second direction (or vertical direction). The plurality of first receiving pattern parts 231 are electrically connected to each other. For example, the plurality of first receiving pattern parts 231 are electrically connected through a bridge or a via.

A plurality of second receiving pattern parts 233 are arranged in the first receiving pattern parts 231, respectively, in the second direction (or vertical direction). The plurality of second receiving pattern parts 233 are electrically connected to each other. For example, the plurality of second receiving pattern parts 233 are electrically connected through a bridge or a via.

The first receiving pattern parts 231 disposed at the other edge among the first receiving pattern parts 231 of each of the receiving electrodes RX0, RX1, and RX2 are electrically opened, and the second receiving pattern parts 233 disposed at the other edge among the second receiving pattern parts 233 of each of the receiving electrodes RX0, RX1, and RX2 may be electrically connected. For example, the plurality of second receiving pattern parts 233 are electrically connected through a bridge or a via. Here, the other side represents a farthest side from the control unit 500 of FIG. 16 among the first and second receiving pattern parts 231 and 233 of each of the receiving electrodes RX0, RX1, and RX2.

At least a portion of the plurality of first receiving pattern parts 231 and at least a portion of the plurality of second receiving pattern parts 233 are disposed on the same layer. For example, the plurality of first receiving pattern parts 231 and the plurality of second receiving pattern parts 233 may be disposed on the same layer. Here, the plurality of first receiving pattern parts 231 and the plurality of second receiving pattern parts 233 may be disposed on the same layer with the plurality of first driving pattern parts 211, the plurality of second driving pattern parts 213, and the plurality of connection patterns 215.

The plurality of first receiving pattern parts 231 and the plurality of second receiving pattern parts 233 may be made of the same material. For example, the plurality of first receiving pattern parts 231 and the plurality of second receiving pattern parts 233 may be made of a metal mesh. As the metal mesh is patterned according to shapes of the plurality of first receiving pattern parts 231 and the plurality of second receiving pattern parts 233, the plurality of receiving electrodes RX0, RX1, and RX2 may be formed.

Bridges for electrically connecting the second driving pattern parts 213 of each of the driving electrodes TX0, TX1, and TX2 and bridges for electrically connecting the first and second receiving pattern parts 231 and 233 of each of the receiving electrodes RX0, RX1, and RX2 may be formed on a layer different from that on which the first and second driving pattern parts 211 and 213, the connection pattern 215, and the first and second receiving pattern parts 231 and 233 are formed.

As illustrated in FIGS. 17 to 21, the sensor unit 200 in FIG. 36 may be driven in one of the touch sensing mode, the antenna driving mode, and the stylus sensing mode by the control unit 500. Specifically, in case of the touch sensing mode, the control unit 500 may control the touch driving signal to be applied to at least one of ATX1, ATX2, and ATX3 and sense a touch position by receiving a touch reception signal from at least one of ARX1, ARX2, and ARX3. In case of the antenna driving mode, the control unit 500 may apply the pen driving signal to at least one of DTX1, DTX2, and DTX3 or at least one of DRX1, DRX2, and DRX3. In case of the stylus sensing mode, the control unit 500 may sense the position of the stylus pen by receiving the pen reception signal from at least one of ATX1, ATX2, and ATX3 and at least one of ARX1, ARX2, and ARX3. Also, the various combinations of the <table 2> may be applied to the sensor unit 200 of FIG. 36. Thus, the sensor unit 200 of FIG. 36 may be driven in one of the touch sensing mode, the antenna driving mode, and the stylus sensing mode through various methods by the control unit 500.

Figure 37:
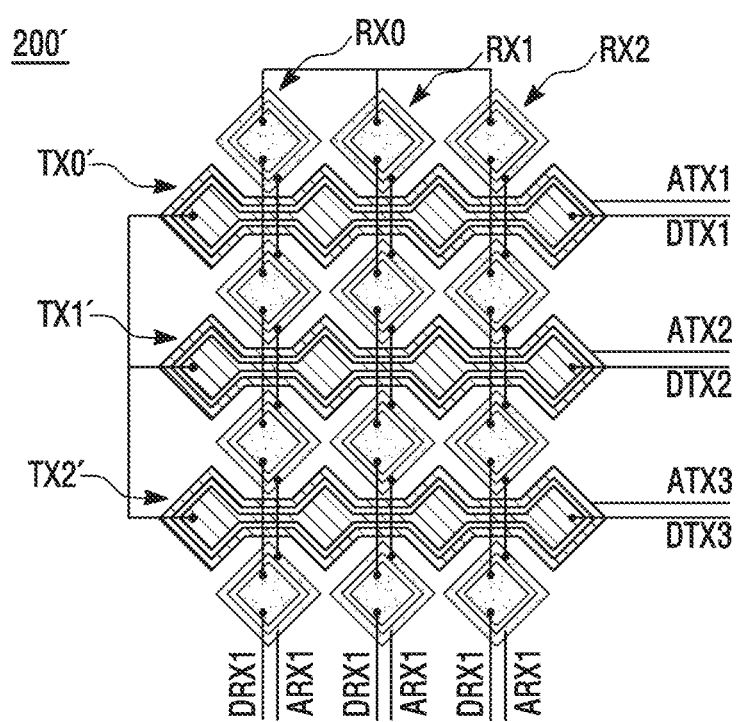
FIG. 37 is a partial plan view of a sensor unit 200' according to another embodiment, which may replace the sensor unit 100 of FIG. 16.

FIG. 37 is a partial plan view of a sensor unit 200' according to another embodiment, which may replace the sensor unit 100 of FIG. 16

The sensor unit 200' of FIG. 37 includes a plurality of driving electrodes TX0', TX1', TX2', . . . and a plurality of receiving electrodes RX0, RX1, RX2, . . . . Here, the plurality of receiving electrodes RX0, RX1, RX2, . . . are the same as the plurality of reception electrodes RX0, RX1, RX2, . . . in FIG. 36, and the plurality of driving electrodes TX0', TX1', TX2', . . . are the same as the third and the fourth patterns 103 and 104 in FIG. 16. Although not shown in the drawings, the opposite case may be true.

Each of the plurality of driving electrodes TX0', TX1', TX2', . . . may include a plurality of first driving pattern parts and a plurality of second driving pattern parts arranged in the horizontal direction, a first connection pattern part connecting two adjacent pattern parts of the plurality of first driving pattern parts, and a second connection pattern part connecting two adjacent pattern parts of the plurality of second driving pattern parts. One second connection pattern part may be disposed between two adjacent first connection pattern parts in the vertical direction.

The sensor unit 200' of FIG. 37 may further reduce the number of bridges and vias in comparison with the sensor unit 200 of FIG. 36. This is due to shapes of the plurality of driving electrodes TX0', TX1', TX2', . . . .

As illustrated in FIGS. 17 to 21, the sensor unit 200' in FIG. 37 may be driven in one of the touch sensing mode, the antenna driving mode, and the stylus sensing mode by the control unit 500. Specifically, in case of the touch sensing mode, the control unit 500 may control the touch driving signal to be applied to ATX1, ATX2, and ATX3 and sense a touch position by receiving a touch receiving signal from ARX1, ARX2, and ARX3. In case of the antenna driving mode, the control unit 500 may apply the pen driving signal to DTX1, DTX2, and DTX3 or DRX1, DRX2, and DRX3. In case of the stylus sensing mode, the control unit 500 may sense the position of the stylus pen by receiving the pen receiving signal from ATX1, ATX2, and ATX3 and ARX1, ARX2, and ARX3. Also, the various combinations of the <table 2> may be applied to the sensor unit 200' of FIG. 37. Thus, the sensor unit 200' of FIG. 37 may be driven in one of the touch sensing mode, the antenna driving mode, and the stylus sensing mode through various methods by the control unit 500.

Figure 38:
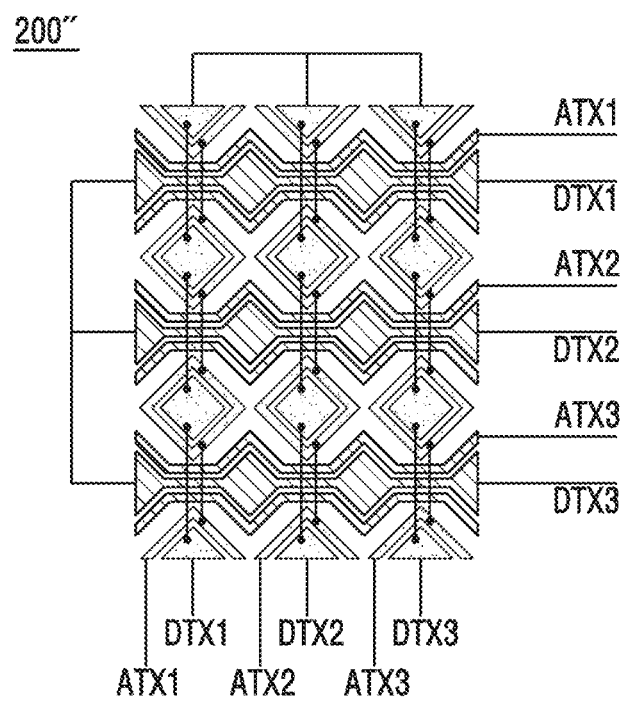
FIG. 38 is a modified example of the sensor unit in FIG. 37.

FIG. 38 is a modified example of the sensor unit in FIG. 37.

Referring to FIG. 38, in a sensor unit 200", first-1 pattern parts disposed on a first end and/or a second end of the plurality of first-1 pattern parts have a shape opened in the first direction (or horizontal direction). Thus, the first-2 pattern parts disposed on a first end and/or a second end of the plurality of first-2 pattern parts may be exposed to the outside.

The first-2 pattern parts disposed on the second side end of the plurality of first-2 pattern parts are electrically connected to each other through the connection pattern without the via. Here, the connection pattern may be a conductive trace. When compared with FIG. 37, the first-2 pattern parts disposed on the second end of the plurality of first-2 pattern parts may be disposed on the same layer as the connection pattern instead of being connected through the via.

Also, in the sensor unit 200", second-1 pattern parts disposed on a first end and/or a second end of the plurality of second-1 pattern parts have a shape opened in the second direction (or vertical direction). Thus, second-2 pattern parts disposed on a first end and/or a second end of the plurality of second-2 pattern parts may be exposed to the outside.

The second-2 pattern parts disposed on the second end of the plurality of second-2 pattern parts are electrically connected to each other through the connection pattern without the via. Here, the connection pattern may be a conductive trace. When compared with FIG. 37, the second-2 pattern parts disposed on the second end of the plurality of second-2 pattern parts may be disposed on the same layer as the connection pattern instead of being connected through the via.

The modified example in FIG. 38 may be directly applied to the sensor unit in FIG. 36.

As illustrated in FIGS. 17 to 21, the sensor unit 200" in FIG. 38 may be driven in one of the touch sensing mode, the antenna driving mode, and the stylus sensing mode by the control unit 500. Specifically, in case of the touch sensing mode, the control unit 500 may control the touch driving signal to be applied to ATX1, ATX2, and ATX3 and sense a touch position by receiving the touch receiving signal from ARX1, ARX2, and ARX3. In case of the antenna driving mode, the control unit 500 may apply the pen driving signal to DTX1, DTX2, and DTX3 or DRX1, DRX2, and DRX3. In case of the stylus sensing mode, the control unit 500 may sense the position of the stylus pen by receiving the pen receiving signal from ATX1, ATX2, and ATX3 and ARX1, ARX2, and ARX3. Also, the various combinations of the <table 2> may be applied to the sensor unit 200" of FIG. 38. Thus, the sensor unit 200" of FIG. 38 may be driven in one of the touch sensing mode, the antenna driving mode, and the stylus sensing mode through various methods by the control unit 500.

Figure 39:
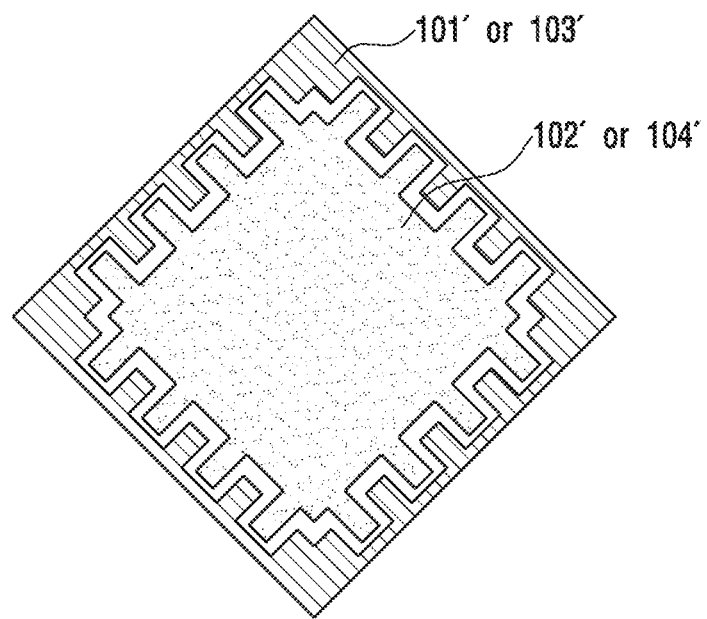
FIG. 39 is a view illustrating another modified example of the sensor unit 100 in FIG. 16.

FIG. 39 is a view illustrating another modified example of the sensor unit 100 in FIG. 16.

Referring to FIG. 39, a structure of a main pattern part of each of first to fourth pattern parts 101', 102', 103', and 104' is different from those of FIG. 16.

In FIG. 39, the second pattern part 102' or the fourth pattern part 104' has an external shape of an uneven structure, and an opening of the first pattern part 101' or the fourth pattern part 104' has a shape corresponding to the external structure of the second pattern part 102' or the fourth pattern part 104'.

This structure may improve a value of a mutual capacitance Cm between the first pattern part 101' and the second pattern part 102' at the same layer and a value of a mutual capacitance Cm between the third pattern part 103' and the fourth pattern part 104' at another same layer. As the mutual capacitance Cm is improved, a voltage value outputted from the sensing circuit unit of the control unit 500 in the stylus sensing mode may increase. Thus, stylus sensing sensitivity may be improved.

Here, the modified example in FIG. 39 may be directly applied to the sensor units according to the above-described various embodiments.

Figure 40:
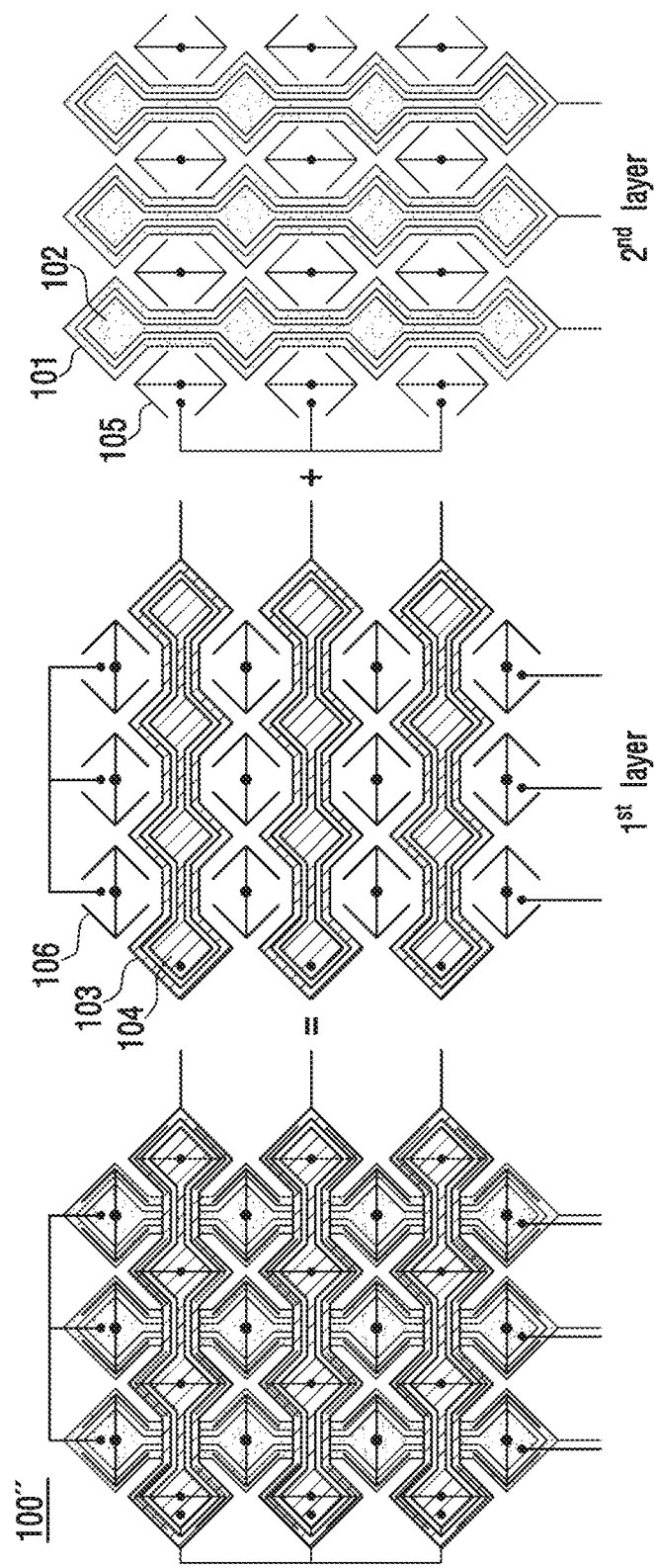
FIG. 40 is a view illustrating another modified example of the sensor unit 100 in FIG. 16.

FIG. 40 is a view illustrating another modified example of the sensor unit 100 in FIG. 16.

When compared with the sensor unit 100 in FIG. 16, a sensor unit 100" in FIG. further includes a plurality of fifth patterns 105 and a plurality of sixth patterns 106.

The plurality of fifth patterns 105 are disposed on the same layer (2nd layer) as the plurality of first patterns 101 and arranged in the first direction and the second direction.

Each of the fifth patterns 105 has a shape corresponding to and overlapping a portion of a main pattern part of the third pattern 103 disposed on another layer (1st layer). Also, the fifth pattern 105 is electrically connected through the via and the fourth pattern 104 disposed on another layer (1st layer).

The plurality of fifth patterns 105 may form the mutual capacitance Cm in the vertical direction with the plurality of third patterns 103. Also, since the fifth pattern 105 is electrically connected to the fourth pattern 104 in the third pattern 103, the third pattern 103 may form the mutual capacitance Cm with the fifth pattern 105 in addition to the fourth pattern 104.

The plurality of sixth patterns 106 are disposed on the same layer (1st layer) as the plurality of third patterns 103 and arranged in the first direction and the second direction.

Each of the sixth patterns 106 has a shape corresponding to and overlapping a portion of the main pattern part of the first pattern 101 disposed on another layer (2nd layer). Also, the sixth pattern 106 is electrically connected through the via and the second pattern 102 disposed on another layer (2nd layer).

The plurality of sixth patterns 106 may form the mutual capacitance Cm in the vertical direction with the plurality of first patterns 101. Also, since the sixth pattern 106 is electrically connected to the second pattern 102 in the first pattern 101, the first pattern 101 may form the mutual capacitance Cm with the sixth pattern 106 in addition to the second pattern 102.

As described above, the sensor unit 100" in FIG. 40 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 500 may increase to improve the stylus sensing sensitivity.

Here, the modified example in FIG. 40 may be directly applied to the sensor units according to the above-described various embodiments.

Figure 41:
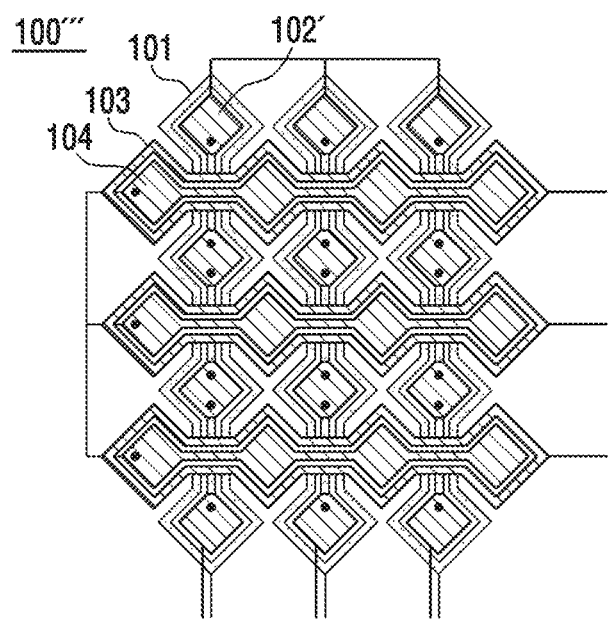
FIG. 41 is a view illustrating another modified example of the sensor unit 100 in FIG. 16.

FIG. 41 is a view illustrating another modified example of the sensor unit 100 in FIG. 16.

When compared with the sensor unit 100 in FIG. 16, in a sensor unit 100'" in FIG. 41, a portion of a second pattern 102' is disposed on a different layer from the rest portion. Specifically, the second pattern 102' includes a plurality of main pattern parts and a connection pattern part connecting two adjacent main pattern parts of the plurality of main pattern parts, and the plurality of main pattern parts of the second pattern 102' are disposed on a different layer from the plurality of connection pattern parts of the second pattern 102'.

The plurality of main pattern parts of the second pattern 102' are disposed on the same layer as the third pattern 103 and the fourth pattern 104, and the plurality of connection pattern parts of the second pattern 102' are disposed on the same layer as the first pattern 100 as with FIG. 16.

The sensor unit 100'" in FIG. 41 may be driven in the touch sensing mode, the antenna driving mode, and the stylus sensing mode by the control unit 500 as with the sensor unit 100 in FIG. 16. Also, the various combinations of the <table 2> may be applied to the sensor unit 100'" of FIG. 41. Thus, the sensor unit 100'" of FIG. 41 may be driven in one of the touch sensing mode, the antenna driving mode, and the stylus sensing mode through various methods by the control unit 500.

Figure 42:
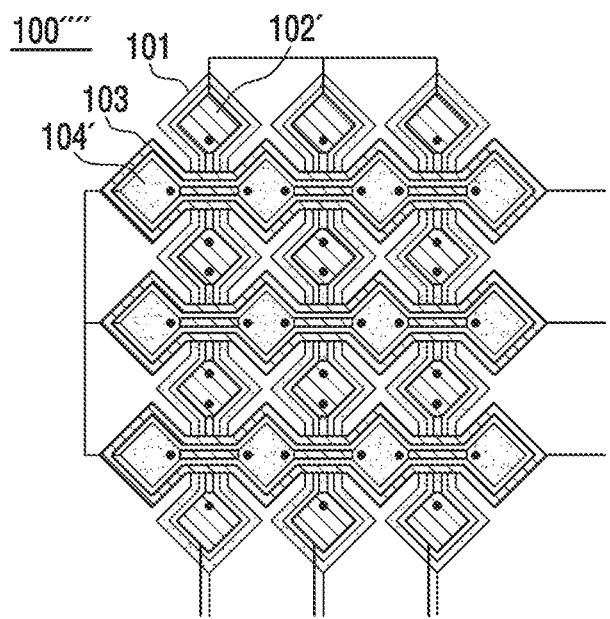
FIG. 42 is a view illustrating another modified example of the sensor unit 100 in FIG. 16.

FIG. 42 is a view illustrating another modified example of the sensor unit 100 in FIG. 16.

When compared with the sensor unit 100'" in FIG. 41, in a sensor unit 100'''' in FIG. 42, a portion of a fourth pattern 104' is disposed on a different layer from the rest portion. Specifically, the fourth pattern 104' includes a plurality of main pattern parts and a connection pattern part connecting two adjacent main pattern parts of the plurality of main pattern parts, and the plurality of main pattern parts of the fourth pattern 104' are disposed on a different layer from the plurality of connection pattern parts of the fourth pattern 104'. The plurality of main pattern parts of the fourth pattern 104' are disposed on the same layer as the first pattern 101, and the plurality of connection pattern parts of the fourth pattern 104' are disposed on the same layer as the plurality of main pattern parts of the second pattern 102' and the third pattern 103.

In summary, in the sensor unit 100'''' in FIG. 42, the first pattern 101, the plurality of connection pattern part of the second pattern 102, and the plurality of main pattern parts of the fourth pattern 104' are disposed on the first layer, and the third pattern 103, the plurality of connection pattern part of the fourth pattern 104', and the plurality of main pattern part of the second pattern 102' are disposed on the second layer. Here, the first layer and the second layer are different from each other, and a position relationship is that one is disposed on the other.

The sensor unit 100''' in FIG. 42 may be driven in the touch sensing mode, the antenna driving mode, and the stylus sensing mode by the control unit 500 as with the sensor unit 100 in FIG. 16. Also, the various combinations of the <table 2> may be applied to the sensor unit 100''' of FIG. 42. Thus, the sensor unit 100''' of FIG. 42 may be driven in one of the touch sensing mode, the antenna driving mode, and the stylus sensing mode through various methods by the control unit 500.

Figure 43:
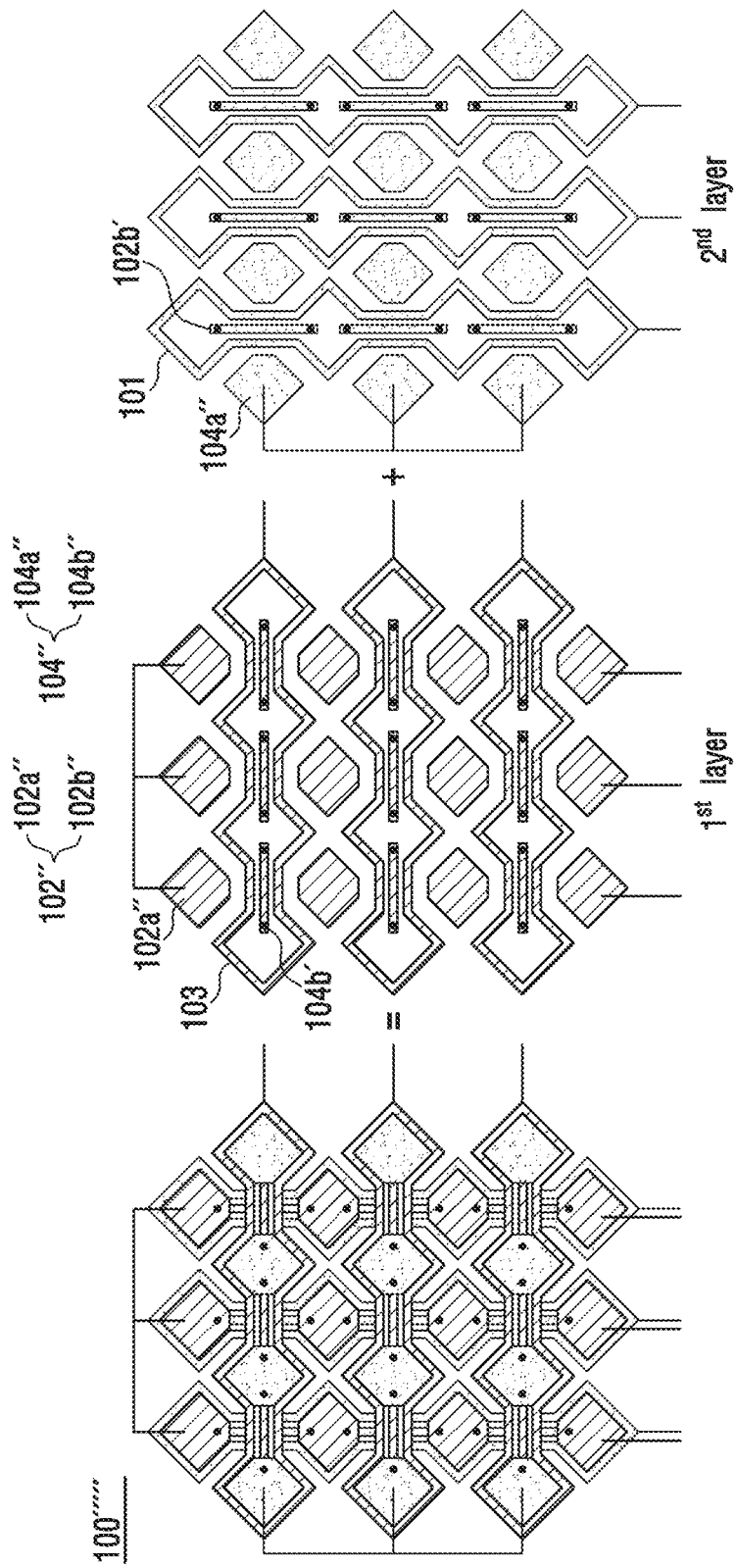
FIG. 43 is a view illustrating another modified example of the sensor unit 100 in FIG. 16.

FIG. 43 is a view illustrating another modified example of the sensor unit 100 in FIG. 16.

A sensor unit 100'''' in FIG. 43 is a modified from the sensor unit 100''' in FIG. 42. When compared with the sensor unit 100''' in FIG. 42, the sensor unit 100'''' in FIG. 43 is different in a second pattern 102'' and a fourth pattern 104''.

Specifically, the second pattern 102'' includes a plurality of main pattern parts 102e and a plurality of connection pattern parts 102b'', and the main pattern part 102a'' has a size greater than that of the main pattern part of the second pattern 102' of the sensor unit 100''' in FIG. 42. The main pattern part 102a'' may have a size and a shape corresponding to those of the main pattern part of the first pattern 101.

Also, the fourth pattern 104'' includes a plurality of main pattern parts 104a'' and a plurality of connection pattern parts 104b'', and the main pattern part 104e has a size greater than that of the main pattern part of the fourth pattern 104' of the sensor unit 100''' in FIG. 42. The main pattern part 104a'' may have a size and a shape corresponding to those of the main pattern part of the third pattern 103.

Since the main pattern part 102e of the second pattern 102'' has a size greater than that of the main pattern part of the second pattern 102' in FIG. 42, an area corresponding to the first pattern 101 may increase to further improve the mutual capacitance Cm between the second pattern 102'' and the first pattern 101. Thus, the stylus sensing sensitivity may be further improved in the stylus sensing mode.

Since the main pattern part 104e of the fourth pattern 104'' has a size greater than that of the main pattern part of the fourth pattern 104' in FIG. 42, an area corresponding to the third pattern 103 may increase to further improve the mutual capacitance Cm between the fourth pattern 104'' and the third pattern 103. Thus, the stylus sensing sensitivity may be further improved in the stylus sensing mode.

Figure 44:
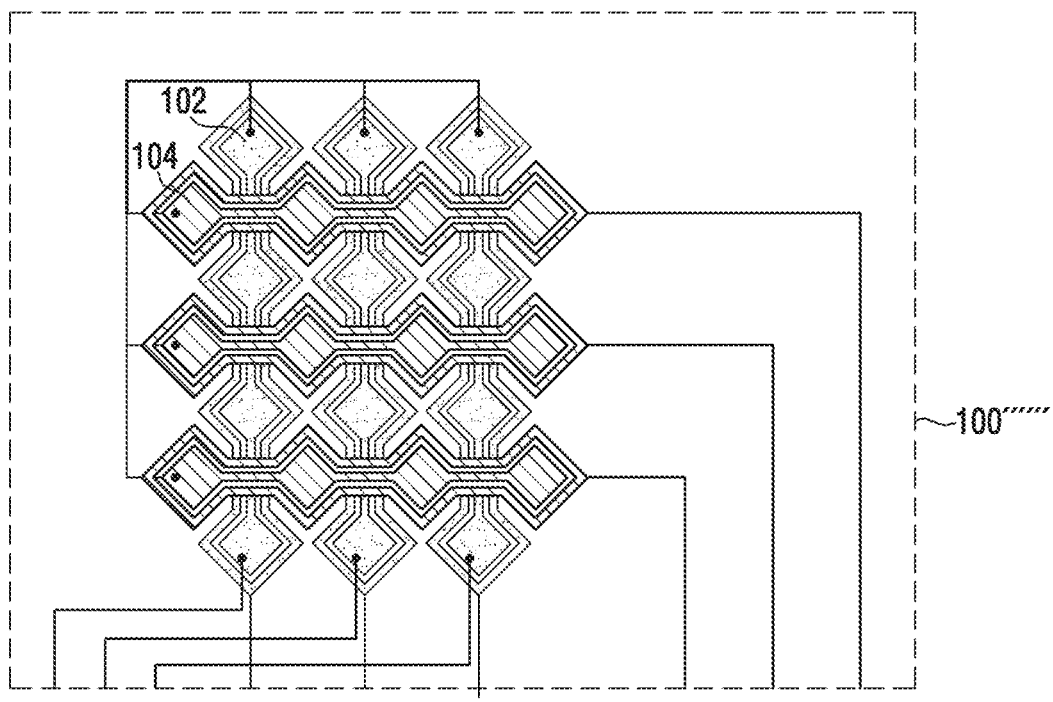
FIG. 44 is a view illustrating another modified example of the sensor unit 100 in FIG. 16.

FIG. 44 is a view illustrating another modified example of the sensor unit 100 in FIG. 16.

When compared with the sensor unit 100 in FIG. 16, a sensor unit'''' in FIG. 44 is different in that the other ends of the plurality of second patterns 102 are electrically connected to the other ends of the plurality of fourth patterns 104.

This configuration has an advantage of reducing an impedance because the plurality of second patterns 102 as well as other fourth patterns are electrically connected to one fourth pattern 104 when the sensor unit 100' is driven in the stylus sensing mode.

The sensor unit 100''''' in FIG. 44 may be driven in the touch sensing mode, the antenna driving mode, and the stylus sensing mode by the control unit 500 as with the sensor unit 100 in FIG. 16. Also, the various combinations of the <table 2> may be applied to the sensor unit 100'' of FIG. 44. Thus, the sensor unit 100''''' of FIG. 44 may be driven in one of the touch sensing mode, the antenna driving mode, and the stylus sensing mode through various methods by the control unit 500.

Figure 45:
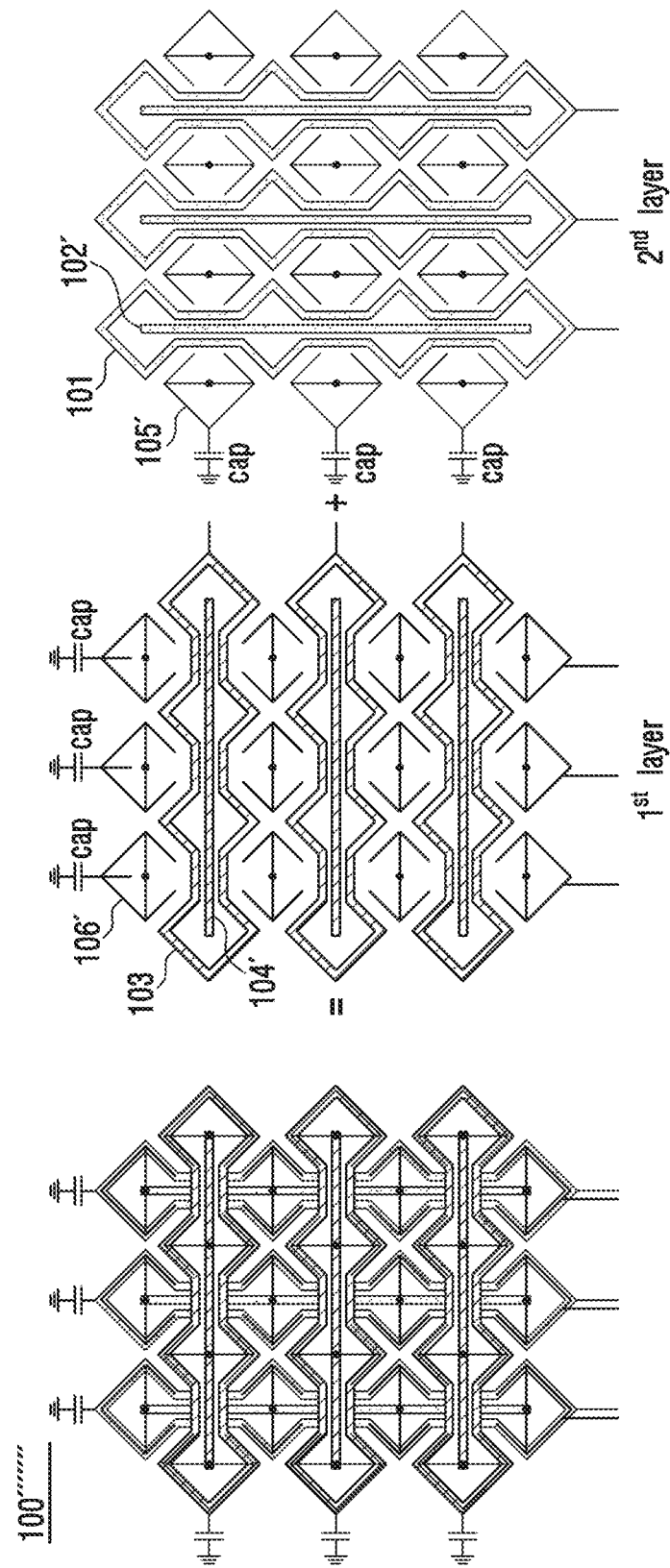
FIG. 45 is a view illustrating another modified example of the sensor unit 100 in FIG. 16.

FIG. 45 is a view illustrating another modified example of the sensor unit 100 in FIG. 16.

When compared with the sensor unit 100 in FIG. 16, a sensor unit 100'''''' in FIG. 45 is different in a second pattern 102' and a fourth pattern 104' and further includes a plurality of fifth patterns 105', a plurality of sixth patterns 106', and a capacitor cap electrically connected to the fifth patterns 105' and the sixth patterns 106'. Since the rest components are the same as each other, different portions will be described in detail below.

The second pattern 102' may be a bar pattern disposed in the first pattern 101 and extending in the second direction. Here, the second pattern 102' may have a constant width. The second pattern 102' is disposed on the same layer (2nd layer) as the first pattern 101.

The fourth pattern 104' may be a bar pattern disposed in the third pattern 103 and extending in the first direction. Here, the fourth pattern 104' may have a constant width. The fourth pattern 104' is disposed on the same layer (1st layer) as the third pattern 103.

The plurality of fifth patterns 105' are disposed on the same layer (2nd layer) as the plurality of first patterns 101 and arranged in the first direction and the second direction. The plurality of fifth patterns 105' may be arranged between the plurality of first patterns 101.

Each of the fifth patterns 105' has a shape corresponding to and overlapping a main pattern part of the third pattern 103 disposed on another layer (1st layer). Also, the fifth pattern 105' is electrically connected through the via and the fourth pattern 104' disposed on another layer (1st layer).

The fifth patterns 105' electrically connected to one fourth pattern 104' among the plurality of fifth patterns 105' are arranged in the second direction. Here, a predetermined capacitor cap is connected to the fifth pattern 105' disposed at the other edge among the fifth patterns 105' arranged in the second direction. Also, the capacitor cap may be grounded. Here, the fifth pattern 105' disposed at the other edge among the fifth patterns 105' arranged in the second direction represents a pattern electrically connected to and spaced farthest from the control unit 500 in FIG. 16 Although not shown in the drawing, the capacitor cap may be connected between the fifth pattern 105' and ELVSS of a display panel (not shown). Also, the capacitor cap may have one end connected to the fifth pattern 105' and the other end connected to another layer (1st layer) on which the third pattern 103, the fourth pattern 104', and the sixth pattern 106' are disposed.

The plurality of fifth patterns 105' may form the mutual capacitance Cm in the vertical direction with the plurality of third patterns 103. Also, since the fifth pattern 105' is electrically connected to the fourth pattern 104' in the third pattern 103, the third pattern 103 may form the mutual capacitance Cm with the fifth pattern 105' in addition to the fourth pattern 104'.

The plurality of sixth patterns 106' are disposed on the same layer (1st layer) as the plurality of third patterns 103 and arranged in the first direction and the second direction. The plurality of sixth patterns 106' may be arranged between the plurality of third patterns 103.

Each of the sixth patterns 106 has a shape corresponding to and overlapping the main pattern part of the first pattern 101 disposed on another layer (2nd layer). Also, the sixth pattern 106' is electrically connected through the via and the second pattern 102' disposed on another layer (2nd layer).

The sixth patterns 106' electrically connected to one second pattern 102' among the plurality of sixth patterns 106' are arranged in the first direction. Here, a predetermined capacitor cap is connected to the sixth pattern 106' disposed at the other edge among the sixth patterns 106' arranged in the first direction. Also, the capacitor cap may be grounded. Here, the sixth pattern 106' disposed at the other edge among the sixth patterns 106' arranged in the first direction represents a pattern electrically connected to and spaced farthest from the control unit 500 in FIG. 16 Although not shown in the drawing, the capacitor cap may be connected between the sixth pattern 106' and the ELVSS of the display panel (not shown). Also, the capacitor cap may have one end connected to the sixth pattern 106' and the other end connected to another layer (2nd layer) on which the third pattern 101, the second pattern 102', and the fifth pattern 105' are disposed.

The plurality of sixth patterns 106' may form the mutual capacitance Cm in the vertical direction with the plurality of first patterns 101. Also, since the sixth pattern 106' is electrically connected to the second pattern 102' in the first pattern 101, the first pattern 101 may form the mutual capacitance Cm with the sixth pattern 106' in addition to the second pattern 102'.

As described above, the sensor unit 100'''''' in FIG. 45 may form the mutual capacitance in the vertical direction as well as the horizontal direction of the first pattern 101 and the mutual capacitance in the vertical direction as well as the horizontal direction of the third pattern 103. Thus, in the stylus sensing mode, the voltage value outputted from the sensing circuit unit of the control unit 500 may increase to improve the stylus sensing sensitivity.

Since each of the second pattern 102' and the fourth pattern 104' does not have a diamond-shaped main pattern part unlike the second pattern 102 and the fourth pattern 104 of the sensor unit 100 of FIG. 16, when the display panel is disposed below the sensor unit 100''''', visibility may be further improved in comparison with the sensor unit 100 of FIG. 16.

The sensor unit 100''' in FIG. 45 may be also driven in the touch sensing mode, the antenna driving mode, and the stylus sensing mode by the control unit 500 as with the sensor unit 100 in FIG. 16. Also, the various combinations of the <table 2> may be applied to the sensor unit 100'''''' of FIG. 45. Thus, the sensor unit 100'''' of FIG. 45 may be driven in one of the touch sensing mode, the antenna driving mode, and the stylus sensing mode through various methods by the control unit 500.

Although not shown in the drawing, the capacitor cap may be electrically connected to the other ends of the plurality of second and fourth patterns 102 and 104 without the fifth and sixth patterns 105' and 106'. Furthermore, in the sensor units according to the above-described various embodiments, the other ends (the plurality of second driving pattern parts 213 and the second receiving pattern parts 233 in FIGS. 36 and 37) of the plurality of second and fourth patterns may be connected to the capacitor instead of being connected to each other.

Figure 46:
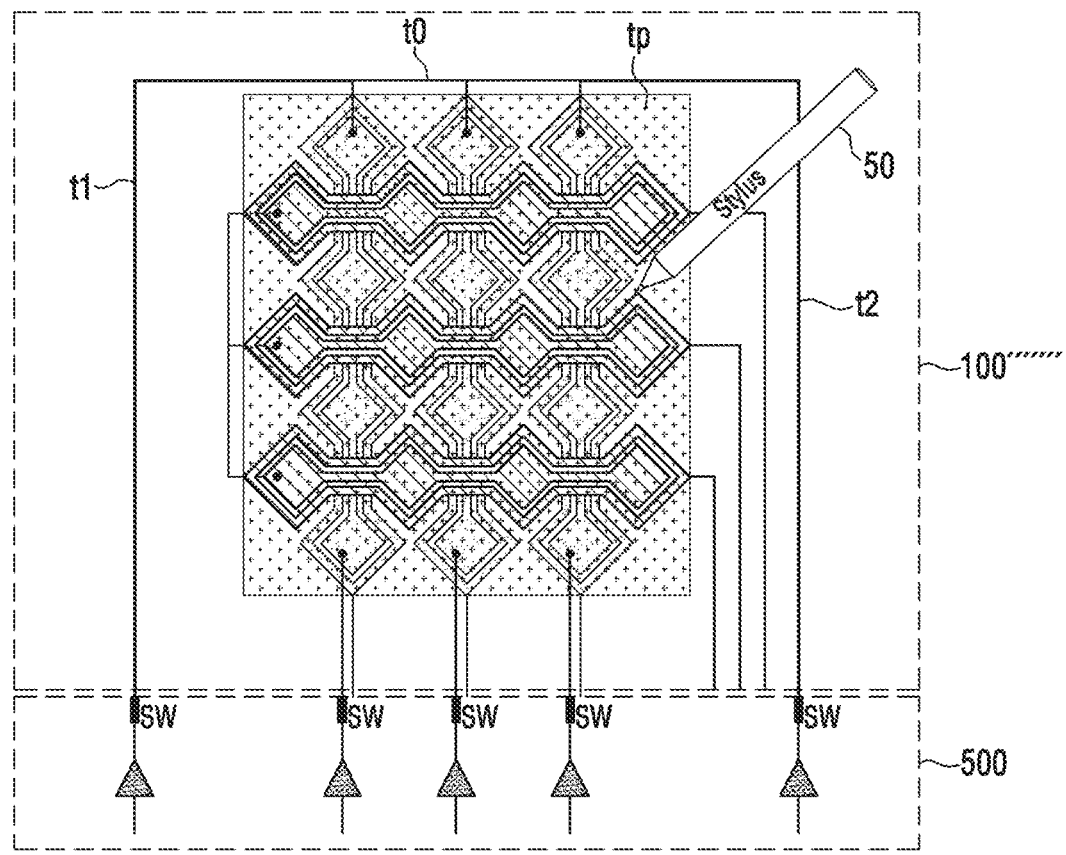
FIG. 46 is a view illustrating another modified example of the sensor unit 100 in FIG. 16.

FIG. 46 is a view illustrating another modified example of the sensor unit 100 in FIG. 16.

In case of the sensor unit 100 of FIG. 16, when the stylus pen 50 is disposed on a right edge (or left edge) of the sensor unit 100, the stylus pen 50 may not provide a sufficient magnetic field, and a magnitude of a signal emitted from the stylus pen 50 is not large enough. In order to solve the above-described problem, a sensor unit 100" in FIG. 46 further includes a first trace t1 and a second trace t2 in addition to the sensor unit 100 in FIG. 16.

The first trace t1 and the second trace t2 are directly connected to a conductive trace t0 electrically connecting the other end of the plurality of second patterns 102 to each other and disposed on a non-active area outside an active area tp (or touch area) of the touch input device. Here, at least a portion of the conductive trace t0 may be disposed outside the active area tp. The active area tp represents an area that is directly touched by an object, e.g., a finger or the stylus pen 50, and the non-active area is disposed around the active area tp. The non-active area may be, e.g., a bezel area.

Specifically, the first trace t1 may be disposed on the non-active area outside the active area tp and have one end directly connected to the conductive trace t0 and the other end connected to the driving circuit unit of the control unit 500 through a switch sw in one of the touch driving mode, the touch sensing mode, the antenna driving mode, and the stylus sensing mode.

The second trace t2 may be disposed on the non-active area outside the active area tp and have one end directly connected to the conductive trace t0 and the other end connected to the driving circuit unit of the control unit 500 through a switch sw in the antenna driving mode.

The first trace t1 may be disposed on the non-active area while surrounding one side of both left and right sides of the active area tp, and the second trace t2 may be disposed on the non-active area while surrounding the other side of the active area tp.

Although the stylus pen 50 is disposed at one edge of the active area tp when the first trace t1, the second trace t2, and the sensor unit 100" are driven in the antenna driving mode as with FIG. 18, the stylus pen may provide a sufficient magnetic field signal. Thus, in the touch input device including the sensor unit 100"" in FIG. 46, the stylus pen 50 may receive a sufficient magnetic field signal and emit a sufficient signal although the stylus pen 50 is disposed on any portion of the active area tp.

Each of the first and second traces t1 and t2 of the sensor unit 100" in FIG. 46 may correspond to one channel in FIG. 19, and the driving methods such as those in FIGS. 19A to 19C may be directly used.

The sensor unit 100" in FIG. 46 may be also driven in the touch sensing mode, the antenna driving mode, and the stylus sensing mode by the control unit 500 as with the sensor unit 100 in FIG. 16. Also, the various combinations of the <table 2> may be applied to the sensor unit 100'''''' of FIG. 46. Thus, the sensor unit 100'''''' of FIG. 46 may be driven in one of the touch sensing mode, the antenna driving mode, and the stylus sensing mode through various methods by the control unit 500.

Figure 47:
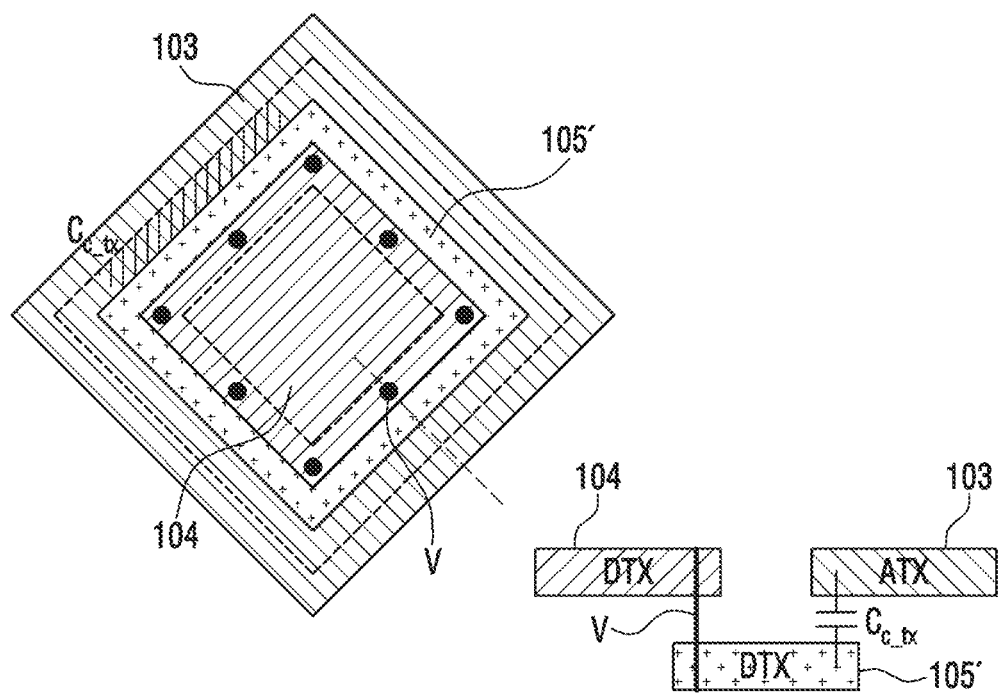
FIG. 47 is a view for explaining a first modified example of a fifth pattern 105 in FIG. 40.

FIG. 47 is a view for explaining a first modified example of the fifth pattern 105 in FIG. 40.

Referring to FIG. 47, a fifth pattern 105' is disposed on a layer different from a layer on which the third pattern 103 and the fourth pattern 104 are disposed.

The fifth pattern 105' may have a shape corresponding to the third pattern 103. For example, the fifth pattern 105' may have a diamond shape and a diamond-shaped opening therein.

One portion of the fifth pattern 105' may overlap the third pattern 103 in the vertical direction, and the other portion may overlap the fourth pattern 104 in the vertical direction. For example, an outer edge of the fifth pattern 105' may overlap an inner edge of the third pattern 103 disposed on another layer. Also, an inner edge of the fifth pattern 105' may overlap an outer edge of the fourth pattern 104 disposed on another layer.

The fifth pattern 105' is electrically connected to the fourth pattern 104 disposed on another layer through a conductive via v. Here, the via v may be provided in plurality, and a plurality of vias v may be arranged on outer edge of the fourth pattern 104.

The plurality of fifth patterns 105' may form the mutual capacitance Cm in the vertical direction with the third patterns 103 disposed on another layer. Also, since the fifth pattern 105' is electrically connected to the fourth pattern 104 in the third pattern 103 through the via v, the third pattern 103 may form the mutual capacitance Cm with the fifth pattern 105' in addition to the fourth pattern 104.

Although not shown in the drawing, the sixth pattern 106 in FIG. 40 may have the same shape as the fifth pattern 105' in FIG. 47. Here, a sixth pattern (not shown) may have an outer edge overlapping an inner edge of the first pattern 101 disposed on another layer and an inner edge overlapping an outer edge of the second pattern 102 disposed on another layer. Also, the sixth pattern (not shown) may be electrically connected to the second pattern 102 disposed on another layer through the conductive via. Likewise, the sixth pattern (not shown) may form the mutual capacitance in the vertical direction with the first pattern 101. Since the sixth pattern (not shown) is electrically connected to the second pattern 102 in the first pattern 101, the first pattern 101 may form the mutual capacitance Cm with the sixth pattern (not shown) in addition to the second pattern 102.

As described above, the sensor unit including the modified example of the fifth pattern 105' in FIG. 47 may form the mutual capacitance in the vertical direction as well as the horizontal direction of the third pattern 103, and the sensor unit including the modified example of the sixth pattern (not shown) may also form the mutual capacitance in the vertical direction as well as the horizontal direction of the first pattern 101. Thus, in the stylus sensing mode, the voltage value outputted from the sensing circuit unit of the control unit may increase to improve the stylus sensing sensitivity.

Figure 48:
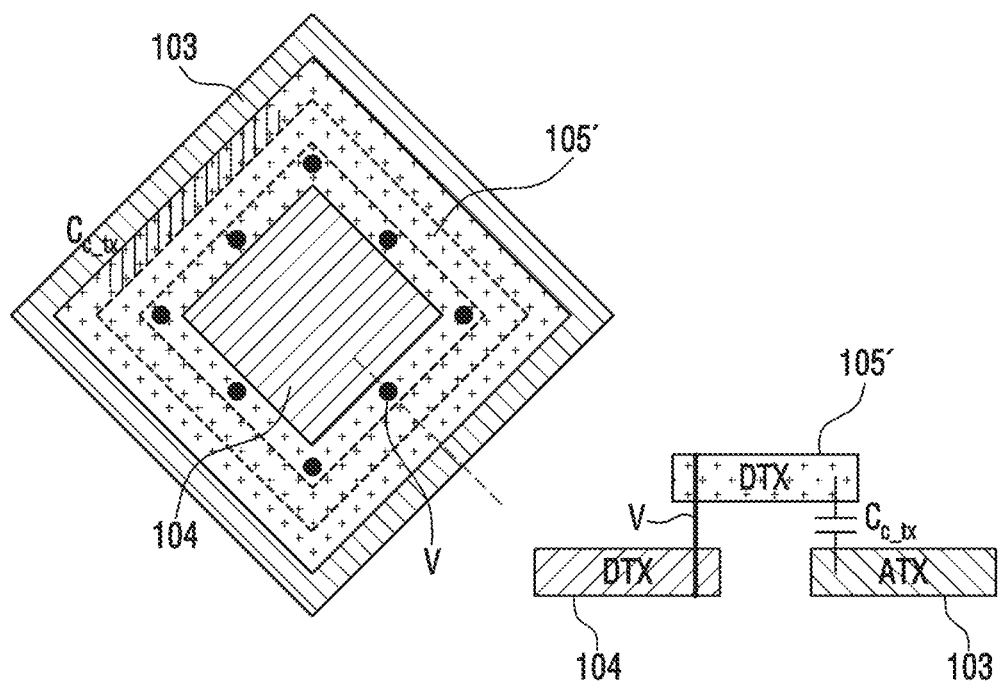
FIG. 48 is a view illustrating a modified example of FIG. 47.

FIG. 48 is a view illustrating a modified example of FIG. 47.

FIG. 47 is a view illustrating a state in which the fifth pattern 105' is disposed below the third and fourth patterns 103 and 104, and on the contrary, FIG. 37 is a view illustrating a state in which the fifth pattern 105' is disposed on the third and fourth patterns 103 and 104.

A structure of the fifth pattern 105' in FIGS. 47 and 48 may be applied to the above-described various embodiments.

Figure 49:
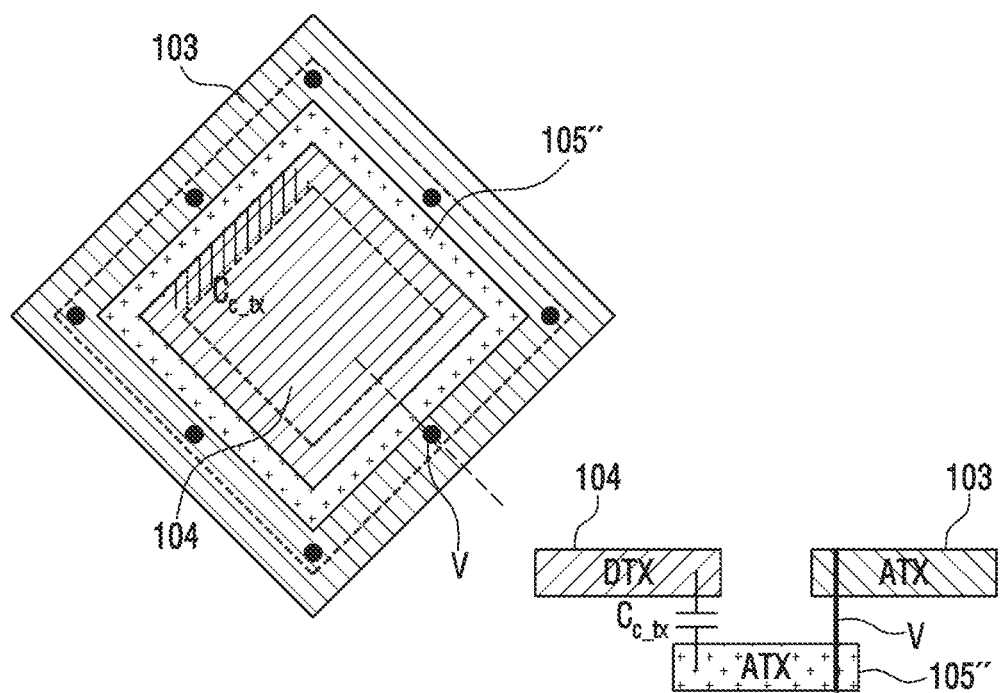
FIG. 49 is a view for explaining a modified example of a fifth pattern 105' in FIG. 47.

FIG. 49 is a view for explaining a modified example of the fifth pattern 105' in FIG. 47.

Referring to FIG. 49, a fifth pattern 105" has the same shape and position as the fifth pattern 105' in FIG. 47. The fifth pattern 105" is different from the fifth pattern 105' in FIG. 47 in that the fifth pattern 105" is electrically connected to the third pattern 103 disposed on another layer through the conductive via v. Also, the via v is disposed on an inner edge of the third pattern 103.

Since the fifth pattern 105" is electrically connected to the third pattern 103 disposed on another layer, the fourth pattern 104 may form a mutual capacitance Cc_Tx in the vertical direction with the fifth pattern 105".

Also, the sensor unit including the modified example of the fifth pattern 105" in FIG. 49 may form the mutual capacitance in the vertical direction as well as the horizontal direction.

Figure 50:
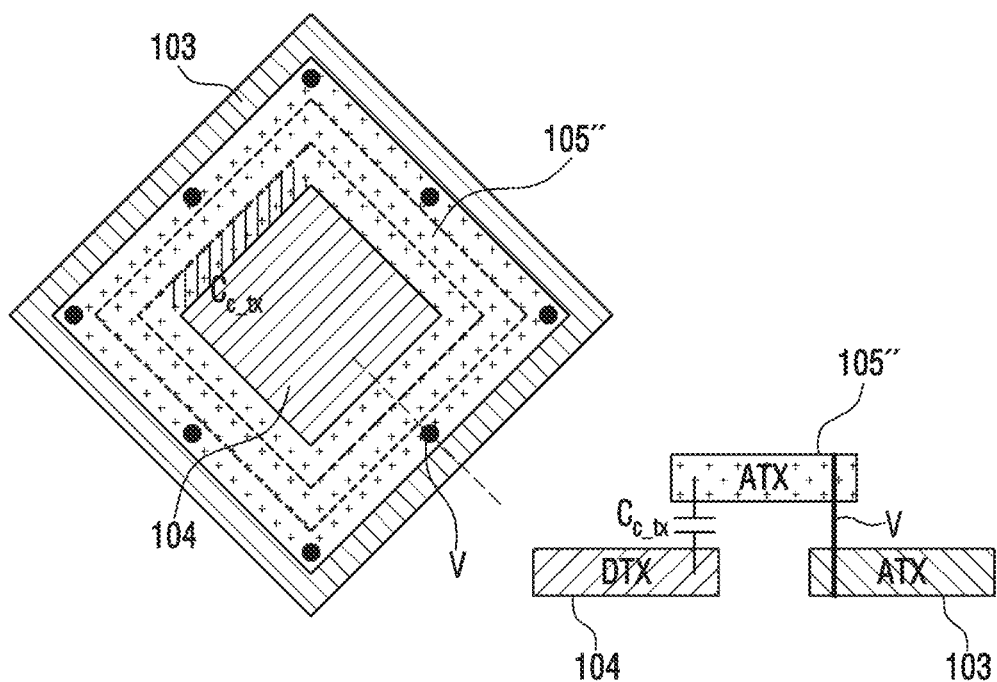
FIG. 50 is a view illustrating a modified example of FIG. 49.

FIG. 50 is a view illustrating a modified example of FIG. 49.

FIG. 49 is a view illustrating a state in which the fifth pattern 105" is disposed below the third and fourth patterns 103 and 104, and on the contrary, FIG. 50 is a view illustrating a state in which the fifth pattern 105" is disposed on the third and fourth patterns 103 and 104.

A structure of the fifth pattern 105" in FIGS. 49 and 50 may be applied to the above-described various embodiments.

Figure 51:
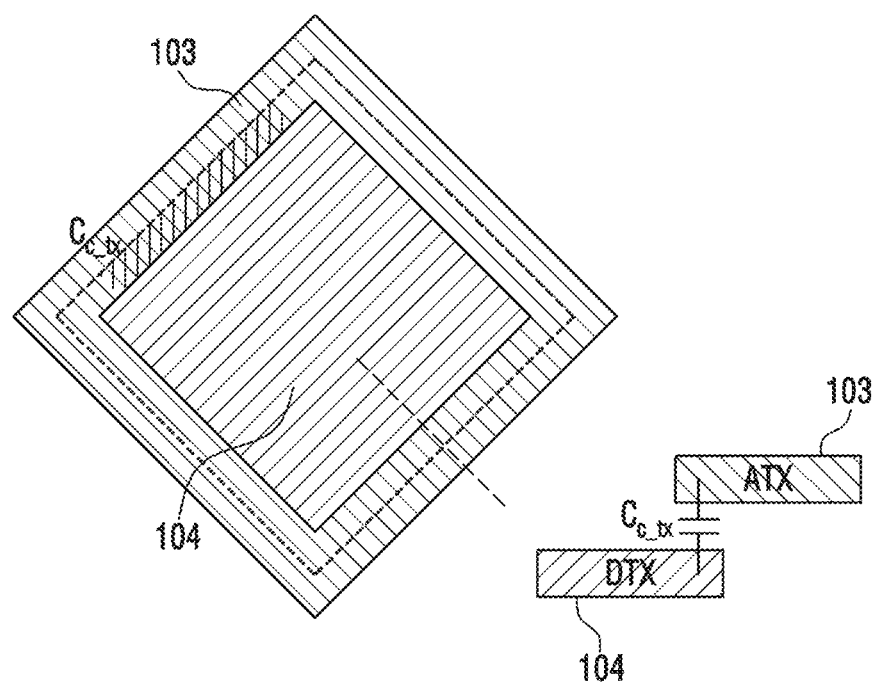
FIGS. 51 and 52 are views for explaining modified examples of a third pattern 103 and a fourth pattern 104 in a sensor unit in FIG. 41 or 42.
Figure 52:
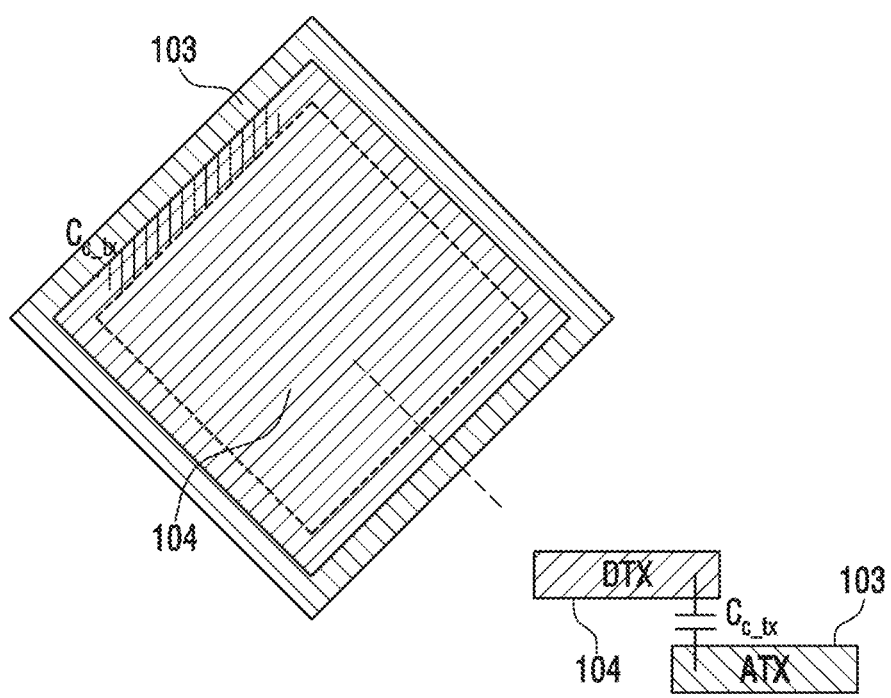

FIGS. 51 and 52 are views for explaining modified examples of the third pattern 103 and the fourth pattern 104 in the sensor unit in FIG. 41 or 42.

Referring to FIGS. 51 and 52, the third pattern 103 and the fourth pattern 104 according to a modified example are disposed on different layers, and a portion of the third pattern 103 and a portion of the fourth pattern 104 overlap each other n the vertical direction. For example, an inner edge of the third pattern 103 may overlap an outer edge of the fourth pattern 104 in the vertical direction. FIG. 51 is a view illustrating a state in which the third pattern 103 is disposed on the fourth pattern 104, and FIG. 52 is a view illustrating a state in which the third pattern 103 is disposed below the fourth pattern 104.

A sensor unit including the third and fourth patterns 103 and 104 in FIGS. 51 and 52 may form the mutual capacitance Cc_Tx in the vertical direction instead of the horizontal direction. Although not shown in the drawing, the first and second patterns 101 and 102 in FIGS. 41 and 42 may have the same structures as that in FIGS. 51 and 52

A structure according to the modified example in FIGS. 51 and 52 may be applied to the above-described various embodiments.

According to at least one of the embodiments of the present disclosure, the sufficient output signal may be generated even with the small diameter by proposing the optimized structure of the resonance circuit of the stylus pen.

According to at least one of the embodiments of the present disclosure, the stylus pen robust against external factors may be provided.

When the touch input device according to the embodiment of the present invention is used, the position of the stylus pen may be detected while detecting the touch position and driving the stylus pen.

Also, the limitation in which the output voltage of the sensing circuit unit is varied according to the position of the stylus pen may be solved.

The effects of the present invention are not limited to the above-described effects, and better or specific effects may be exhibited for each embodiment in [Detailed Description].

The touch input device according to the various embodiments in this specification may include various types of devices. The touch input device may include, e.g., a portable communication device (e.g., a smart phone), a computer device, a portable multimedia device, a portable medical device, a camera, a wearable device, or a home appliance. The touch input device according to the embodiment of this specification is not limited to the above-described devices.

The various embodiments of this specification and the terms used herein are not intended to limit the technical features described in this document to specific embodiments, and should be understood to include various modifications, equivalents, or substitutions of the embodiments. When the drawings are described, like reference numerals refer to like elements throughout. The singular form of the noun corresponding to the item may include one or more items, unless the relevant context clearly describes otherwise. As used herein, each of the phrases "A or B", "at least one of A and B", "at least one of A or B," "A, B or C," "at least one of A, B, and C," and "at least one of A, B, or C" may include all possible combinations of the items listed together in the corresponding one of the phrases. Terms such as "1st", "2nd", "first", or "second" may simply be used to distinguish a component from another component, and the component is not limited in another aspect (e.g., importance or order). When one (e.g., first) component is "coupled" or "connected" to another (e.g., second) component, with or without the terms "functionally" or "communicatively", this indicates that one component may be connected to the other component directly (e.g., by wire), wirelessly, or through a third component.

As used herein, the term "module" may include a unit implemented in hardware, software, or firmware, and may be used interchangeably with terms such as, e.g., logic, logic block, component, or circuit. A module may be an integrally formed part or a minimum unit or a portion of the part that performs one or more functions. For example, according to an embodiment, the module may be implemented in the form of an application-specific integrated circuit (ASIC).

Various embodiments of the present specification may be implemented as software (e.g., a program) including one or more commands stored in a storage medium (e.g., internal memory or external memory) readable by a machine (e.g., an electronic device). For example, a processing unit (e.g., a processor) of a device (e.g., a touch input device) may call one or more commands stored from a storage medium and execute it. This makes it possible for the device to be operated to perform one or more functions depending on the called one or more commands. The one or more commands may include codes generated by a compiler or executable by an interpreter. The device-readable storage medium may be provided in the form of a non-transitory storage medium. Herein, the term 'non-transitory' only indicates that the storage medium is a tangible device and does not include a signal (e.g., electromagnetic wave), and this term does not distinguish a case in which data is stored semi-permanently in a storage medium from a case in which data is temporarily stored therein.

According to an embodiment, the method according to various embodiments disclosed in this document may be provided as being included in a computer program product. A computer program product may be traded between a seller and a buyer as a commodity. The computer program product may be distributed in the form of a machine-readable storage medium (e.g., compact disc read only memory (CD-ROM)), or may be distributed (e.g., downloaded or uploaded) via an application store (e.g., Play Store™), directly between two user devices (e.g., smart phones), or in an online manner In the case of online distribution, at least a part of the computer program product may be at least temporarily stored or temporarily created in a machine-readable storage medium such as a memory of a server of a manufacturer, a server of an application store, or a memory of a relay server.

According to various embodiments, each component (e.g., a module or a program) of the above-described components may include a singular entry or a plurality of entities. According to various embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to being performed by the corresponding component among the plurality of components prior to the integration. According to various embodiments, operations performed by a module, program, or other component may be executed sequentially, in parallel, repeatedly, or heuristically, one or more of the operations may be executed in a different order or may be omitted, or one or more other operations may be added.

What is claimed is:

1. A pen and touch input system comprising: a touch input device comprising (Original) a sensor unit and a control unit configured to control the sensor unit; and a stylus pen configured to interact with the touch input device,
   wherein the sensor unit comprises:
   a first pattern extending in a first direction;
   a second pattern disposed adjacent to the first pattern and extending in the first direction;
   a third pattern extending in a second direction different from the first direction; and
   a fourth pattern disposed adjacent to the third pattern and extending in the second direction,
   wherein a plurality of first patterns and a plurality of second patterns are arranged in the second direction, and a plurality of third patterns and a plurality of fourth patterns are arranged in the first direction,
   first ends of the plurality of first and third patterns are electrically connected to the control unit, and second ends thereof are electrically opened, and
   second ends of the plurality of second patterns are electrically connected to each other, and second ends of the plurality of fourth patterns are electrically connected to each other,
   wherein the stylus pen comprises:
   a body part;
   a tip exposed to the outside in the body part;
   an inductor part comprising a ferrite core disposed in the body part and a coil wound in multiple layers around at least a portion of the ferrite core; and
   a capacitor part disposed in the body part and electrically connected to the inductor part to form a resonance circuit,
   wherein the control unit drives the stylus pen by using at least one driving pattern among the plurality of first to fourth patterns.

2. The pen and touch input system of claim 1, wherein the ferrite core has a dielectric constant of 1000 or less, the coil is formed such that adjacent winding layers are alternately wound, and the coil is a wire that surrounds two or more insulated wires.

3. The pen and touch input system of claim 1, wherein the coil is formed such that adjacent winding layers are wound in an inclined zigzag pattern.

4. The pen and touch input system of claim 1, wherein the ferrite core comprises nickel.

5. The pen and touch input system of claim 1, wherein the coil is a litz wire.

6. The pen and touch input system of claim 1, further comprising a bobbin that surrounds at least a portion of the ferrite core,
   wherein the coil is wound around at least a portion of the bobbin.

7. The pen and touch input system of claim 1, wherein the inductor part is formed such that two or more inductor parts are connected in series.

8. The pen and touch input system of claim 7, further comprising a conductive blocking member disposed on at least a portion of the inductor part.

9. The pen and touch input system of claim 8, wherein the blocking member comprises one slit configured to block generation of an eddy current,
- both ends of the blocking member are spaced apart from each other in the first direction by the one slit, and
- the first direction is a direction in which the eddy current is formed.

10. The pen and touch input system of claim 1, wherein any one of the first to fourth patterns comprises a plurality of diamond patterns and a connection pattern configured to connect two adjacent diamond patterns among the plurality of diamond patterns.

11. The pen and touch input system of claim 1, wherein the first pattern or the third pattern has an opening, and
- the second pattern or the fourth pattern is disposed in the opening of the first pattern or the third pattern, respectively.

12. The pen and touch input system of claim 1, wherein the first pattern or the third pattern surrounds the second pattern or the fourth pattern, respectively.

13. The pen and touch input system of claim 1, wherein the first pattern and the second pattern are disposed on the same layer, or the third pattern and the fourth pattern are disposed on the same layer.

14. The pen and touch input system of claim 1, wherein at least a portion of the first pattern and at least a portion of the second pattern are disposed on a first layer, and at least a portion of the second pattern and at least a portion of the fourth pattern are disposed on a second layer.

15. The pen and touch input system of claim 1, wherein second ends of the plurality of second and fourth patterns are electrically connected to each other through a via.

16. The pen and touch input system of claim 1, wherein the control unit applies a driving signal for touch sensing to at least one first pattern among the plurality of first patterns and receives a sensing signal received from at least one third pattern among the plurality of third patterns.

17. The pen and touch input system of claim 1, wherein the control unit comprises a recording medium in which a program is recorded for executing:
- a process of applying a driving signal for touch sensing to at least one first pattern among the plurality of first patterns; and
- a process of receiving a sensing signal received from at least one third pattern among the plurality of third patterns.

18. The pen and touch input system of claim 1, wherein the control unit further comprises:
- a plurality of driving circuit units for touch sensing; and
- a plurality of sensing circuit units for touch sensing,
- wherein the control unit controls to:
- apply a driving signal for touch sensing to at least one driving pattern among the plurality of first or third patterns through the plurality of driving circuit units for touch sensing, and
- receive a sensing signal for touch sensing received from at least one sensing pattern among the plurality of first or third patterns through the plurality of sensing circuit units for touch sensing.

19. The pen and touch input system of claim 1, wherein the control unit allows:
- a driving signal to be outputted to at least one driving pattern among the plurality of driving patterns; and
- a driving signal opposite to the above-described driving signal to be outputted to at least another driving pattern among the plurality of driving patterns.

20. The pen and touch input system of claim 1, wherein the control unit comprises a recording medium in which a program is recorded for executing:
- a process of outputting a driving signal to at least one driving pattern among the plurality of driving patterns; and
- a process of outputting a driving signal opposite to the above-described driving signal to at least another driving pattern among the plurality of driving patterns.

21. The pen and touch input system of claim 1, wherein the control unit comprises a plurality of driving circuit units for pen driving,
- wherein the control unit controls to apply:
- a driving signal to at least one driving pattern through at least one driving circuit unit for pen driving through at least one driving circuit unit for pen driving among the plurality of driving circuit unit for pen driving; and
- a driving signal opposite to the above-described driving signal to at least another driving pattern through at least another driving circuit unit for pen driving among the plurality of driving circuit units for pen driving.

22. The pen and touch input system of claim 1, further comprising a capacitor connected to a pattern of the second end among the plurality of second patterns or the plurality of fourth patterns.

23. The pen and touch input system of claim 1, wherein the second pattern is a bar pattern disposed in the first pattern and extending in the first direction, and
- the fourth pattern is a bar pattern disposed in the third pattern and extending in the second direction,
- wherein the pen and touch input system further comprises:
- a plurality of fifth patterns disposed between the plurality of first patterns, having a shape corresponding to and overlapping a main pattern part of the third pattern, and electrically connected to the fourth pattern;
- a capacitor connected to a pattern of the second end among the plurality of fifth patterns;
- a plurality of sixth patterns disposed between the plurality of third patterns, having a shape corresponding to and overlapping a main pattern part of the first pattern, and electrically connected to the second pattern; and
- a capacitor connected to the pattern of the second end among the plurality of sixth patterns.

24. The pen and touch input system of claim 1, further comprising at least one trace directly connected to a portion at which the patterns disposed on the second end are electrically connected to each other and disposed outside an active area of the touch input device.

25. A pen and touch input system comprising: a touch input device comprising a sensor unit and a control unit configured to control the sensor unit; and a stylus pen configured to interact with the touch input device,
- wherein the sensor unit comprises:
- a first pattern extending in a first direction;
- a second pattern disposed adjacent to the first pattern and extending in the first direction;
- a third pattern extending in a second direction different from the first direction; and
- a fourth pattern disposed adjacent to the third pattern and extending in the second direction,
- wherein a plurality of first patterns and a plurality of second patterns are arranged in the second direction, and a plurality of third patterns and a plurality of fourth patterns are arranged in the first direction, first ends of the plurality of first and third patterns are electrically connected to the control unit, and second ends thereof are electrically opened, and second ends of the plurality of second patterns are electrically connected to each other, and second ends of the plurality of fourth patterns are electrically connected to each other, wherein the stylus pen comprises:

a body part;

a tip exposed to the outside in the body part;

an inductor part comprising a ferrite core disposed in the body part and a coil wound in multiple layers around at least a portion of the ferrite core; and a capacitor part disposed in the body part and electrically connected to the inductor part to form a resonance circuit, wherein the control unit senses the stylus pen by using at least one sensing pattern among the plurality of first to fourth patterns.

26. The pen and touch input system of claim 25, wherein the control unit controls to sense the pen based on an output value from a first sensing pattern among the at least one sensing pattern and an output value from a second sensing pattern among the at least one sensing patterns different from the first of sensing patterns.

27. The pen and touch input system of claim 25, wherein the control unit comprises a recording medium in which a program is recorded for executing:

a process of sensing the pen based on an output value from a first sensing pattern among the at least one sensing patterns and an output value from a second sensing pattern among the at least one sensing patterns different from the first sensing patterns.

28. The pen and touch input system of claim 25, wherein the control unit comprises a plurality of sensing circuit units for pen sensing, wherein the control unit controls to sense the pen based on:

an output value from a first sensing pattern among the at least one sensing patterns, which is sensed through a first sensing circuit unit for pen sensing among the plurality of sensing circuit units for pen sensing; and an output value from a second sensing pattern among the at least one sensing patterns different from the first sensing patterns which is sensed through a second sensing circuit unit for pen sensing among the plurality of sensing circuit units for pen sensing.

29. The pen and touch input system of claim 28, wherein at least a portion of the sensing circuit unit for pen sensing is used for touch sensing.

30. A pen and touch input system comprising: a touch input device comprising a sensor unit and a control unit configured to control the sensor unit; and a stylus pen configured to interact with the touch input device, wherein the sensor unit comprises:

a first pattern comprising first-a patterns and first-b patterns that are alternately arranged in a first direction;

a second pattern disposed adjacent to the first pattern;

a third pattern extending in a second direction different from the first direction; and a fourth pattern disposed adjacent to the third pattern and extending in the second direction, wherein the first-a patterns are electrically connected to each other, the first-b patterns are electrically connected to each other, a plurality of first patterns and a plurality of second patterns are arranged in the second direction, a plurality of third patterns and a plurality of fourth patterns are arranged in the first direction, first ends of the plurality of first and third patterns are electrically connected to the control unit, and second ends thereof are electrically opened, second ends of the plurality of second patterns are electrically connected to each other, and second ends of the plurality of fourth patterns are electrically connected to each other, wherein the stylus pen comprises:

a body part;

a tip exposed to the outside in the body part;

an inductor part comprising a ferrite core disposed in the body part and a coil wound in multiple layers around at least a portion of the ferrite core; and a capacitor part disposed in the body part and electrically connected to the inductor part to form a resonance circuit, wherein the control unit drives the stylus pen by using at least one driving pattern among the plurality of first to fourth patterns.

31. The pen and touch input system of claim 30, wherein a first end of the first-a patterns is electrically opened, a second end of the first-a patterns is electrically connected to the control unit, a first end of the first-b patterns is electrically connected to the control unit, and a second end of the first-b patterns is electrically opened.

32. A pen and touch input system comprising: a touch input device comprising a sensor unit and a control unit configured to control the sensor unit; and a stylus pen configured to interact with the touch input device, wherein the sensor unit comprises:

a first pattern comprising first-a patterns and first-b patterns that are alternately arranged in a first direction;

a second pattern disposed adjacent to the first pattern;

a third pattern extending in a second direction different from the first direction; and a fourth pattern disposed adjacent to the third pattern and extending in the second direction, wherein the first-a patterns are electrically connected to each other, the first-b patterns are electrically connected to each other, a plurality of first patterns and a plurality of second patterns are arranged in the second direction, a plurality of third patterns and a plurality of fourth patterns are arranged in the first direction, first ends of the plurality of first and third patterns are electrically connected to the control unit, and second ends thereof are electrically opened, second ends of the plurality of second patterns are electrically connected to each other, and second ends of the plurality of fourth patterns are electrically connected to each other, wherein the stylus pen comprises:

a body part;

a tip exposed to the outside in the body part;

an inductor part comprising a ferrite core disposed in the body part and a coil wound in multiple layers around at least a portion of the ferrite core; and a capacitor part disposed in the body part and electrically connected to the inductor part to form a resonance circuit, wherein the control unit senses the stylus pen by using at least one sensing pattern among the plurality of first to fourth patterns.

33. A pen and touch input system comprising: a touch input device comprising a sensor unit and a control unit configured to control the sensor unit; and a stylus pen configured to interact with the touch input device, wherein the sensor unit comprises:
a plurality of first patterns arranged in a first direction and a second direction different from the first direction and each having an opening;
a plurality of second patterns disposed in the openings of the first patterns;
a plurality of third patterns disposed on the same layer as the plurality of first patterns and each extending in the second direction and each having an opening; and
a plurality of fourth patterns disposed in the openings of the plurality of third patterns, respectively, and each extending in the second direction,
wherein the first patterns arranged in the first direction among the plurality of first patterns are electrically connected to each other through a conductive bridge,
among the first patterns arranged in the first direction, the first pattern disposed on a first end is connected to the control unit, and the first pattern disposed on a second end is electrically opened, the second patterns arranged in the first direction among the plurality of second patterns are electrically connected to each other through a conductive bridge,
the second pattern disposed on a second end among the second patterns arranged in the first direction are electrically connected to other second patterns arranged in the second direction,
first ends of the plurality of third patterns are electrically connected to the control unit, and second ends thereof are electrically opened, and
second ends of the plurality of fourth patterns are electrically connected to each other,
wherein the stylus pen comprises:
a body part;
a tip exposed to the outside in the body part;
an inductor part comprising a ferrite core disposed in the body part and a coil wound in multiple layers around at least a portion of the ferrite core; and
a capacitor part disposed in the body part and electrically connected to the inductor part to form a resonance circuit,
wherein the control unit drives the stylus pen by using at least one driving pattern among the plurality of first to fourth patterns.

34. A pen and touch input system comprising: a touch input device comprising a sensor unit and a control unit configured to control the sensor unit; and a stylus pen configured to interact with the touch input device, wherein the sensor unit comprises:
a plurality of first patterns arranged in a first direction and a second direction different from the first direction and each having an opening;
a plurality of second patterns disposed in the openings of the plurality of first patterns;
a plurality of third patterns arranged on the same layer as the plurality of first patterns, each extending in the second direction, and each having an opening; and
a plurality of fourth patterns arranged in the openings of the plurality of third patterns, respectively, and each extending in the second direction,
wherein the first patterns arranged in the first direction among the plurality of first patterns connected to each other through a conductive bridge,
among the first patterns arranged in the first direction, the first pattern disposed on a first end is connected to the control unit, and the first pattern disposed on a second end is electrically opened,
the second pattern arranged in the first direction among the plurality of second patterns are electrically connected through a conductive bridge,
among the second patterns arranged in the first direction, the second pattern disposed on a second end is connected to other second patterns arranged in the second direction,
first ends of the plurality of third patterns are electrically connected to the control unit, and second ends thereof are electrically opened, and
second ends of the plurality of fourth patterns are electrically connected to each other,
wherein the stylus pen comprises:
a body part;
a tip exposed to the outside in the body part;
an inductor part comprising a ferrite core disposed in the body part and a coil wound in multiple layers around at least a portion of the ferrite core; and
a capacitor part disposed in the body part and electrically connected to the inductor part to form a resonance circuit,
wherein the control unit senses the stylus pen by using at least one sensing pattern among the plurality of first to fourth patterns.

35. A pen and touch input system comprising: a touch input device comprising a sensor unit and a control unit configured to control the sensor unit; and a stylus pen configured to interact with the touch input device, wherein the sensor unit comprises:
a plurality of first patterns each extending in a first direction; and
a plurality of second patterns each extending in a second direction different from the first direction,
wherein each of the first patterns comprises a plurality of first-1 patterns, a plurality of first-2 patterns, and a connection pattern configured to connect at least two first-1 patterns to each other among the plurality of first-1 patterns, and the plurality of first-2 patterns are electrically connected to each other,
wherein each of the second patterns comprises a plurality of second-1 patterns, a plurality of second-2 patterns, the plurality of second-1 patterns are electrically connected to each other, and the plurality of second-2 patterns are electrically connected to each other,
wherein the first-1 patterns disposed on a second end among the plurality of first-1 patterns are electrically opened, and the first-2 patterns disposed on the second end among the plurality of first-2 patterns are electrically connected to each other,
wherein the second-1 patterns disposed on the second end among the plurality of second-1 patterns are electrically opened, and the second-2 patterns disposed on the second end among the plurality of second-2 patterns are electrically connected to each other,
wherein the stylus pen comprises:
a body part;
a tip exposed to the outside in the body part;
an inductor part comprising a ferrite core disposed in the body part and a coil wound in multiple layers around at least a portion of the ferrite core; and
a capacitor part disposed in the body part and electrically connected to the inductor part to form a resonance circuit, wherein the control unit drives the stylus pen by using at least one driving pattern among the first-1 pattern, the first-2 pattern, the second-1 pattern, and the second-2 pattern.

36. The pen and touch input system of claim 35, wherein the first-1 pattern has a diamond shape, and
the connection pattern connects two adjacent first-1 patterns.

37. The pen and touch input system of claim 35, wherein the first-1 pattern or the first-2 pattern has a diamond shape, and
the first pattern further comprises a connection pattern configured to connect two adjacent first-2 patterns.

38. The pen and touch input system of claim 35, wherein the first-1 pattern or the second-1 pattern has an opening, and
the first-2 pattern or the second-2 pattern is disposed in the opening of the first-1 pattern or the second-1 pattern, respectively.

39. The pen and touch input system of claim 35, wherein the first-1 pattern or the second-1 pattern surrounds the first-2 pattern or the second-2 pattern, respectively.

40. The pen and touch input system of claim 35, wherein the first pattern and the second pattern are disposed on the same layer.

41. The pen and touch input system of claim 35, wherein at least a portion of the first-1 pattern, at least a portion of the first-2 pattern, and at least a portion of the connection pattern are disposed on a first layer, and
at least a portion of the second-1 pattern and at least a portion of the second-2 pattern are disposed on a second layer.

42. The pen and touch input system of claim 35, wherein the plurality of first-2 pattern, the plurality of second-1 pattern, or the plurality of second-2 pattern are electrically connected to each other by a structure different from that of the connection pattern configured to connect the first-1 patterns to each other.

43. The pen and touch input system of claim 42, wherein the plurality of first-2 pattern, the plurality of second-1 pattern, or the plurality of second-2 pattern are electrically connected to each other through a bridge and a via.

44. The pen and touch input system of claim 35, further comprising a second connection pattern configured to connect at least two adjacent first-2 patterns among the plurality of first-2 patterns,
wherein the second-1 pattern or the plurality of second-2 patterns are electrically connected to each other by a structure different from that of the connection pattern configured to connect the first-1 patterns to each other.

45. The pen and touch input system of claim 44, wherein the plurality of second-1 patterns or the plurality of second-2 patterns are electrically connected to each other through a bridge and a via.

46. The pen and touch input system of claim 35, wherein the first-2 patterns disposed on the second end among the plurality of first-2 patterns are electrically connected through a via.

47. The pen and touch input system of claim 35, wherein the second-2 patterns disposed on the second end among the plurality of second-2 patterns are electrically connected to each other through a via.

48. The pen and touch input system of claim 35, wherein the first-1 patterns disposed on the second end among the plurality of first-1 patterns have a shape opened in the first direction, and
the first-2 patterns disposed on the second end among the plurality of first-2 patterns are electrically connected through the connection pattern.

49. The pen and touch input system of claim 35, wherein the second-1 patterns disposed on the second end among the plurality of second-1 patterns have a shape opened in the second direction, and
the second-2 patterns disposed on the second end among the plurality of second-2 patterns are electrically connected through the connection pattern.

50. The pen and touch input system of claim 35, wherein the control unit applies:
a driving signal for touch sensing to at least one first-1 pattern among the plurality of first-1 patterns and receives a sensing signal received from at least one second-1 pattern among the plurality of second-1 patterns; or
a driving signal for touch sensing to at least one second-1 pattern among the plurality of second-1 patterns and receives a sensing signal received from at least one first-1 pattern among the plurality of first-1 patterns.

51. The pen and touch input system of claim 35, wherein the control unit comprises a recording medium in which a program is recorded for executing:
a process of applying a driving signal for touch sensing to at least one first-1 pattern among the plurality of first-1 patterns and a process of receiving a sensing signal received from at least one second-1 pattern among the plurality of second-1 patterns; or
a process of applying a driving signal for touch sensing to at least one second-1 pattern among the plurality of second-1 patterns and a process of receiving a sensing signal received from at least one first-1 pattern among the plurality of first-1 patterns.

52. The pen and touch input system of claim 35, wherein the control unit further comprises:
a plurality of driving circuit units for touch sensing; and
a plurality of sensing circuit units for touch sensing,
wherein the control unit controls to:
apply a driving signal for touch sensing to at least one driving pattern among the plurality of first-1 or second-1 patterns through the plurality of driving circuit units for touch sensing; and
receive a sensing signal for touch sensing received from at least one sensing pattern among the plurality of first-1 or second-1 patterns through the plurality of sensing circuit units for touch sensing.

53. The pen and touch input system of claim 35, further comprising a capacitor connected to a pattern of the second end among the plurality of first-2 patterns or the plurality of second-2 patterns.

54. A pen and touch input system comprising: a touch input device comprising a sensor unit and a control unit configured to control the sensor unit; and a stylus pen configured to interact with the touch input device,
wherein the sensor unit comprises:
a plurality of first patterns each extending in a first direction; and
a plurality of second patterns each extending in a second direction different from the first direction,
wherein each of the first patterns comprises a plurality of first-1 patterns, a plurality of first-2 patterns, and a connection pattern configured to connect at least two first-1 patterns to each other among the plurality of first-1 patterns, and the plurality of first-2 patterns are electrically connected to each other, wherein each of the second patterns comprises a plurality of second-1 patterns, a plurality of second-2 patterns, the plurality of second-1 patterns are electrically connected to each other, and the plurality of second-2 patterns are electrically connected to each other, wherein the first-1 patterns disposed on a second end among the plurality of first-1 patterns are electrically opened, and the first-2 patterns disposed on the second end among the plurality of first-2 patterns are electrically connected to each other, wherein the second-1 patterns disposed on the second end among the plurality of second-1 patterns are electrically opened, and the second-2 patterns disposed on the second end among the plurality of second-2 patterns are electrically connected to each other, wherein the stylus pen comprises:

a body part;

a tip exposed to the outside in the body part;

an inductor part comprising a ferrite core disposed in the body part and a coil wound in multiple layers around at least a portion of the ferrite core; and a capacitor part disposed in the body part and electrically connected to the inductor part to form a resonance circuit, wherein the control unit senses the stylus pen by using at least one sensing pattern among the first-1 pattern, the first-2 pattern, the second-1 pattern, and the second-2 pattern.

* * * * *